(12) United States Patent
Hirai et al.

(10) Patent No.: US 9,418,406 B2
(45) Date of Patent: *Aug. 16, 2016

(54) ANISOTROPY IN RESOLUTION SPATIAL FILTER IMAGE PROCESSING APPARATUS, AND INFORMATION PROCESSING METHOD

(71) Applicant: FUJITSU LIMITED, Kawasaki-shi, Kanagawa (JP)

(72) Inventors: Yukio Hirai, Akashi (JP); Hiroyasu Yoshikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 360 days.

This patent is subject to a terminal disclaimer.

(21) Appl. No.: 14/082,536

(22) Filed: Nov. 18, 2013

(65) Prior Publication Data

US 2014/0160325 A1    Jun. 12, 2014

(30) Foreign Application Priority Data

Dec. 7, 2012    (JP) ................................. 2012-268753

(51) Int. Cl.
| | | |
|---|---|---|
| *G06K 9/40* | (2006.01) | |
| *G06T 5/00* | (2006.01) | |
| *G06T 5/20* | (2006.01) | |
| *H04N 5/217* | (2011.01) | |
| *H04N 5/357* | (2011.01) | |

(52) U.S. Cl.
CPC . *G06T 5/003* (2013.01); *G06T 5/20* (2013.01); *H04N 5/217* (2013.01); *H04N 5/3572* (2013.01); *G06T 2207/20012* (2013.01)

(58) Field of Classification Search
CPC . H04N 5/23235; H04N 5/3572; H04N 5/217; H04N 5/2171; H04N 5/2173; H04N 5/2175; H04N 5/2176; G06T 5/003; G06T 5/20; G06T 2207/20012

See application file for complete search history.

(56) References Cited

U.S. PATENT DOCUMENTS

| 8,306,348 B2 | 11/2012 | Cohen et al. |
| 9,025,058 B2 * | 5/2015 | Hirai ...................... H04N 5/225 348/222.1 |
| 2009/0074393 A1 | 3/2009 | Park et al. |

(Continued)

FOREIGN PATENT DOCUMENTS

| JP | 2009-25862 | 2/2009 |
| JP | 2011-123589 | 6/2011 |

(Continued)

OTHER PUBLICATIONS

Fisher et al., "Laplacian/Laplacian of Gaussian", 2003, Hypermedia Image Processing Reference (HIPR2), <http://homepages.inf.ed.ac.uk/rbf/HIPR2/log.htm>, p. 1-6.*

(Continued)

*Primary Examiner* — Stephen R Koziol
*Assistant Examiner* — Timothy Choi
(74) *Attorney, Agent, or Firm* — Staas & Halsey LLP

(57) ABSTRACT

An information processing method includes calculating a second spatial filter having a size of the number of elements larger than a blur size of an image using a finite first spatial filter having an anisotropy in resolution of the image and a finite filter in which a value of a total sum of elements is zero and at least two elements have a non-zero value, and generating a plurality of spatial filters having a predetermined number of elements or less from the second spatial filter.

12 Claims, 85 Drawing Sheets

(56) References Cited

U.S. PATENT DOCUMENTS

2011/0135208 A1* 6/2011 Atanassov ............... G06T 5/50
 382/218
2011/0135216 A1 6/2011 Hatakeyama

FOREIGN PATENT DOCUMENTS

| JP | 2012-23498 | 2/2012 |
|---|---|---|
| KR | 2006-0010905 | 2/2006 |
| KR | 2009-0028267 | 3/2009 |

OTHER PUBLICATIONS

Korean Office Action dated Jan. 7, 2015 in Korean Patent Application No. 10-2013-0150513.
Korean Office Action mailed Jun. 29, 2015 in related Korean Application No. 10-2013-0150513.
Japanese Office Action dated Jan. 26, 2016 in corresponding Japanese Patent Application No. 2012-141394, 3 pages.
"Image Processing Theory", First Edition, Japan, Shokodo Co., Ltd., Kuniaki AI, Apr. 25, 2011, pp. 74-76.
Brodic, D. et al., "Rotation of the Anisotropic Gaussian Kernel for the Improvment of the Text Skew Identification", UNITECH '10, International Scientific Conference, Nov. 19-20, 2010, pp. I-461-I-466, XP002712724, GABROVO Retrieved from www.singipedia.com/attachment.php?attachmentid=1837&d=1295531636.
Fisher, R. et al., "Unsharp Filter", 2003, XP002712725, Retrieved from http://homegages.inf.ed.ac.uk/rbf/HIPR2/unsharp.htm, pp. 1-10.
Gomes, Abel J.P., "Visual Computing and Multimedia", Lab.3, Edge Detectors, Departamento de Informatica Universidade da Beira Interior, Portugal, 2011, XP002712726, Retrieved from www.di.ubi.pt/~agomes/cvm/praticas/03-lab-edgedetectors.pdf, section 3.3, 11 pages.
Extended European Search Report of European Patent Application No. 13163823.1 dated Sep. 12, 2013, 3 pages.
Notice of Allowance dated Mar. 3, 2015 issued in U.S. Pat. No. 9,025,058.
Office Action dated Dec. 3, 2014 issued in U.S. Pat. No. 9,025,058.

* cited by examiner

FIG. 28

| POSITION | SPATIAL FILTER |
|---|---|
| $(x_1, y_1)$ | FIL1 |
| $(x_2, y_2)$ | FIL2 |
| ⋮ | ⋮ |

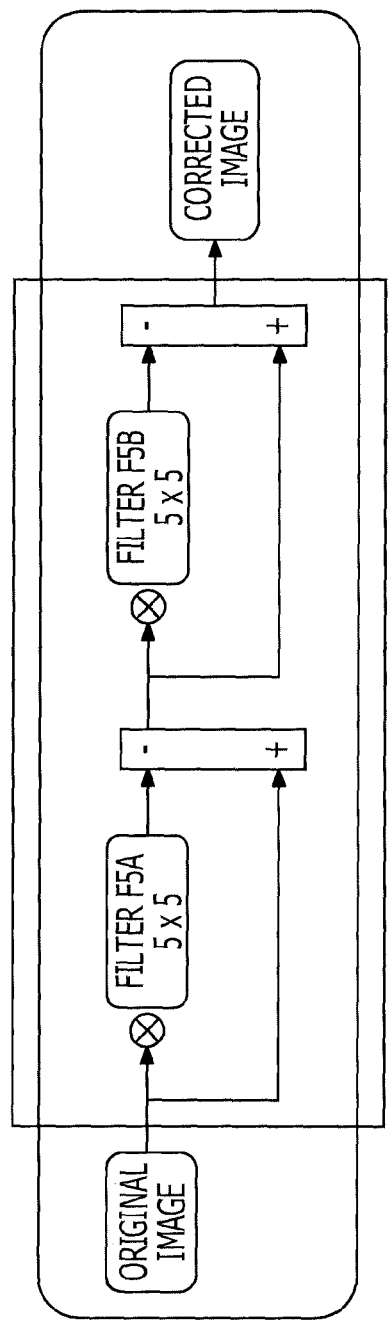
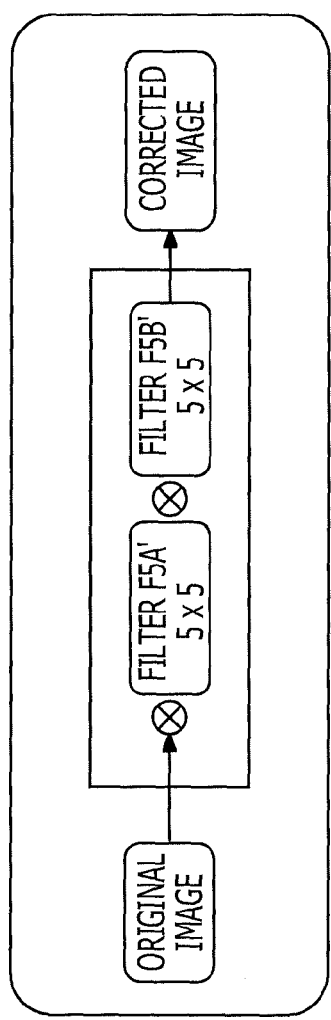
FIG. 38A
FIG. 38B

MINIMIZATION OF $\quad e^2 = \|F9' - F5A' \otimes F5B'\|^2$

IMAGE AFTER CORRECTION

AFTER CORRECTION
(5X5 ELEMENTS IN SECOND STAGE)

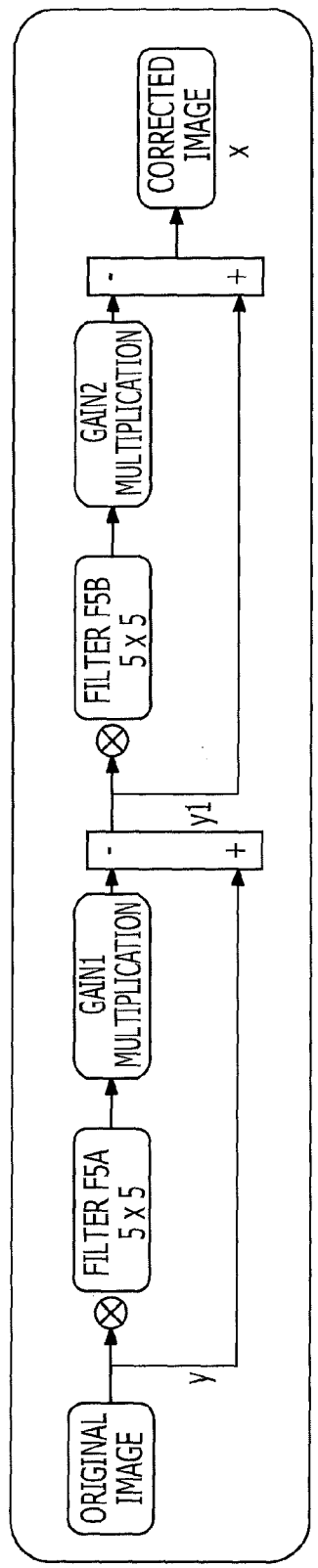
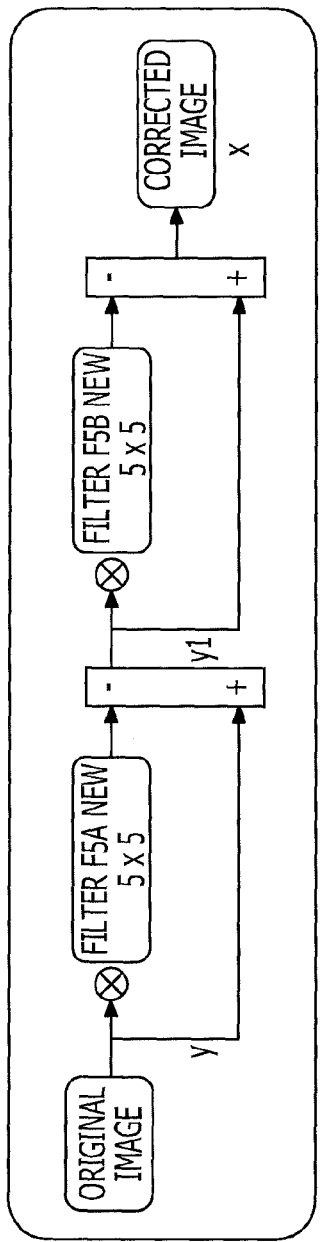
FIG. 60A
FIG. 60B

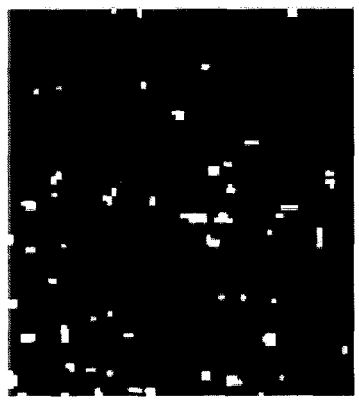 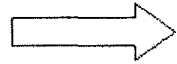 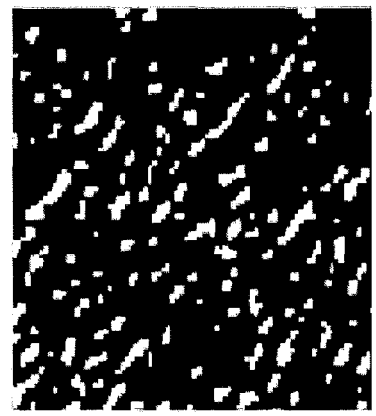
FIG. 64A  FIG. 64B

ANISOTROPY IN RESOLUTION SPATIAL FILTER IMAGE PROCESSING APPARATUS, AND INFORMATION PROCESSING METHOD

CROSS-REFERENCE TO RELATED APPLICATION

This application is based upon and claims the benefit of priority from the prior Japanese Patent Application No. 2012-268753 filed on Dec. 7, 2012, the entire contents of which are incorporated herein by reference.

FIELD

The present disclosure relates to an image processing apparatus, an information processing method and a program thereof.

BACKGROUND

The resolution of an image photographed by, for example, a digital camera is often degraded in the periphery of the image. In particular, the resolution in the periphery tends to degrade with respect to a central portion around an optical axis due to the dependence of an angle of view of an aperture size or aberration of a lens optical system. The vignetting of an aperture is regarded as one of the causes of degradation. A circular-shaped radial aperture formed in the circumferential direction is vignetted to form an elliptical aperture at an area where an angle of view is wide and thus, an image becomes blurred. As a result, the resolution in radial direction is degraded.

Regarding the degradation of resolution, there is a technique in which an image is filtered using different filter data according to a target position of the image to be corrected, for example, in order to cope with the change of a PSF (Point Spread Function) according to the angle of incident light. See, for example, Japanese Laid-Open Patent Publication No. 2012-23498.

The level of resolution tends to be different depending on a direction and the property is referred to as anisotropy in resolution. For example, the level of resolution in the radial direction around an optical axis is different from that in the circumferential direction.

While a different filtering is performed according to the position of an image in conventional techniques to correct the blur of the image, anisotropy in resolution may not be improved in the conventional techniques.

SUMMARY

According to an aspect of the present disclosure, there is provided an information processing method including calculating a second spatial filter having a size of the number of elements larger than a blur size of an image using a finite first spatial filter having an anisotropy in resolution of the image and a finite filter in which a value of a total sum of elements is zero and at least two elements have a non-zero value, and generating a plurality of spatial filters having a predetermined number of elements or less from the second spatial filter.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 28 is a view illustrating an example of a spatial filter table.

FIG. 38A is a view illustrating an example of filters, into which the spatial filter F is divided, in plural stages in embodiment 1.

FIG. 38B is a view illustrating an example of filters, into which the spatial filter F' is divided, in plural stages in embodiment 1.

FIG. 60A is a view illustrating an example of the filter processing unit which multiplies a value processed with each spatial filter by predetermined gain.

FIG. 60B is a view illustrating an example of the filter processing unit which multiplies each spatial filter by gain to generate a new spatial filter.

FIG. 64A is a view illustrating an example of a noise at the flat portion of the captured image.

FIG. 64B is a view illustrating an example of a noise after resolution is corrected.

DESCRIPTION OF EMBODIMENTS

Since the computation in frequency domain such as, for example, Fourier transformation, requires a large amount operations, a convolutional correction is normally performed with a finite spatial filter in order to provide a filtering function to the hardware such as a digital camera. However, a spatial filter having anisotropy is limited to have a finite number of elements and thus, the degradation levels of high frequency components become different with each other depending on the directions, thereby generating Moiré depending on the direction.

When the convolutional correction is performed with a finite spatial filter, there is a demand to further reduce the number of elements in order to lower the cost of processing. For example, when the finite spatial filter is installed in the hardware, there are needs to reduce the size of the spatial filter to a predetermined number of filter elements (e.g., 5×5) or less. When the number of filter elements is doubled, the amount of calculations is quadrupled and thus, the size of the spatial filter is desired to be limited to a predetermined number of filter elements or less.

However, when the number of elements of the spatial filter becomes smaller, the size of a PSF indicative of blur may become larger than the number of elements of the spatial filter. In this case, an amount of blur information may be missed and thus, the anisotropy in resolution or Moiré may not be prevented from being generated.

Therefore, the disclosed technique intends to provide an image processing apparatus capable of preventing the quality of image from being degraded when the spatial filter having anisotropy of resolution is limited to have a predetermined number of elements, an information processing method and a program thereof.

An image processing apparatus according to one aspect of the present disclosure includes a calculation unit configured to calculate a finite first spatial filter having an anisotropy in resolution of an image and a second spatial filter having a larger number of filter elements than a blur size of an image using a finite filter in which a total sum of elements is zero and at least two elements have a value of non-zero, and a generation unit configured to generate a plurality of spatial filters having a predetermined number of elements or less from the second spatial filter.

According to the disclosed technique, the quality of image may be prevented from being degraded when a spatial filter having anisotropy in resolution is limited to have a predetermined number of elements.

Figure 1:
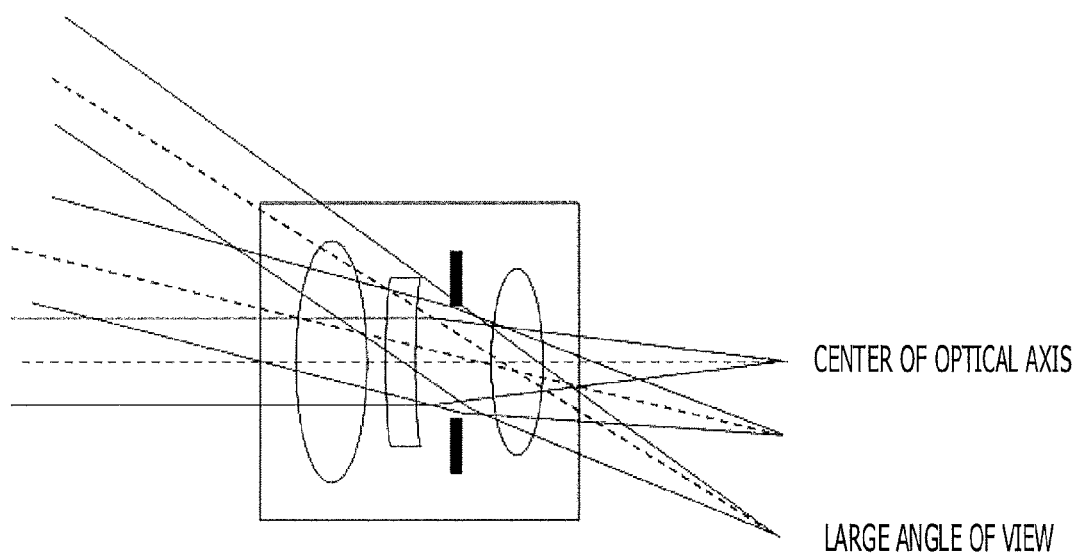
FIG. 1 is a view illustrating an exemplary optical system.
Figure 2:
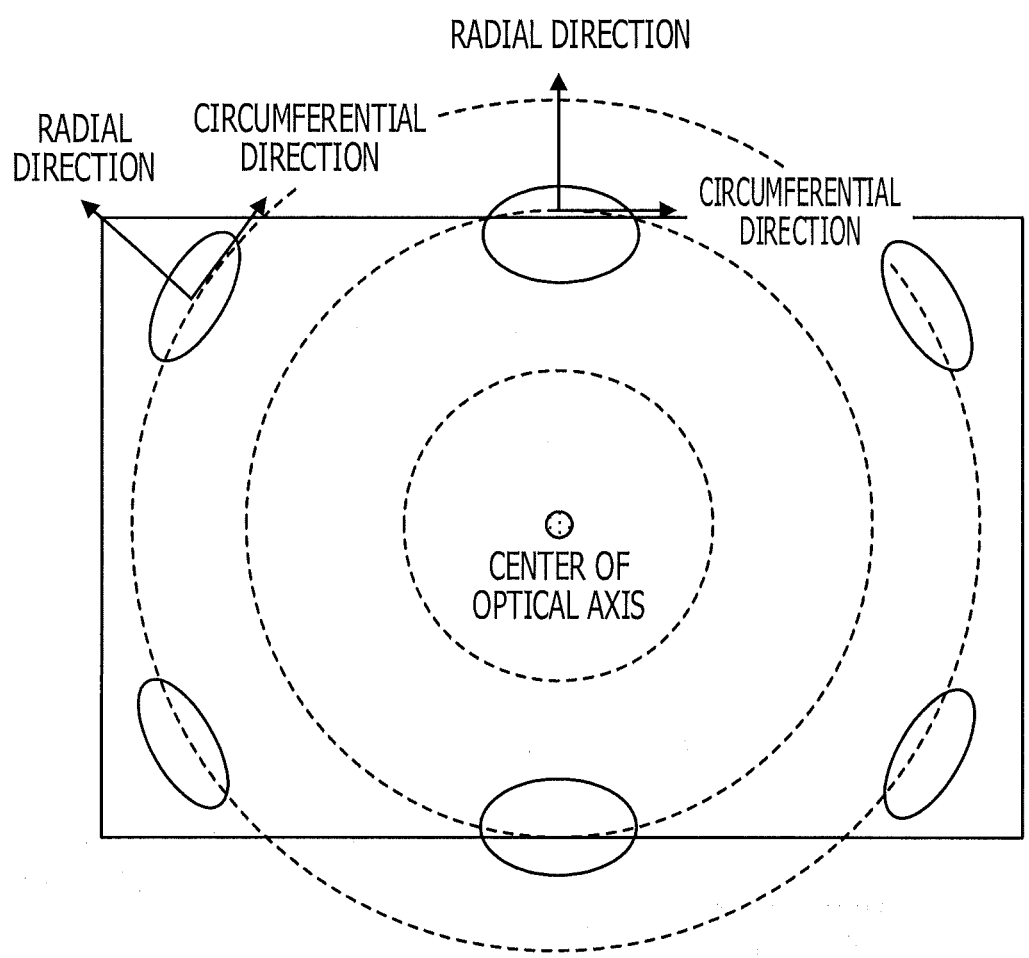
FIG. 2 is a view illustrating an example of an aperture according to a position in an image.

One cause of degradation of resolution will be described with reference to FIG. 1 to FIG. 3. FIG. 1 is a view illustrating an exemplary optical system. FIG. 2 is a view illustrating exemplary apertures according to the position in an image. When the optical system illustrated in FIG. 1 is used, the aperture is circular at the center of the optical axis as illustrated in FIG. 2. However, when an angle of view is wide, a vignetting occurs due to the aperture. As illustrated in FIG. 2, the shape of the apertures becomes an ellipsis according to the position in the image.

Figure 3:
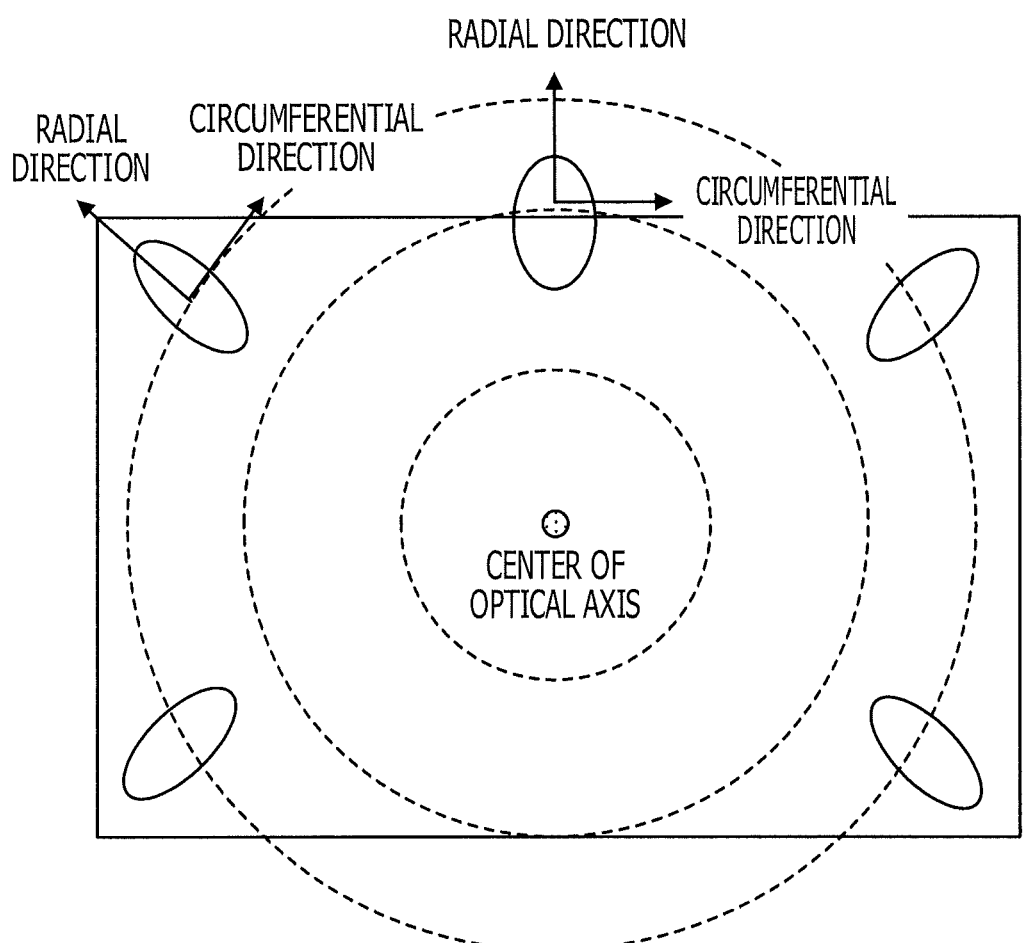
FIG. 3 is a view illustrating a direction of blur according to the position in an image.

FIG. 3 is a view illustrating the direction of blurs according to the position in an image. When the optical system illustrated in FIG. 1 is utilized, when the aperture becomes narrower, resolution is degraded and thus, the direction of blur tends to degrade in the radial direction, as illustrated in FIG. 3.

Subsequently, an analysis of resolution performed by inventors of the present disclosure will be described. A tendency of degradation of resolution may be analyzed in detail by taking photographs of a Siemens star in which edges are radially distributed.

Figure 4:
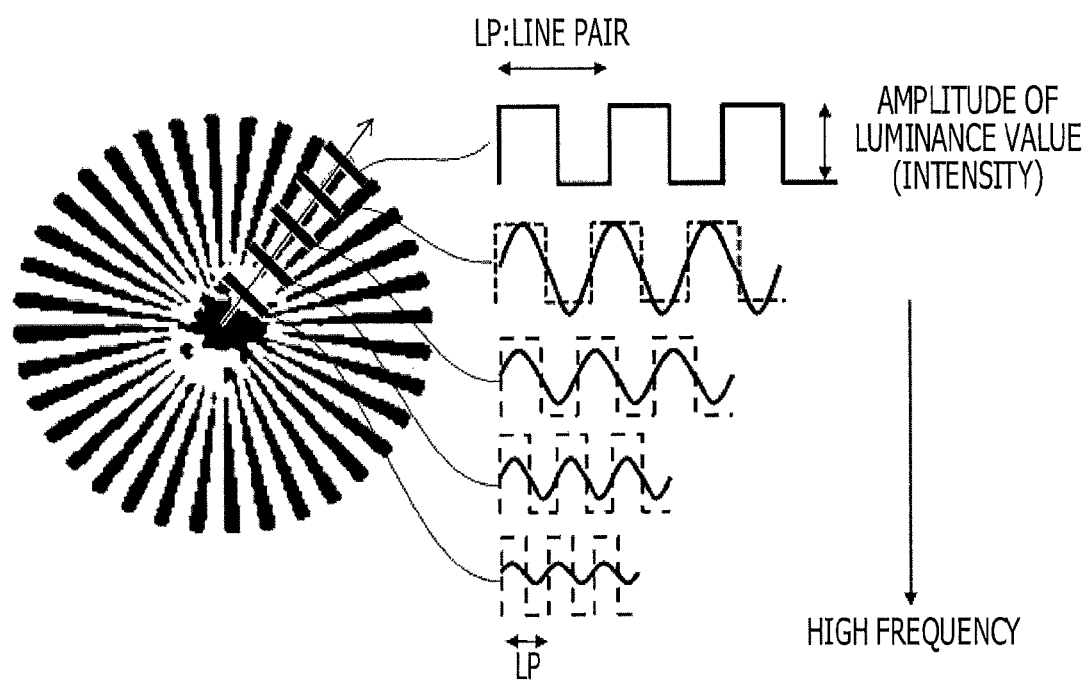
FIG. 4 is a view for explaining the resolution when a wedge-shaped chart is used.

FIG. 4 is a view for explaining a resolution when a wedge-shaped chart is used. In an example illustrated in FIG. 4, plural data in the direction perpendicular to a direction indicated by an arrow are acquired in order to measure the resolutions in the arrow direction. When a wedge-shaped Siemens star illustrated in FIG. 4 is used, as it goes from an end portion to a central portion, the width of line becomes more narrowed and line pairs per pixel is more increased. The central portion indicates high frequency components. In addition, the amplitude (Intensity) of luminance value is more decreased as it goes from the end portion to the central portion.

As illustrated in FIG. 4, a subject which is widening radially, for example, a wedge-shaped subject may be used and thus, the resolution may be analyzed according to a direction (MTF: Modulation Transfer Function).

Figure 5:
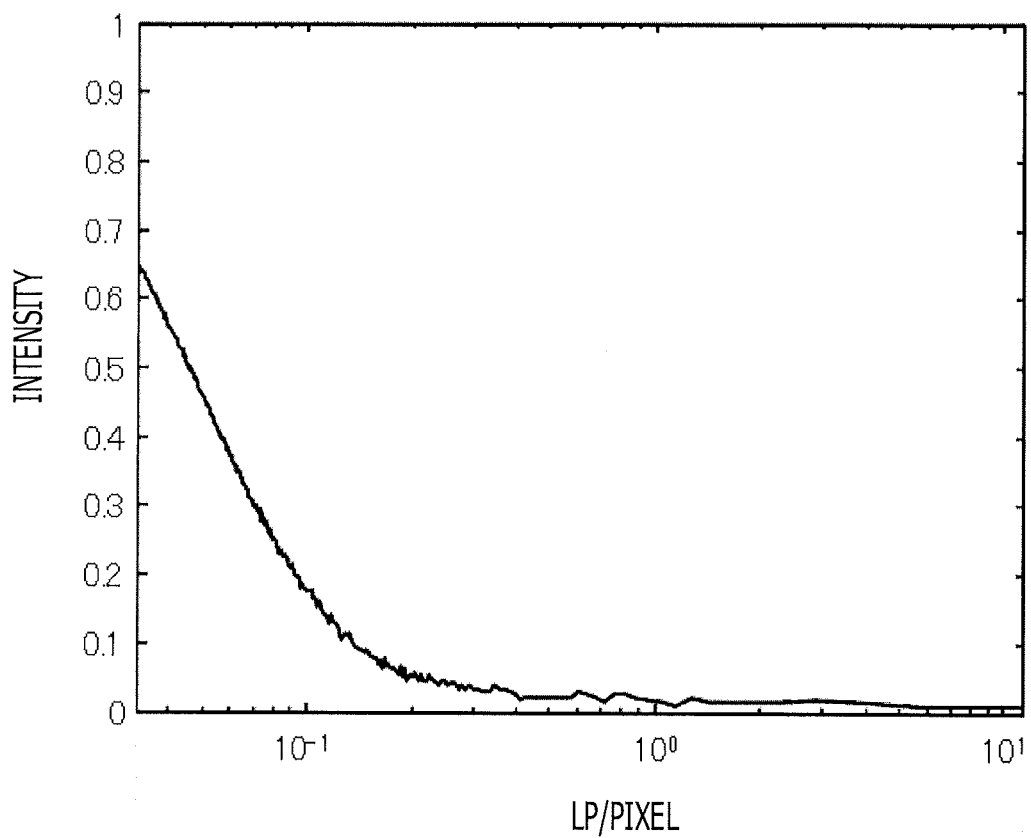
FIG. 5 is a view illustrating a resolution measurement result measured using the wedge-shaped chart.

FIG. 5 is a view illustrating a resolution measurement result measured using the wedge-shaped chart. FIG. 5 illustrates a graph in which the resolution is measured in the direction illustrated in FIG. 4. A longitudinal axis illustrated in FIG. 5 indicates amplitude of luminance values and a transversal axis indicates line pairs (LP) per pixel. A form (MTF) can be seen from the analysis that the amplitude becomes more smaller as it goes to the central portion and the resolution becomes more degraded as it goes toward higher frequency components (right direction in the transversal axis).

Figure 6:
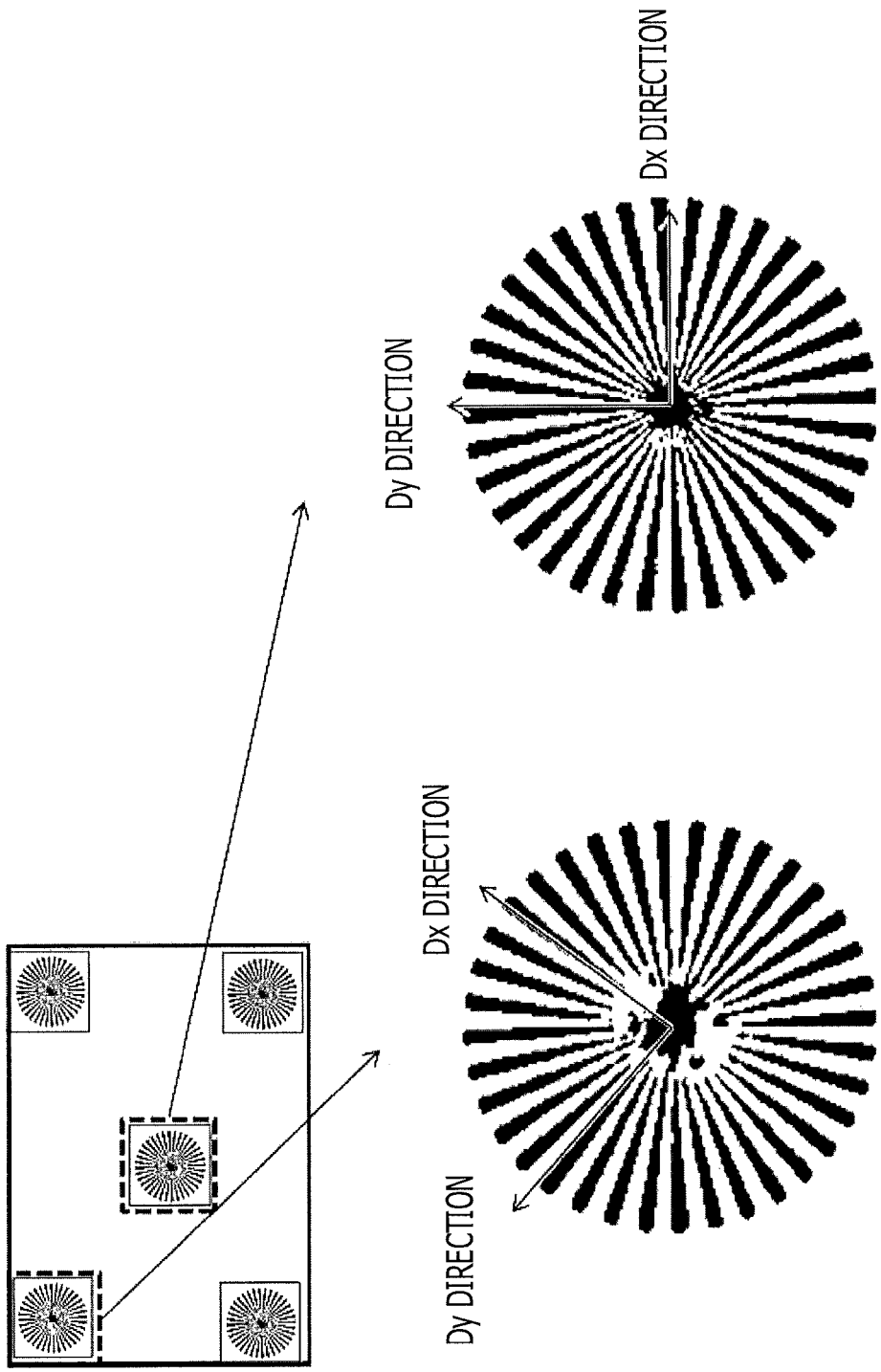
FIG. 6 is a view illustrating degradation according to the position in a photographed image.

FIG. 6 is a view illustrating the degradation of an image according to a position in the photographed image. In an example illustrated in FIG. 6, when plural sheets of the Siemens star are arranged in parallel and photographed, the degradation of resolution at the end portion may be analyzed. In an example illustrated in FIG. 6, the Dx direction and the Dy direction indicate a circumferential direction and a radial direction, respectively. These definitions of the Dx direction and the Dy direction are also applied to FIG. 7 to FIG. 85.

It may be seen from the analysis result illustrated in FIG. 6 that not only the resolution is degraded but also the anisotropy in resolution occurs in the periphery including the end portion of the image. When the resolution of the Siemens stars are compared, the dependence of an angle exists little in the central portion but, the dependence of an angle exists in the end portion.

Figure 7:
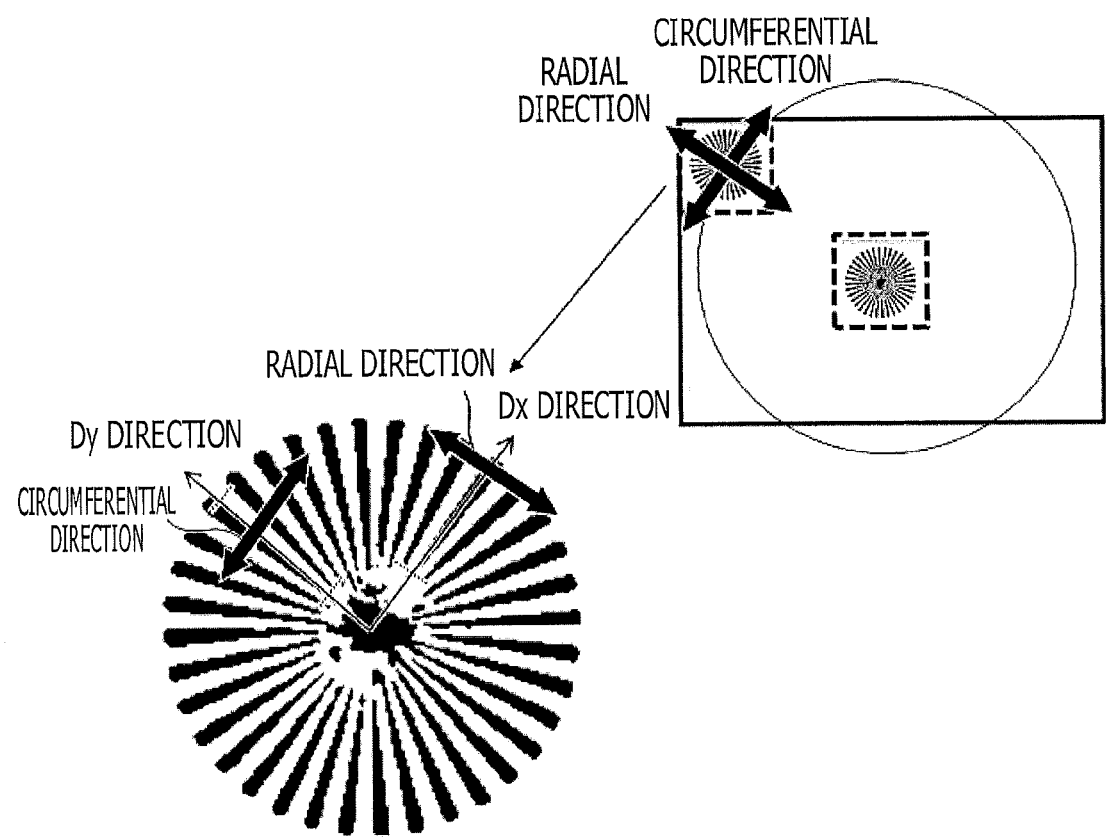
FIG. 7 is a view illustrating an example of a wedge-shaped chart of an end portion in the photographed image.

FIG. 7 is a view illustrating an example of a wedge-shaped chart for an end portion of a photographed image. With respect to the wedge-shaped chart illustrated in FIG. 7, the resolution is analyzed in a direction (radial direction) perpendicular to the Dx direction, and a direction (circumferential direction) perpendicular to the Dy direction.

Figure 8:
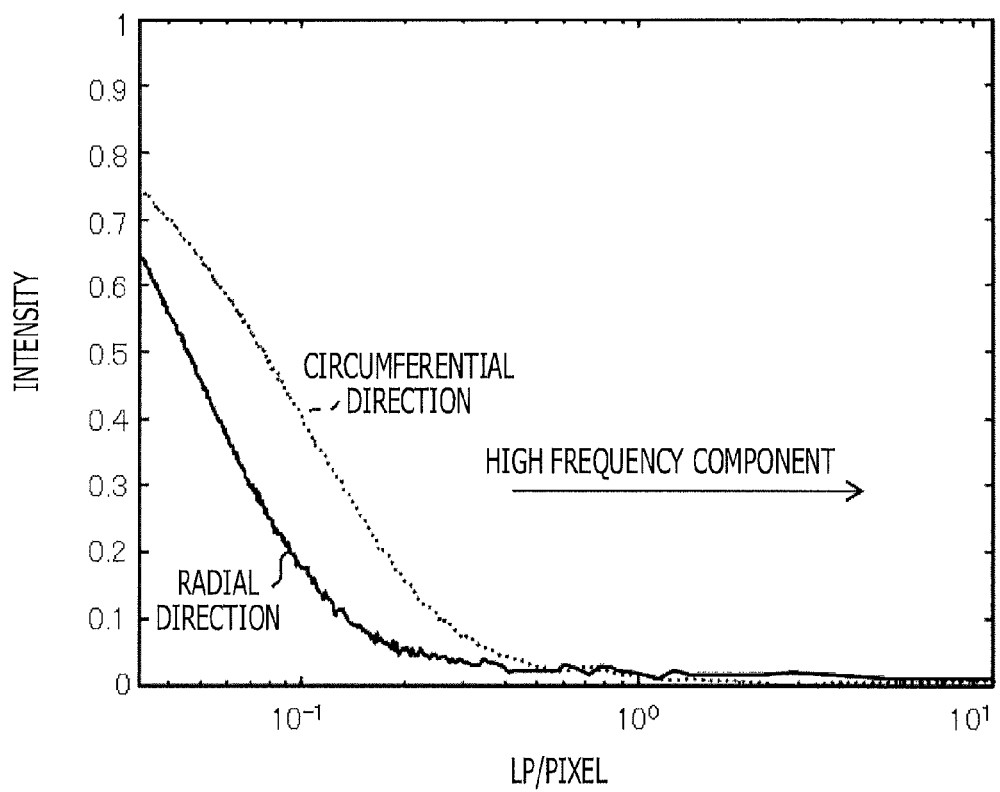
FIG. 8 is a view illustrating a resolution analysis result for the wedge-shaped chart illustrated in FIG. 7.

FIG. 8 is a view illustrating a resolution analysis result analyzed for the wedge-shaped chart illustrated in FIG. 7. As illustrated in FIG. 8, the resolution in the radial direction is more degraded than in the circumferential direction. Accordingly, it may be seen that the anisotropy in the resolution occurs in the end portion of the image and the resolution may also be quantitatively measured.

Figure 9:
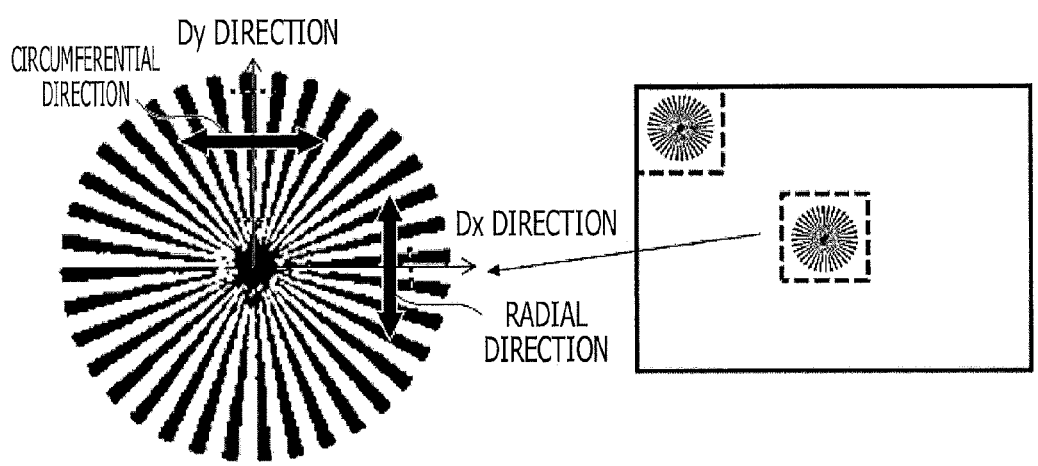
FIG. 9 is a view illustrating an example of a wedge-shaped chart for a central portion of the photographed image.

FIG. 9 is a view illustrating an example of a wedge-shaped chart for a central portion of the photographed image. Regarding the wedge-shaped chart illustrated in FIG. 7, anisotropy resolution is analyzed in a direction perpendicular to the Dx direction (radial direction), and a direction perpendicular to the Dy direction (circumferential direction).

Figure 10:
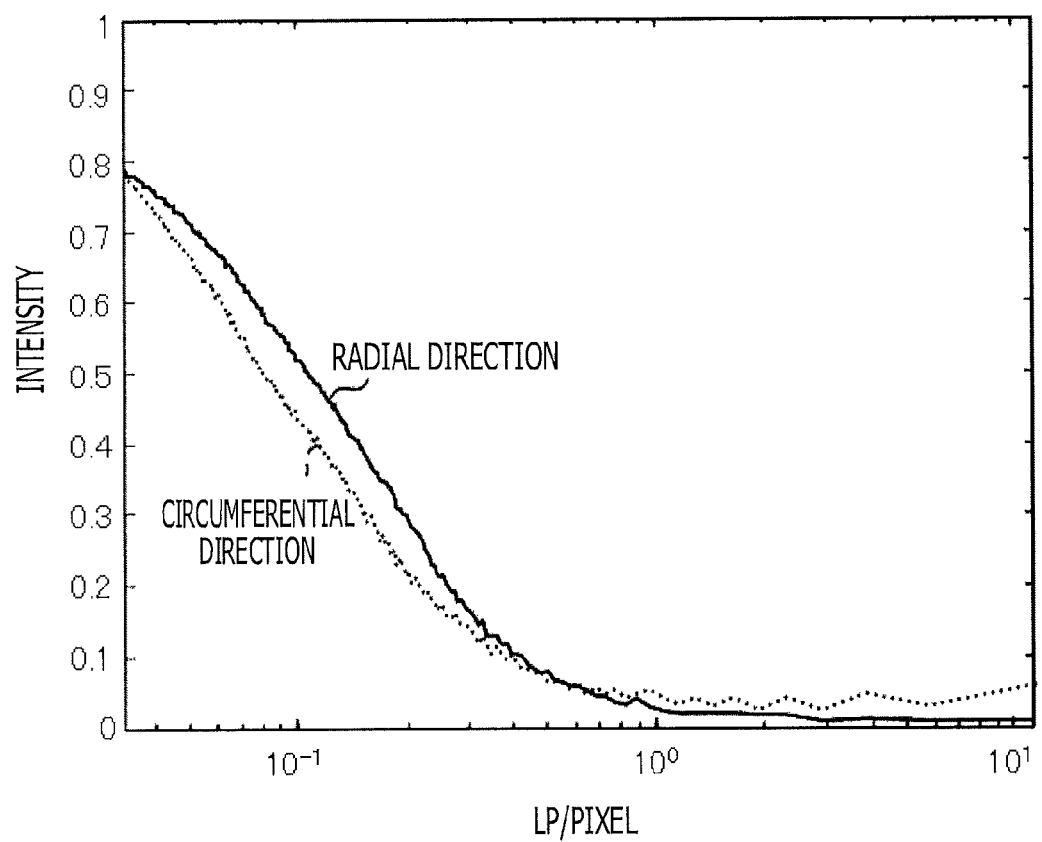
FIG. 10 is a view illustrating a resolution analysis result for the wedge-shaped chart illustrated in FIG. 9.

FIG. 10 is a view illustrating a resolution analysis result analyzed for the wedge-shaped chart illustrated in FIG. 9. As illustrated in FIG. 10, there is little difference between the resolutions in the radial direction and the resolution in the circumferential direction. Accordingly, anisotropy in resolution is not seen in the central portion of image.

Here, there is a correction method which utilizes a point spread function (PSF) in order to correct blur including degradation of resolution as described above. The PSF is, for example, a function representing blur. Hereinafter, the function representing blur is also referred to as a blur function.

When it is assumed that an original image is x and the PSF is k, the blur image y is an image obtained by convolving x with k, and is represented as the following equation (1).

$$y = k \otimes x \tag{1}$$

where $\otimes$ is a symbol of convolution.

Actually, noise n is included, but omitted here in order to simplify the description.

When the equation (1) is Fourier-transformed, the equation (1) is transformed into the following equation (2).

$$Y(\omega) = K(\omega)X(\omega) \tag{2}$$

where $\omega$ represents the spatial frequency.

Subsequently, when it is intended to simply obtain the inverse filter $K_{inv}$, the inverse filter $K_{inv}$ is obtained by a reciprocal of K as represented by the following equation (3).

$$K_{inv}(\omega) = 1/K(\omega) \tag{3}$$

From this, the Fourier transform $X(\omega)$ of the original image is obtained by the following equation (4), and the following equation (4) is subjected to an inverse Fourier transform to calculate the original image.

$$X(\omega) = K_{inv}(\omega)Y(\omega) \tag{4}$$

As described above, when the PSF is Fourier-transformed to calculate an inverse filter function (hereinafter, simply referred to as inverse filter) using the reciprocal, a division by the spatial frequency is performed and thus, a zero-dividing may be performed in high frequency domain. The zero-dividing means that it is divided by a value at zero or close to zero. When the high frequency is close to zero, the reciprocal becomes an extremely high value and thus, the high frequency component of noise is emphasized.

Figure 11:
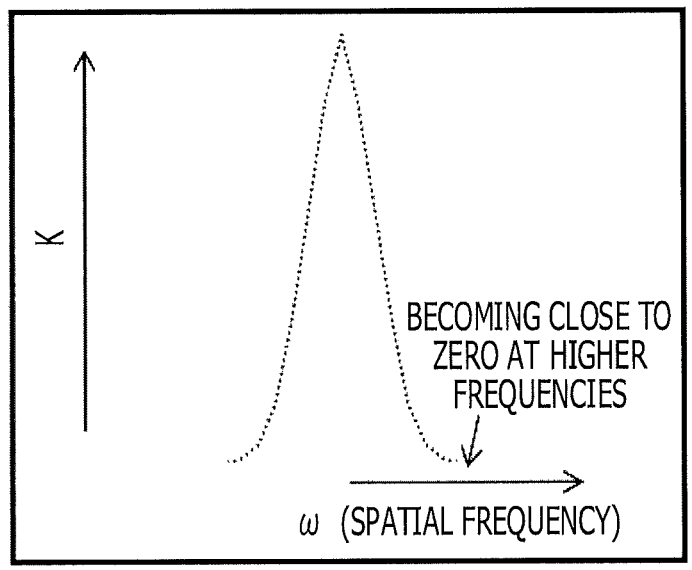
FIG. 11 is a view illustrating an example of characteristic when a blur function is Fourier-transformed.

FIG. 11 is a view illustrating an example of characteristic when the blur function is Fourier-transformed. FIG. 11 represents the $K(\omega)$, and the $K(\omega)$ becomes close to zero at higher frequencies.

Figure 12:
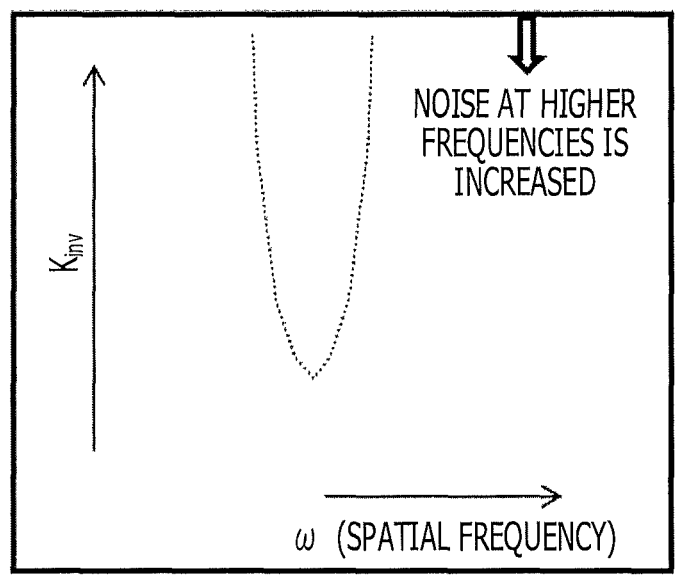
FIG. 12 is a view illustrating a reciprocal of the $K(\omega)$.

FIG. 12 is a view illustrating the reciprocal of the $K(\omega)$. FIG. 12 represents $K_{inv}$ according to the equation (3). For example, the denominator is close to zero at higher frequencies and thus, the noise at higher frequencies is increased.

Therefore, a correction term is inserted into the denominator as represented in the following equation (5) to prevent the noise at higher frequencies from being emphasized in order to reduce noise at higher frequencies.

$$K_{inv}(\omega) = 1/(K(\omega) + \lambda) \tag{5}$$

Since the inverse filter is a complex number, the inverse filter is represented by the following equation (6) using conjugate complex number.

$$K_{inv}(\omega) = \overline{K(\omega)}/(K(\omega)\overline{K(\omega)} + \lambda\overline{\lambda}) \tag{6}$$

where $\overline{K(\omega)}$: is a conjugate complex number.

Figure 13:
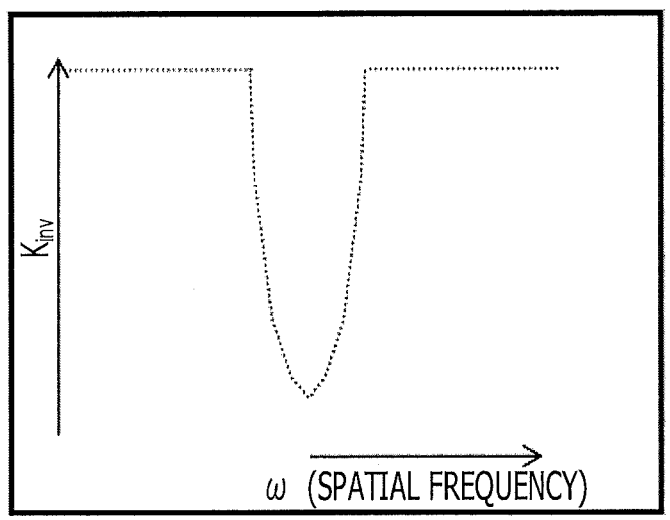
FIG. 13 is a view illustrating an inverse filter when a predetermined value is added to the denominator.
Figure 14:
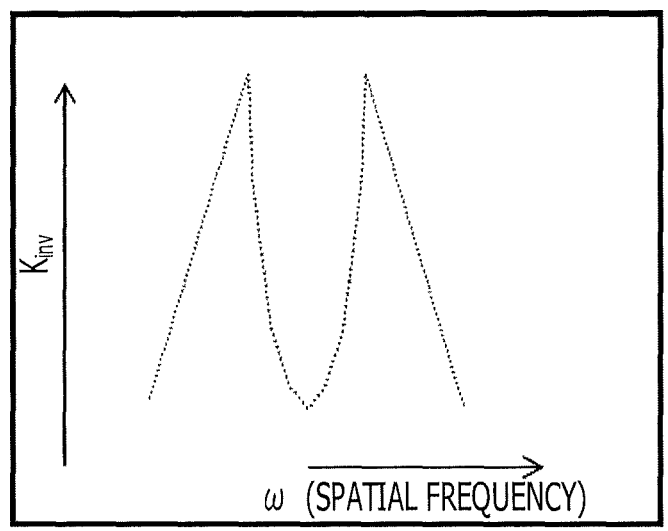
FIG. 14 is a view illustrating an inverse filter in a case where gain has gradually dropped at higher frequencies.

FIG. 13 is a view illustrating an inverse filter when a predetermined value is added to the denominator. FIG. 14 is a view illustrating an inverse filter when gain has been gradually dropped at higher frequencies. As illustrated in FIG. 13 or FIG. 14, weights are applied to each frequency component to reduce noise.

Figure 15:
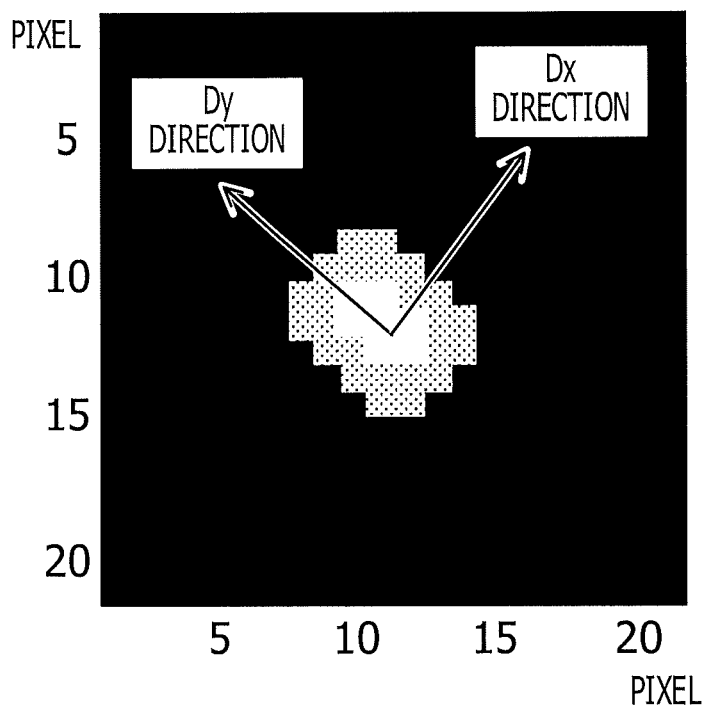
FIG. 15 is a view illustrating an example of an elliptical PSF.

Here, a case where the PSF is an ellipsis is considered. FIG. 15 is a view illustrating an example of an elliptical PSF. In the example illustrated in FIG. 15, the resolution in the Dy direction is poorer than the resolution in the Dx direction. That is, the resolution in the Dy direction is further degraded than the resolution in the Dx direction.

The PSF of ellipse represented by $k(r,\theta)$. The "r" represents a radius and $\theta$ represents a direction. For example, the PSF of an ellipse is represented by a function of the radius "r" and the direction $\theta$. When the PSF of an ellipse is Fourier-transformed, $K(w,\theta) = fk(r,\theta)$. The "f" represents Fourier transform. For example, the $K(w,\theta)$ after Fourier transform is a function of a spatial frequency $\omega$ and the direction $\theta$.

Figure 16:
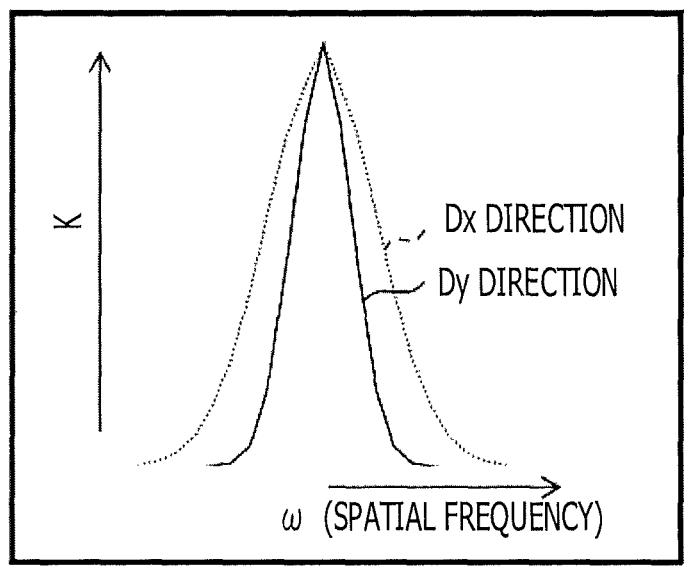
FIG. 16 is a view illustrating an example of characteristic when an elliptical blur function is Fourier-transformed.

FIG. 16 is a view illustrating an example of characteristic when an elliptical blur function is subjected to Fourier transform. FIG. 16 utilizes the blur function of FIG. 15 and the characteristics of the blur function are different according to the direction $\theta$. As illustrated in FIG. 16, it may be seen that the characteristic in the Dx direction is different from that in the Dy direction having a poorer resolution.

Figure 17:
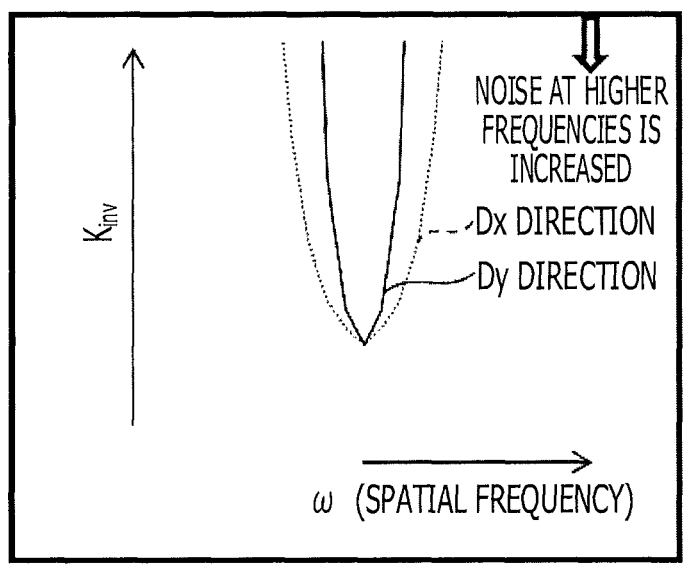
FIG. 17 is a view illustrating a reciprocal of the $K(\omega,\theta)$.

FIG. 17 is a view illustrating the reciprocal of the $K(w,\theta)$. FIG. 17 represents $K_{inv}$ represented by the following equation (7). For example, the denominator is close to zero at higher frequencies and thus, the noise at higher frequencies is increased.

$$K_{inv}(\omega,\theta) = 1/K(\omega,\theta) \tag{7}$$

Therefore, a correction term is inserted into the denominator to prevent the noise at higher frequencies from being emphasized in order to reduce the noise at higher frequencies. The following equation (8) represents the inverse filter which reduces a high frequency component of noise.

$$K_{inv}(\omega,\theta) = \overline{K(\omega,\theta)}/(K(\omega,\theta)\overline{K(\omega,\theta)} + \lambda\overline{\lambda}) \tag{8}$$

Figure 18:
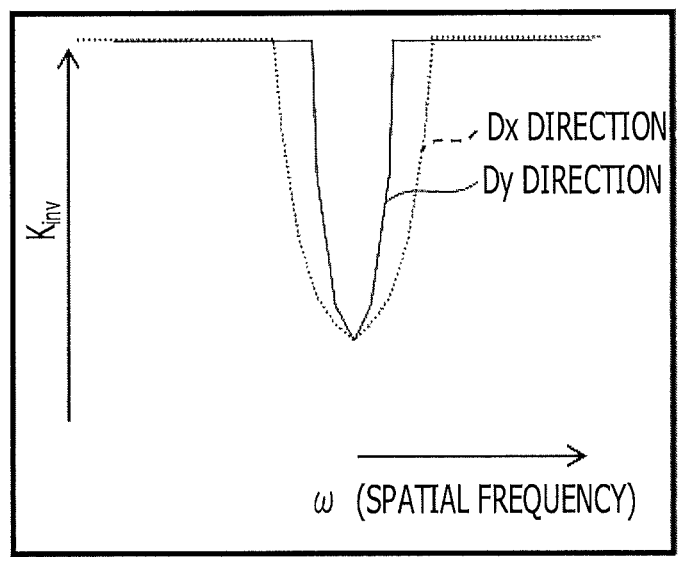
FIG. 18 is a view illustrating an inverse filter when a predetermined value is added to the denominator.
Figure 19:
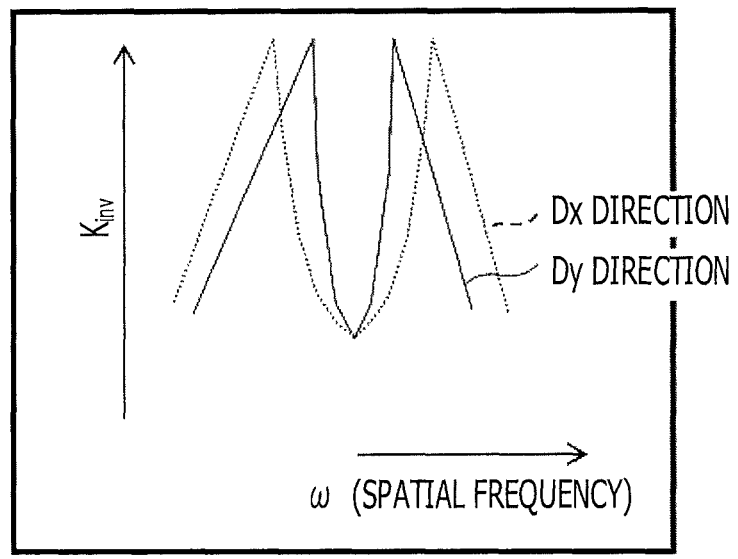
FIG. 19 is a view illustrating an inverse filter in a case where gain has gradually dropped at higher frequencies.

FIG. 18 is a view illustrating an inverse filter when a predetermined value is added to the denominator. FIG. 19 is a view illustrating an inverse filter when gain has been gradually dropped at higher frequencies. As illustrated in FIG. 18 or FIG. 19, weights are applied to each frequency component to reduce noise.

Even when the blur function (e.g., PSF) is an elliptical shaped function, a high frequency component of noise is reduced by a corrected weight (A). However, when the correction using the weight is performed, the resolution in a direction along which the resolution is poor (e.g., Dy direction) may not be corrected and improved. Accordingly, the anisotropy in resolution may not be improved only by simply applying weighting. Therefore, the inventors found out that the anisotropy in resolution may be improved by calibrating an appropriate weight function according to a direction.

Figure 20:
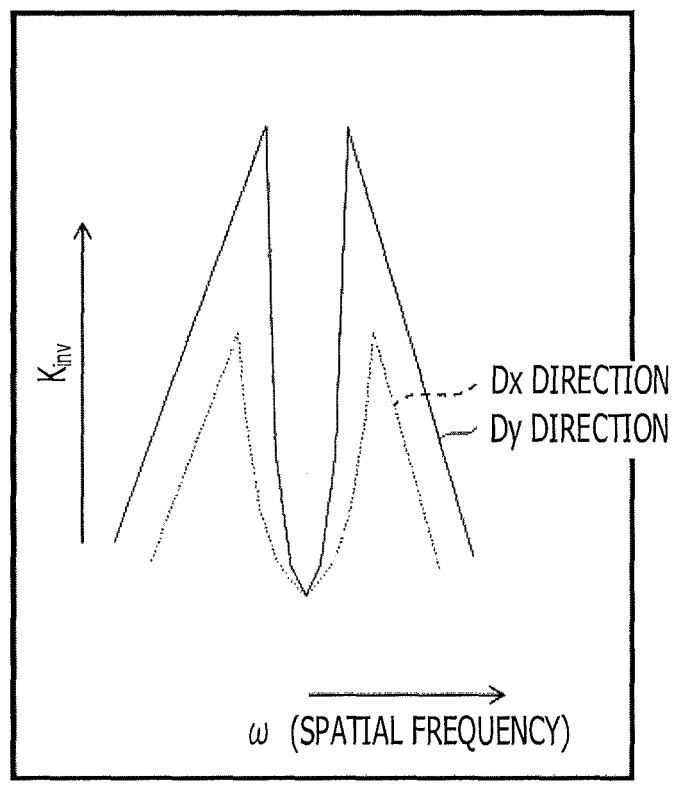
FIG. 20 is a view illustrating an exemplary inverse filter in order for improving anisotropy in resolution.

FIG. 20 is a view illustrating an exemplary inverse filter for improving the anisotropy in resolution. In the example illustrated in FIG. 20, the gain has been gradually dropped at higher frequencies but improvement of resolution in the Dy direction having poorer resolution is further emphasized.

Subsequently, description will be made with respect to the generation of the spatial filter for improving the anisotropy in resolution. An apparatus will be described using a method in which gain has been gradually dropped as illustrated in FIG. 20, but is not limited to the method. For example, even a method in which a predetermined value is added, as in FIG. 13, the anisotropy in resolution may be improved. In this method, a predetermined value is added such that the Dy direction is more emphasized than the Dx direction.

<Spatial Filter Generation Apparatus>

Generation of the spatial filter for improving anisotropy in resolution will be described first.

<Configuration>

Figure 21:
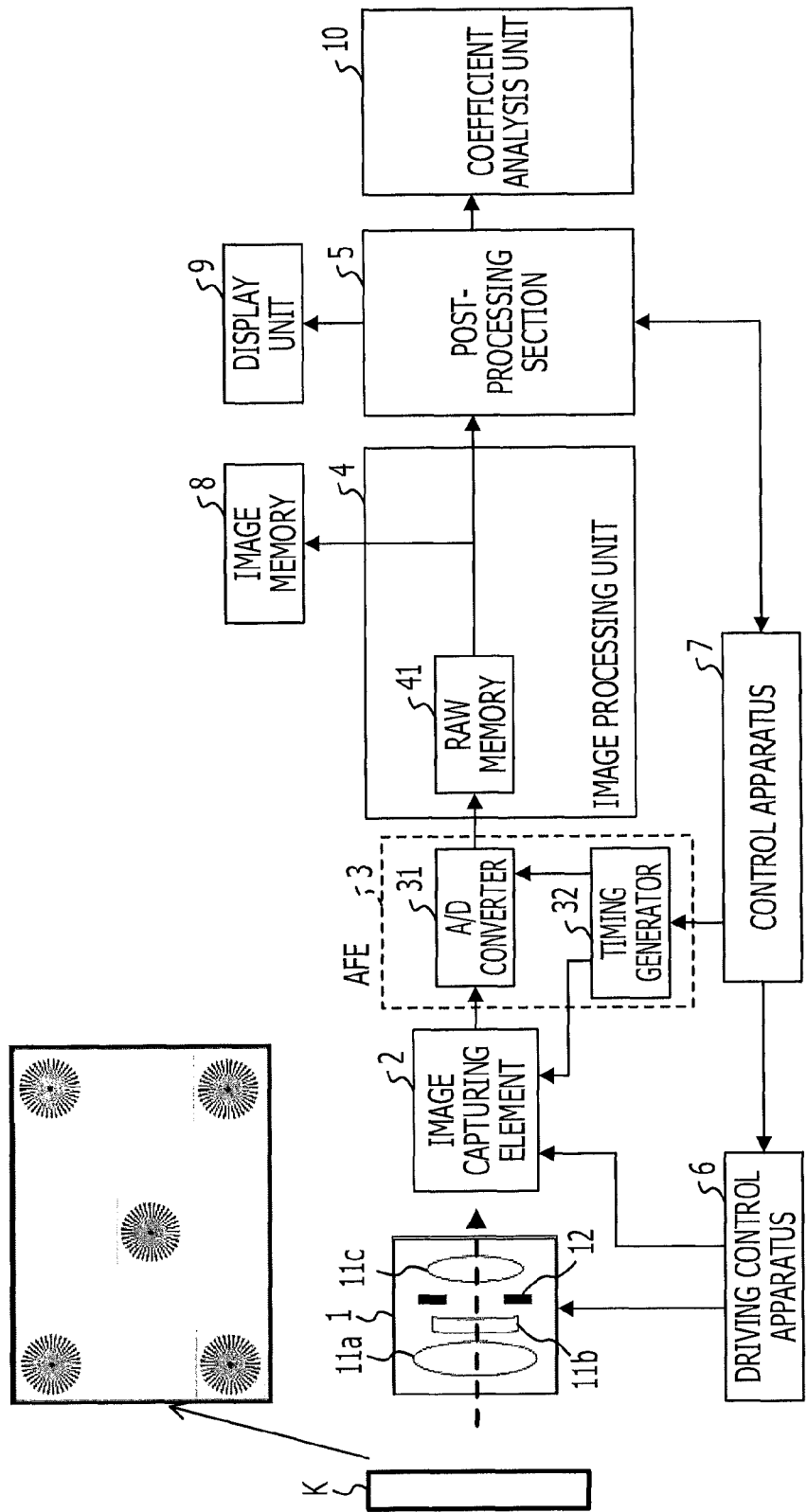
FIG. 21 is a block diagram illustrating an exemplary schematic configuration of an image capturing apparatus including a spatial filter generation device.

FIG. 21 is a block diagram illustrating an exemplary schematic configuration of an image capturing apparatus including a spatial filter generation device. An image capturing apparatus illustrated in FIG. 1 includes an optical system 1, an image capturing element 2, an AFE (Analog Front End) 3, an image processing unit 4, a post-processing unit 5, a driving control apparatus 6, a control apparatus 7, an image memory 8, a display unit 9 and a coefficient analysis unit 10.

An optical system 1 condenses light from a subject (K) having a radial shape onto a surface on which image is captured. For example, the optical system 1 includes lenses 11a, 11b, 11c and a diaphragm 12. The lenses 11a, 11b, 11c and the diaphragm 12 condense light from the subject (K) onto the image capturing surface of the image capturing element 2 to image the subject. The driving control apparatus 6 is able to control, for example, a location of the lenses 11a, 11b, 11c or a degree of narrowing of the diaphragm 12. In the meantime, a configuration of the optical system 1 is not limited to a particular configuration.

The image capturing element 2 converts light from the subject (K) condensed by the optical system to electrical signal (analog signal). The image capturing element 2 includes, for example, a two-dimensional image capturing element such as a CCD/CMOS, and the two-dimensional image capturing element converts an image of the subject into electrical signal (image signal) and output the converted signal to the AFE 3.

The AFE 3 converts the analog signal of the captured image into digital signal. The AFE 3 includes, for example, an A/D (analog-to-digital) converter 31 and a timing generator 32. The timing generator 32 generates a timing pulse used for driving the image capturing element 2 based on control signal from the control apparatus 7 and outputs the timing pulse to the image capturing element 2 and the A/D converter 31.

The image processing unit 4 maintains an image of the digital signal to perform a predetermined image processing on the image. The image processing unit 4 includes, for example, a RAW memory 41 in which an image (RAW image) is converted into the digital signal by the A/D converter 31. The image processing unit 4 may perform a predetermined processing on the RAW image. The image on which the predetermined processing is performed is recorded in the image memory 8.

The post-processing unit 5 performs further necessary processing on the image undergone a predetermined processing to generate a display image. The post-processing unit 5 reads, for example, the image undergone a predetermined processing from the image memory 8 to perform a necessary processing and generates an image for displaying to output the image to the display unit 9.

The image memory 8 stores an image after the predetermined processing. The display unit 9 includes, for example, a VRAM in which an image is recorded and a display which outputs an image of the VRAM. In the meantime, an image capturing apparatus may not necessarily include a display function, and may be provided with a recording unit (e.g., VRAM) in which image for displaying is recorded instead of the display unit 9.

The driving control apparatus 6 controls the optical system 1. The control apparatus 7 controls the AFE 3 and the post-processing unit 5.

The coefficient analysis unit 10 analyzes the resolution in each direction in each image position from the image for which the chart is photographed to determine an appropriate filter data for improving the anisotropy in resolution. Details of the coefficient analysis unit 10 will be described later.

The filter data may be formed with a set of parameters necessary for filtering for an image correction similarly to, for example, a de-convolution kernel. Specifically, the de-convolution kernel may be represented using an area in which a circular or an elliptical shaped subject image according to the PSF is distributed and data (these data referred to as de-convolution distribution) which indicates weight of each pixel in the area.

(Inverse Filter)

The inverse filter utilized in the embodiment will be described. Hereinafter, a calculation sequence of the inverse filter which improves anisotropy in resolution, for example, performs adjustment for a direction along which resolution is poor. Further, the inverse filter is also simply referred to as a filter.

As represented by the equation (1), the original image "x", a PSF "k" and the blur image "y" are considered. When the original image "x" is obtained, if the following equation (9) becomes a minimum in inverse problem, an image close to the original image may be obtained.

$$\|y - k \otimes x\|^2 \tag{9}$$

Normally, a type of regularization term is applied in solving the inverse problem. Accordingly, the inverse problem is solved from the following equation (10) in which a regularization term is added.

$$\|y - k \otimes z\|^2 + \epsilon E(x) \tag{10}$$

In the corresponding problem, directionality is needed and thus, derivative term of a transversal direction (horizontal direction) and a derivative term in a longitudinal direction (perpendicular direction) of image as represented is added as a regularization term in the following equation (11).

$$\|y - k \otimes x\|^2 + \epsilon \{\|d_m \otimes x\|^2 + \|d_n \otimes x\|^2\} \tag{11}$$

where $\epsilon$ represents a weight coefficient, and $d_m$ and $d_n$ represent derivative filters in the direction of matrix. Here, the $d_m$ is $d_m[-1\ 1]$ and the $d_n$ is $$d_n = \begin{bmatrix} -1 \\ 1 \end{bmatrix}.$$

It is needed to make a result obtained by performing a partial differentiation of the equation (11) with "x" zero in order to make the equation (11) described above minimum. Also, when the equation (11) is Fourier-transformed and solved for the $X(\omega)$, the following equation (12) may be obtained.

$$X(\omega) = \frac{K(\omega)Y(\omega)}{K(\omega)^2 + \varepsilon\{D_m(\omega)^2 + D_n(\omega)^2\}} \quad (12)$$

where $X(\omega)$, $Y(\omega)$, $K(\omega)$, $Dm(\omega)$, $Dn(\omega)$ represent x, y, k, $d_m$, $d_n$, respectively.

The inverse filter $K_{inv}(\omega)$ in frequency domain satisfies the following equation (13).

$$X(\omega) = K_{inv}(\omega)Y(\omega) \quad (13)$$

Accordingly, the inverse filter $K_{inv}(\omega)$ satisfies the following equation (14).

$$K_{inv}(\omega) = \frac{K(\omega)}{K(\omega)^2 + \varepsilon\{D_m(\omega)^2 + D_n(\omega)^2\}} \quad (14)$$

When a conjugate complex number is used, the above equation (14) is represented as the following equation (15).

$$K_{inv}(\omega) = \frac{\overline{K(\omega)}}{K(\omega)\overline{K(\omega)} + \varepsilon\{D_m(\omega)\overline{D_m(\omega)} + D_n(\omega)\overline{D_n(\omega)}\}} \quad (15)$$

where $\overline{K(\omega)}$ is a conjugate complex number.

It is characterized in the embodiment that an axis of derivative coefficient is rotated in a direction with an angle of θ using a rotation matrix in order to adjust resolution in a direction along which resolution is poor, as represented in the following equations (16) and (17).

$$D_X(\omega,\theta) = D_m(\omega)\cos\theta - D_n(\omega)\sin\theta \quad (16)$$

$$D_Y(\omega,\theta) = D_m(\omega)\sin\theta + D_n(\omega)\cos\theta \quad (17)$$

As described above, the inverse filter may be made to have a directionality by using the rotation matrix.

Figure 22:
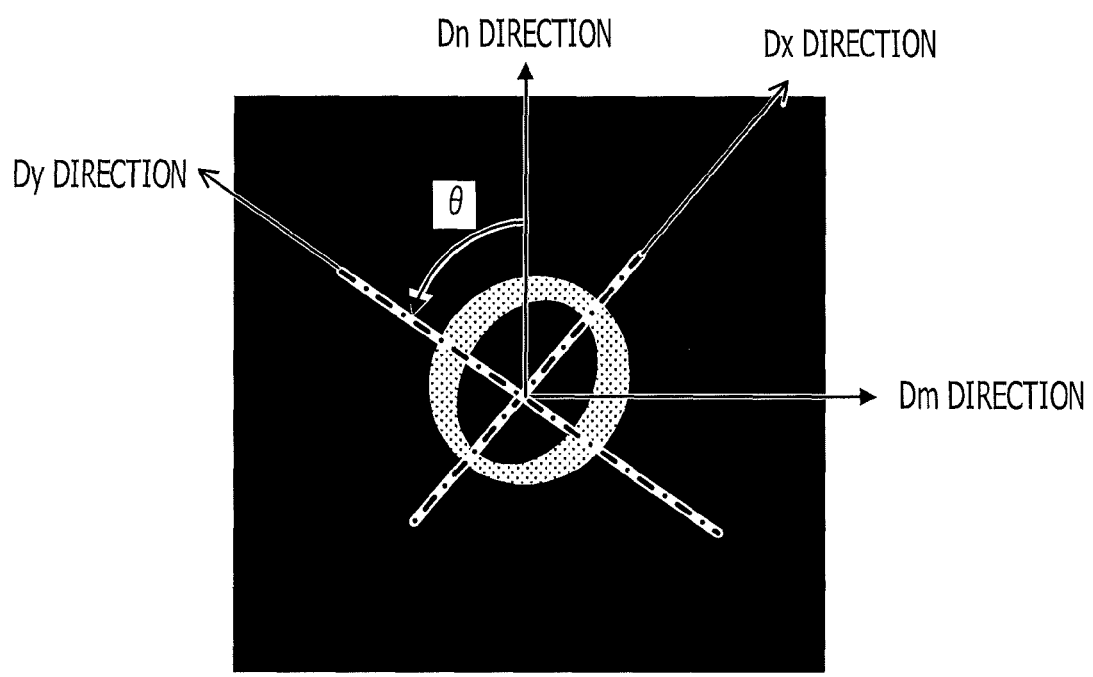
FIG. 22 is a view explaining rotation.

FIG. 22 is a view explaining a rotation. In an example illustrated in FIG. 22, the Dy direction is formed by rotating the Dn direction by "θ", and the Dx direction is formed by rotating the Dm direction by the angle of θ.

The elliptical PSF is defined as k(r,θ) here, and the elliptical PSF having been Fourier-transformed is defined such that $K(\omega,\theta) = fk(r,\theta)$. When a weight γ according to a direction is set while the equation (16), the equation (17) and the $K(\omega,\theta)$ are substituted in the equation (15), the following equation (18) is implemented.

$$K_{inv}(\omega,\theta) = \frac{\overline{K(\omega,\theta)}}{K(\omega,\theta)\overline{K(\omega,\theta)} + \varepsilon\{D_X(\omega,\theta)\overline{D_X(\omega,\theta)} + \gamma D_Y(\omega,\theta)\overline{D_Y(\omega,\theta)}\}} \quad (18)$$

where, γ is a weight coefficient according to the direction of the inverse filter and ε is an weight coefficient.

With the equation (18), it becomes possible to perform a weight adjustment for the directionality of the inverse filter utilized in each embodiment. For example, the coefficient analysis unit 10 adjusts the weight γ for the direction (Dy direction) along which resolution is poor. The weight coefficient γ is made to be smaller and thus, the resolution in the direction along which the resolution is poor may be improved.

Figure 23:
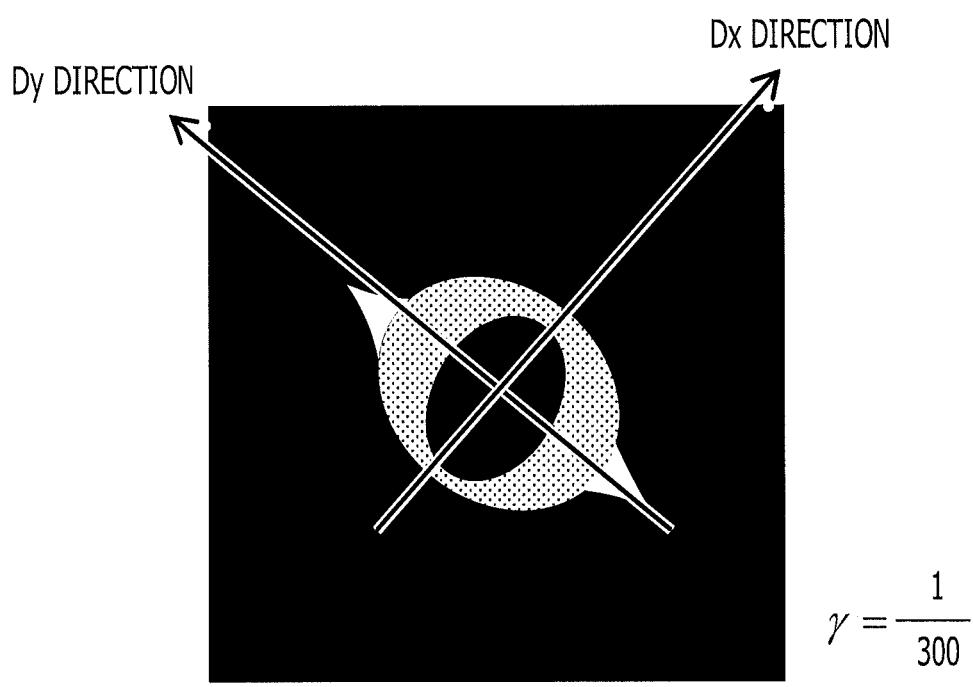
FIG. 23 is a view illustrating an example of two-dimensional spatial frequency distribution of an inverse filter $K_{inv}$.

FIG. 23 is a view illustrating an example of two-dimensional spatial frequency distribution of an inverse filter $K_{inv}$. An example illustrated in FIG. 23 illustrates an example of two dimensional distribution in a case where γ=1/300. The weight coefficient γ, ε (especially, γ) is determined in such a manner that the resolution in the Dy direction is further improved than the resolution in the Dx direction.

Figure 24:
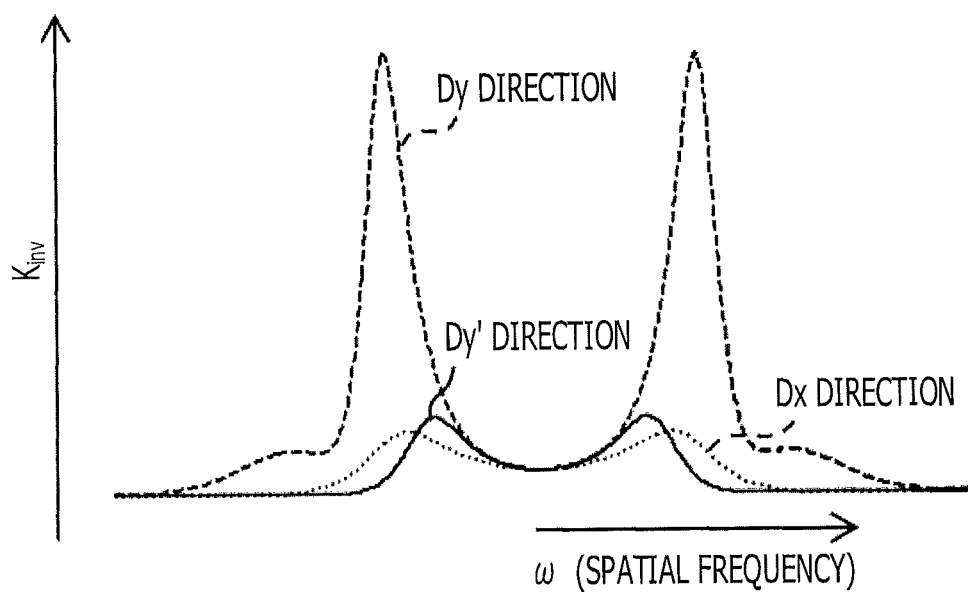
FIG. 24 is a view illustrating an example of distribution along the spatial frequency direction of the inverse filter $K_{inv}$.

FIG. 24 is a view illustrating an example of distribution along a spatial frequency direction of the inverse filter $K_{inv}$. In FIG. 24, the weight coefficient for the Dy direction is made smaller such that improvement of resolution in the Dy direction may be emphasized. Further, Dy' illustrated in FIG. 24 represents distribution for γ=1. Accordingly, according to the embodiment, the weight coefficient by which filter parameters of the inverse filter are multiplied may be allowed to have anisotropy.

(Coefficient Analysis Unit)

Subsequently, the coefficient analysis unit 10 will be described. The coefficient analysis unit 10 determines a spatial filter for improving anisotropy in resolution.

Figure 25:
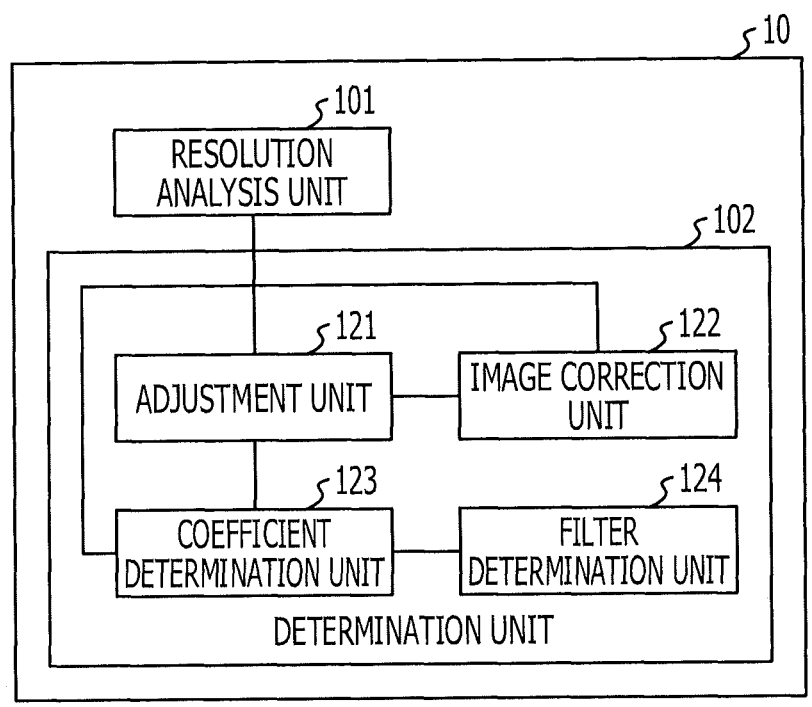
FIG. 25 is a block diagram illustrating an exemplary function of a coefficient analysis unit.

FIG. 25 is a block diagram illustrating an example of a function of a coefficient analysis unit 10. The coefficient analysis unit 10 illustrated in FIG. 25 includes a resolution analysis unit 101 and a determination unit 102. The coefficient analysis unit 10 performs a coefficient analysis on an image for which a chart image is photographed first. In an example described in below, the coefficient analysis is performed, for example, on a wedge-shaped image located at upper left for which the chart image is photographed first.

The resolution analysis unit 101 analyzes the degradation of resolution of the image in which the subject having a radial shape is captured at least at two directions. The analysis method uses a method described in, for example, FIG. 4 and FIG. 5. When the line pairs per pixel is defined in a transversal axis, and the intensity of amplitude is defined in a longitudinal axis, the resolution analysis unit 101 may analyze MTF. The lines pairs per pixel may use line pairs per unit distance at a location of the subject. A chart having a wedge shape as well as radial shape is used and thus, the MTF according to a direction may be analyzed as illustrated in FIG. 5 in the embodiment.

Figure 26:
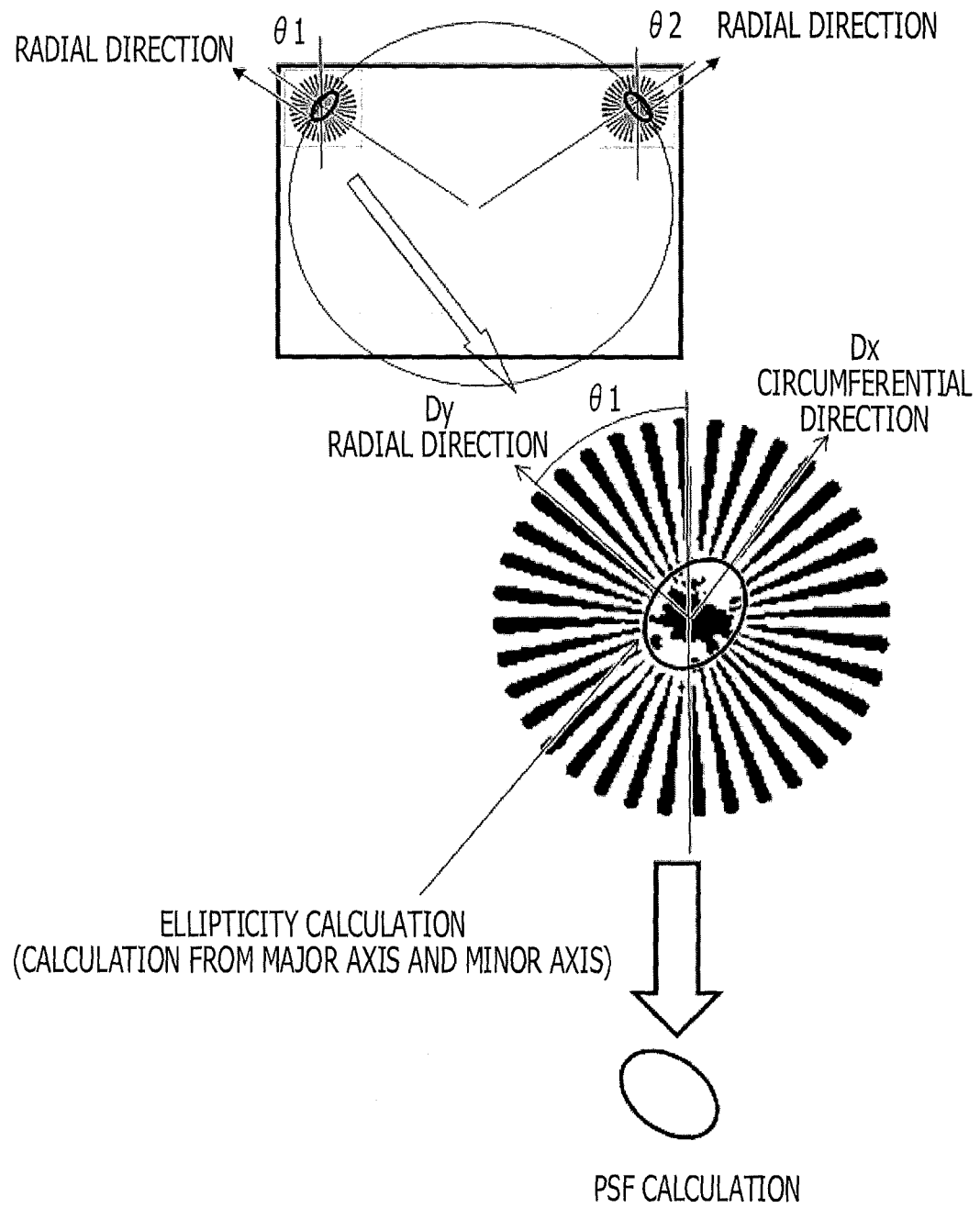
FIG. 26 is a view explaining a calculation sequence of the PSF.

FIG. 26 is a view explaining a calculation sequence of the PSF. In the example illustrated in FIG. 26, first, the determination unit 102 calculates an angle and an ellipticity according to a position in the image. The determination unit 102 may obtain an ellipsis when contour lines of a constant threshold value (about a half of maximum amplitude) are plotted in the MTF calculated for each predetermined angle.

The determination unit 102 may calculate an ellipticity using a major axis and a minor axis obtained. The determination unit 102 calculates the angle θ1 geographically based on the position in the image. Further, the determination unit 102 may calculate the angle θ1 using the major axis and the minor axis of the ellipsis of resolution. An angle may be calculated in line with an actual blur state in the calculation of the angle θ1 using the major axis and the minor axis. Here, when a concentric circle is plotted from a center of optical axis, the blur in the radial direction is large, as illustrated in FIG. 3.

The determination unit 102 only needs to calculate, for example, an angle between a longitudinal direction and the radial direction. In the meantime, the center of an optical axis is basically the center of an image, but the center of the optical axis may be misaligned due to the offsetting of lens. The determination unit 102 determines the PSF using the ellipticity and the angle calculated. An ellipsis of the determined PSF is rotated by 90 degrees from an ellipsis obtained from the contour lines of the MTF.

Referring back to FIG. 25, the determination unit 102 determines filter data having anisotropy of the inverse filter with respect to the image corrected by the filter (e.g., the inverse filter described above) according to the blur function (PSF) of the image, based on the resolution analysis result for the image after correction.

Further, the determination unit 102 changes and determines the weight coefficient (for example, γ) with respect to the derivative direction of the image. For example, the weight coefficient of the Dx direction is set to 1 (one) and the weight coefficient of the Dy direction is set to the weight coefficient γ to change the γ. Accordingly, the anisotropy in resolution may be improved.

Further, the determination unit 102 rotates (the image) (e.g., θ) with respect to the derivative direction to determine the weight coefficient. Accordingly, a direction along which the resolution is poor may be detected and thus a filtering of an image may be made.

Specifically, the determination unit 102 adjusts, for example, the weight coefficients ϵ and γ to determine an appropriate weight coefficient ϵ and γ. The weight coefficient γ represents the weight coefficient of filter parameters of the direction along which resolution is poor. The filter parameters of the direction along which resolution is poor are, for example, $Dy(\omega,\theta)$ with respect to the weight coefficient γ of the equation (18) and a conjugate complex number of the $Dy(\omega,\theta)$.

The determination unit 102 includes an adjustment unit 121, an image correction unit 122, a coefficient determination unit 123 and a filter determination unit 124 in order to adjust and determine the weight coefficient.

The adjustment unit 121 adjusts, for example, the weight coefficient E which does not depend on the direction and the weight coefficient γ which depends on the direction. The adjustment unit 121 sets initial values of the weight coefficients ϵ, γ and submits the initial values to the image the correction unit 122.

The image correction unit 122 performs an image correction using the weight coefficient acquired from the adjustment unit 121. The image correction unit 122 filters and corrects the image using the inverse filter indicated in the equation (18). The image correction unit 122 submits the image after correction to the resolution analysis unit 101 to analyze degradation of resolution again.

The coefficient determination unit 123 determines the weight coefficient such that the difference of degradation of resolution between two directions becomes small based on the resolution analysis result for the image after correction. The coefficient determination unit 123 maintains analysis results of the image corrected by various weight coefficients and determines the weight coefficients ϵ and γ, such that a difference between the values of spatial frequency becomes minimal, for example, in a predetermined intensity of amplitude (determination process 1).

Further, the coefficient determination unit 123 may determine the weight coefficients ϵ and γ, such that the difference between the intensities of amplitude becomes minimal in the predetermined spatial frequency (determination process 2).

Plural threshold values 1 and threshold values 2 may be set and the coefficient determination unit 123 may determine the weight coefficients such that sum of squares of the differences becomes minimum. In the meantime, the coefficient determination unit 123 may determine the weight coefficients such that a predetermined difference becomes a threshold value or less preset. The threshold value may be set by, for example, a preliminary experiment.

The coefficient determination unit 123 may determine the weight coefficients such that the difference between sum of squares of the differences of resolution in two directions at a central portion of image and the sum of squares of the differences of resolution in two directions at the peripheral portion other than the central portion of image become a predetermined value or less. Further, the coefficient determination unit 123 may determine the weight coefficients such that sum of squares of the differences of resolution between the central portion of image and the peripheral portion of the image becomes minimal.

This is because, when reducing anisotropy in resolution, resolution in the central portion of the image and resolution in the peripheral portion of the image is made to equal such that the entire resolution of the image becomes equal in the directions and as a result, the quality of image may be improved.

The determination for minimization by the coefficient determination unit 123 may be calculated either by using a minimization function or by a person. The minimization function includes, for example, a simplex search method, a steepest descent method or a conjugate gradient method.

The determination unit 102 changes and adjusts the weight coefficient, obtains the inverse filter using the weight coefficient after adjustment, corrects the image using the obtained inverse filter, and determines the optimum weight coefficient based on the resolution analysis result for the image after correction. The adjustment of the weight coefficient, the calculation of the inverse filter, the correction with filtering, and the resolution analysis processing are repeated until the optimum weight coefficient is determined.

The filter determination unit 124 calculates the inverse filter $K_{inv}$ which utilizes the optimum weight coefficient determined by the coefficient determination unit 123 as in the following equation (19) and obtains the inverse filter $k_{inv}$ in spatial domain from the inverse filter $K_{inv}$ in frequency domain as in the following equation (20). Hereinafter, the inverse filter in spatial domain is referred to as a spatial filter.

$$x = k_{inv} \otimes y \tag{19}$$

$$k_{inv} = f^{-1} \frac{\overline{K(\omega,\theta)}}{K(\omega,\theta)\overline{K(\omega,\theta)} + \varepsilon\{D_X(\omega,\theta)\overline{D_X(\omega,\theta)} + \gamma D_Y(\omega,\theta)\overline{D_Y(\omega,\theta)}\}} \tag{20}$$

Several taps (elements) to be processed are extracted from the inverse filter $k_{inv}$ to be finitized.

The coefficient analysis unit 10 performs the processes as described above at each position where the chart is present in the image. The coefficient analysis unit 10 analyzes anisotropy in resolution at each position in the image and determines the spatial filter of which anisotropy is to be improved.

The processes described above are performed and thus, the spatial filter of which anisotropy is to be improved may be determined while correcting the blur with respect to a predetermined the position of image. For example, a direction along which resolution is poorer than other directions may be detected to determine the weight coefficient with which resolution in the direction having poorer resolution is more improved.

Figure 27:
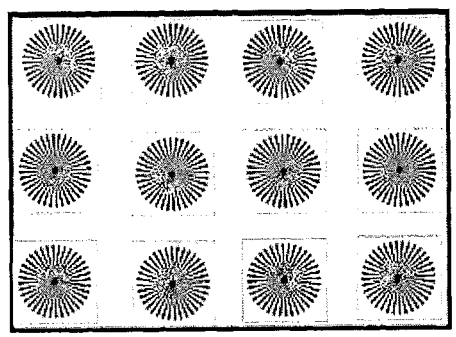
FIG. 27 is a view illustrating an exemplary image for which twelve charts are photographed.

The coefficient analysis unit 10 performs a calculation of the spatial filter at each position in the image. FIG. 27 is a view illustrating an example of image in which twelve charts are photographed. The example illustrated in FIG. 27 is only an example, and even though the number of charts is not twelve charts, each chart may be present in plural areas formed by dividing the image.

The coefficient analysis unit 10 determines the filter data at each area in which each chart is present to calculate the spatial filter. The coefficient analysis unit 10 prepares a table in which a position in the image and the spatial filter is mapped. Further, the coefficient analysis unit 10 may associate the size of the calculated ellipsis with the table.

FIG. 28 is a view illustrating an example of the spatial filter table. In the spatial filter table illustrated in FIG. 28, pixel coordinates of upper left portion of each area and the spatial filter calculated by the chart of the area are mapped. For example, the spatial filter (FIL1) is mapped on the position $(x_1, y_1)$.

Accordingly, the image processing apparatus including the coefficient analysis unit 10 may determine the spatial filter for which anisotropy in resolution is improved. The spatial filter for which anisotropy in resolution is improved is not limited to the example as described above and may include the spatial filter obtained by a technology described in, for example, Japanese Laid-Open Patent Publication No. 2012-23498. In this case, the spatial filter is made to have anisotropy in resolution.

The image processing unit 4 may be configured by, for example, a DSP (Digital Signal Processor). In this case, the RAW memory 41 may be a memory built-in the DSP or an external memory. Further, the post-processing unit 5, the image memory 8, the coefficient analysis unit 10, the VRAM for displaying may be formed integrally with an integral DSP together with an image processing unit 4. Further, the coefficient analysis unit 10 may be formed as an image processing apparatus formed as a single unit or including other processing units.

Alternatively, a predetermined program may be executed not by a dedicated processor for specific processing, such as a DSP, but by a general processor, such as a CPU, to implement functions of the image processing unit 4 or the coefficient analysis unit 10. The driving control apparatus 6, the control apparatus 7 and the post-processing unit 5 may also be configured by at least one dedicated processor for specific processing or a general processor.

The program which causes the processor to serve as the image processing unit 4 or the coefficient analysis unit 10 and a recording medium in which the program is recorded are also included in the embodiments of the present disclosure. The recording medium is a non-transitory medium, and a transitory medium such as signal itself is not included as the recording medium in the embodiments of the present disclosure.

<Problem Due to Finitization of Spatial Filter>

The problem followed by the finitization of the spatial filter will be described hereinafter. When the spatial filter having anisotropy is finitized, information for a portion other than a portion where the extracted taps (elements) of the spatial filter are extracted is missed. The spatial filter has anisotropy and thus, information which becomes missing is different depending on a direction. Further, the sums that add the elements are not equal.

High frequency information is included in the missed information and thus, when the image is corrected by the finite spatial filter, a degree of correction becomes different depending on the direction of correction.

Figure 29:
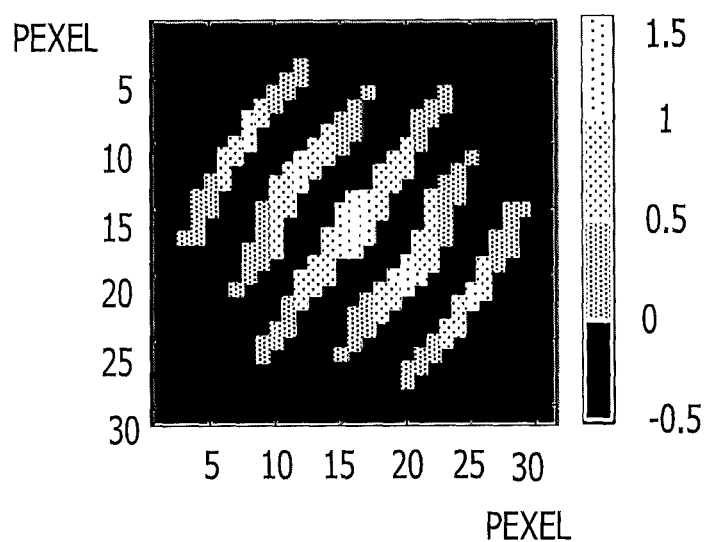
FIG. 29 is a view illustrating an example of a spatial filter.

FIG. 29 is a view illustrating an example of a spatial filter. The spatial filter illustrated in FIG. 29 has an anisotropy based on the equation (20) as described above. Values of the elements of the spatial filter are represented with colors in FIG. 29.

Figure 30:
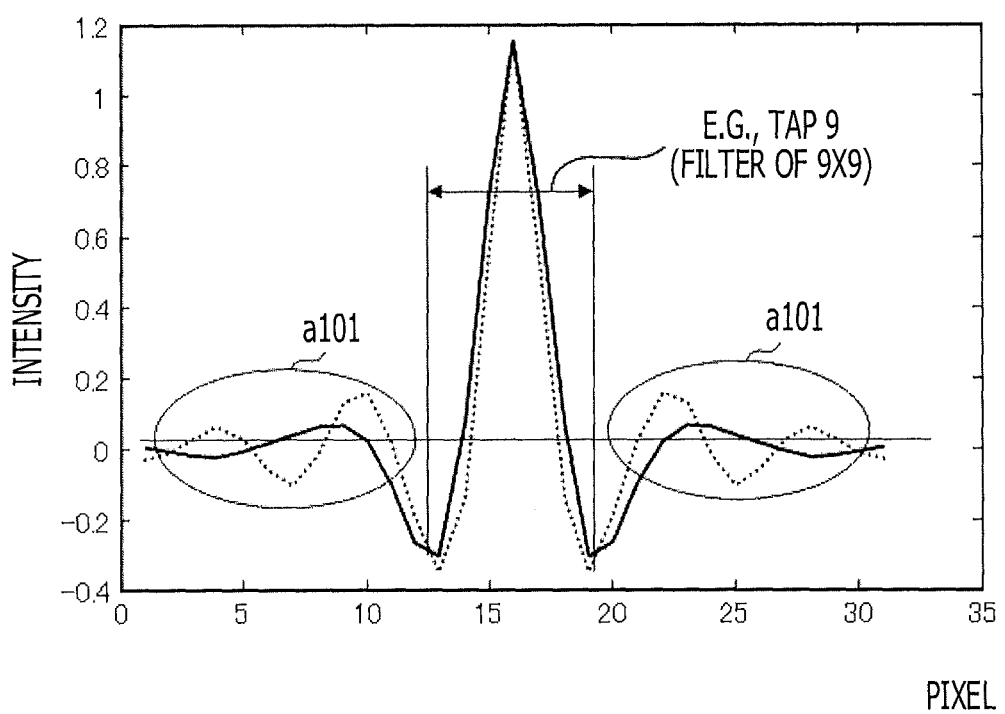
FIG. 30 is a view illustrating the intensity of a finite spatial filter.

FIG. 30 is a view illustrating the intensities of a finite spatial filter. When the number of taps is, for example, 9 (nine), nine elements by nine elements (9×9) are extracted from the center in an example illustrated in FIG. 30. The intensities of the finite spatial filter are represented in a longitudinal axis in an example illustrated in FIG. 30. When the finite number of elements is extracted from the finite spatial filter, information is missed at a 101 portion. Further, the spatial filter has anisotropy and thus, the high frequency information which becomes missing is different depending on the direction.

Figure 31:
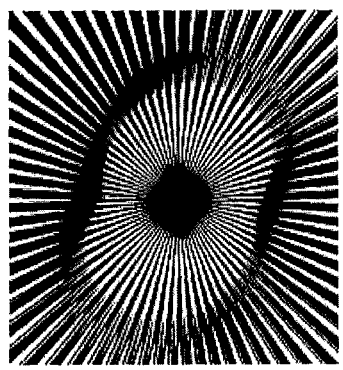
FIG. 31 is a view illustrating an example of Moiré generated in a corrected image.

Therefore, when the finite spatial filter is utilized, the degree of correction is different depending on the direction. When the chart is corrected using the nine-tap spatial filter as illustrated in FIG. 31, Moiré is generated. FIG. 31 is a view illustrating an example of Moiré generated in a corrected image. Moiré caused by finitization of the spatial filter as illustrated in FIG. 31 is generated.

Figure 32:
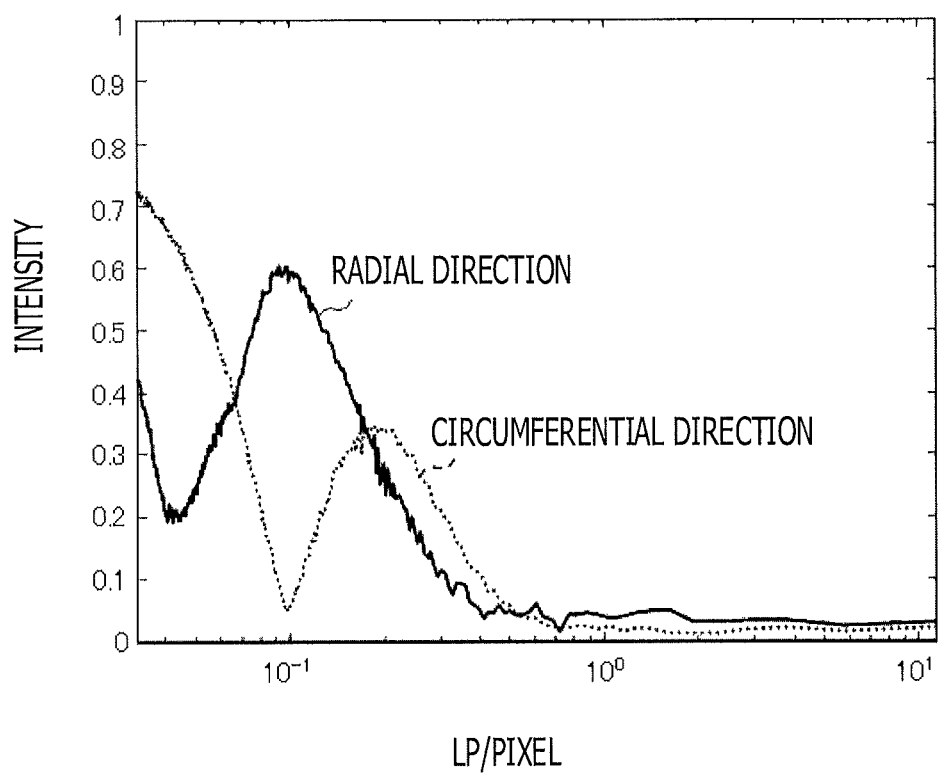
FIG. 32 is a view illustrating a resolution analysis result for an image corrected with the finite spatial filter.

FIG. 32 is a view illustrating a resolution analysis result for an image corrected with the finite spatial filter. The degree of correction for degradation of frequency becomes different depending on the direction as illustrated in FIG. 32.

Figure 33:
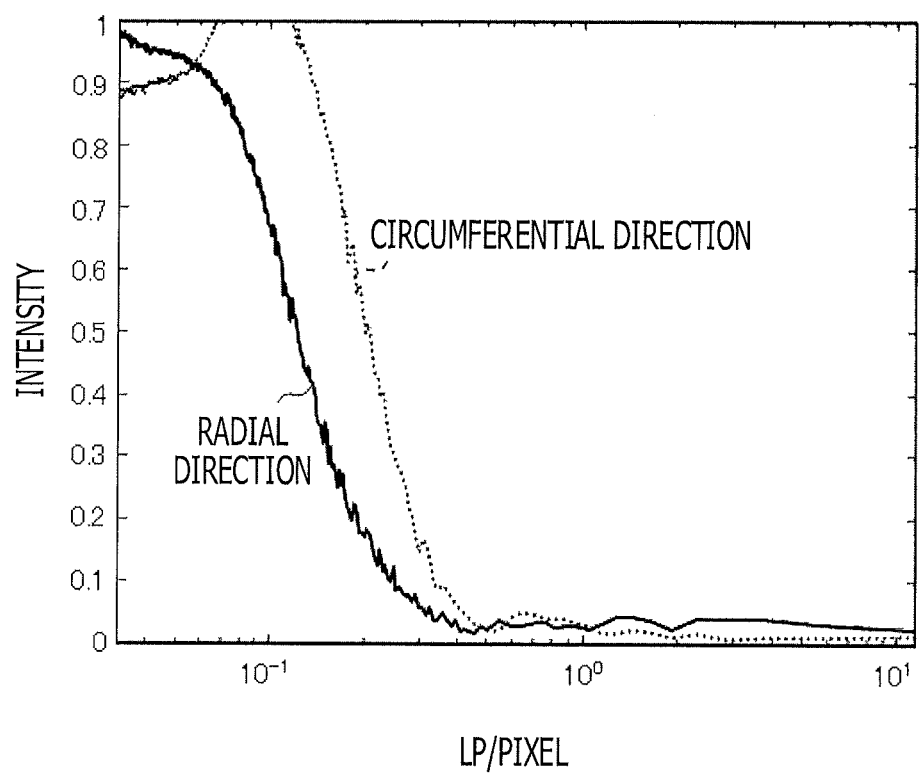
FIG. 33 is a view illustrating a resolution analysis result for an image corrected by suppressing generation of the Moiré.

FIG. 33 is a view illustrating a resolution analysis result for an image a corrected by suppressing generation of the Moiré. In an example illustrated in FIG. 33, improvement of high frequency is suppressed in order to prevent the generation of Moiré, such that anisotropy in resolution is remained.

Further, when the spatial filter is installed, there is a demand to limit the size of the spatial filter to the predetermined number of filter elements or less from a point of view of an amount of computation and a memory. Currently, the spatial filter having a size of, for example, 5×5 elements or less may be used.

However, when the number of elements of the spatial filter made to be small, the size of the PSF indicating blur becomes larger than the number of elements and thus, an amount of information is missed. Therefore, the quality of image may be degraded.

Figure 34:
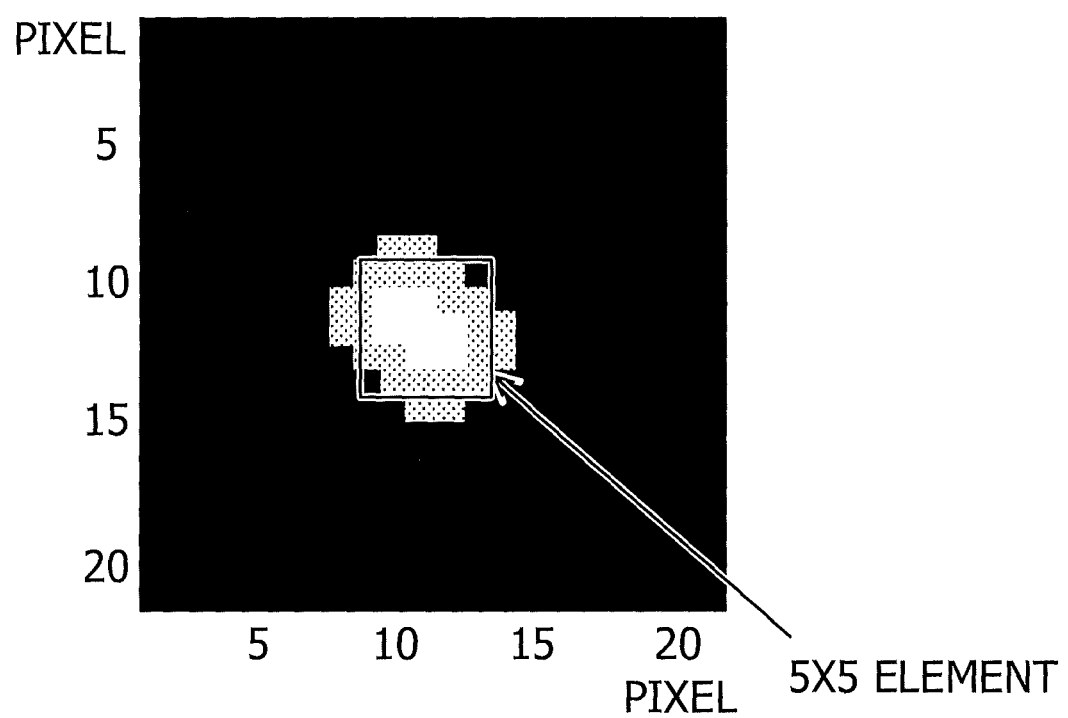
FIG. 34 is a view illustrating an example of a PSF representing blur of an image.

FIG. 34 is a view illustrating an example of the PSF representing blur of an image. Brightness of pixel indicates luminance value of the PSF in an example illustrated in FIG. 34.

Figure 35:
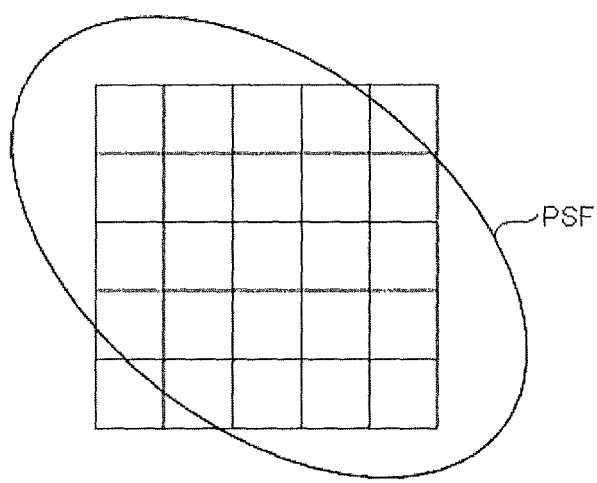
FIG. 35 is a view illustrating the size of a PSF.

FIG. 35 is a view illustrating an example of a size of the PSF. As illustrated in FIG. 35, it is assumed that the PSF is larger than the size of 5×5 pixels. In the meantime, one element of the filter corresponds to one pixel of image.

In an example illustrated in FIG. 35, the number of elements of the spatial filter is smaller than the size of blur and thus, information of blur is missed when the image is corrected.

Figure 36A:
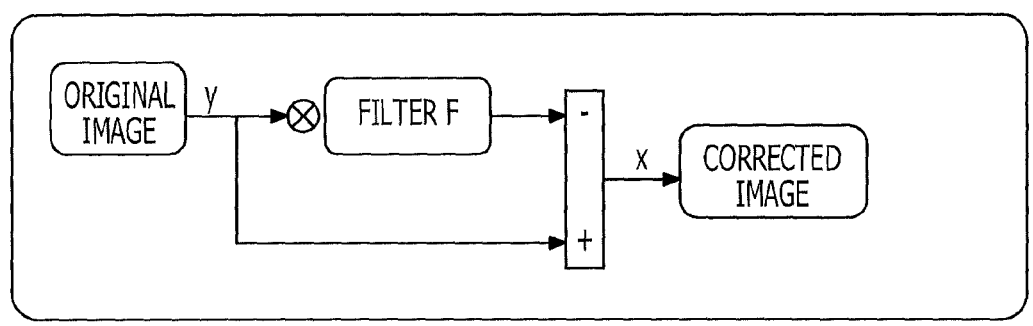
FIG. 36A is a view illustrating an exemplary configuration 1 for correcting an image generated on the assumption that the PSF size is smaller than the number of elements.

FIG. 36 is a view illustrating an example of a configuration for a corrected image generated on the assumption that the PSF size is smaller than the number of elements. FIG. 36A illustrates an example of configuration 1. In the configuration of FIG. 36A, a corrected image "x" is generated by convolving the calculated spatial filter F with the original image "y" and subtracting the result from the original image as represented in the following equation (21) is generated.

$$x = y - F \otimes y \tag{21}$$

Figure 36B:
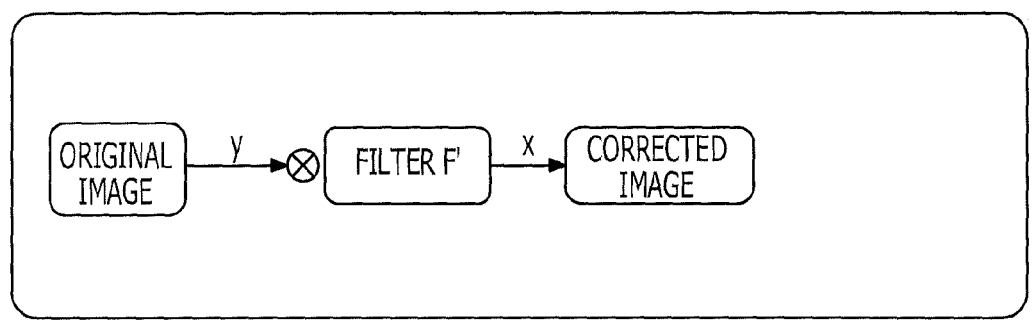
FIG. 36B is a view illustrating an exemplary configuration 2 for correcting an image generated on the assumption that the PSF size is smaller than the number of elements.

FIG. 36B illustrates an example of configuration 2. In the configuration of FIG. 36B, a corrected image "x" is generated by convolving the calculated spatial filter F' with the original image "y", as represented in the following equations (22), (23), (24) and (25).

$$I0 = \begin{bmatrix} 0 & \cdots & \cdots & \cdots & 0 \\ \cdots & \cdots & \cdots & \cdots & \cdots \\ \cdots & \cdots & 1 & \cdots & \cdots \\ \cdots & \cdots & \cdots & \cdots & \cdots \\ 0 & \cdots & \cdots & \cdots & 0 \end{bmatrix} \quad (22)$$

$$x = I0 \otimes y - F \otimes y = (I0 - F) \otimes y \quad (23)$$

$$F' = I0 - F \quad (24)$$

$$x = F' \otimes y \quad (25)$$

Figure 37:
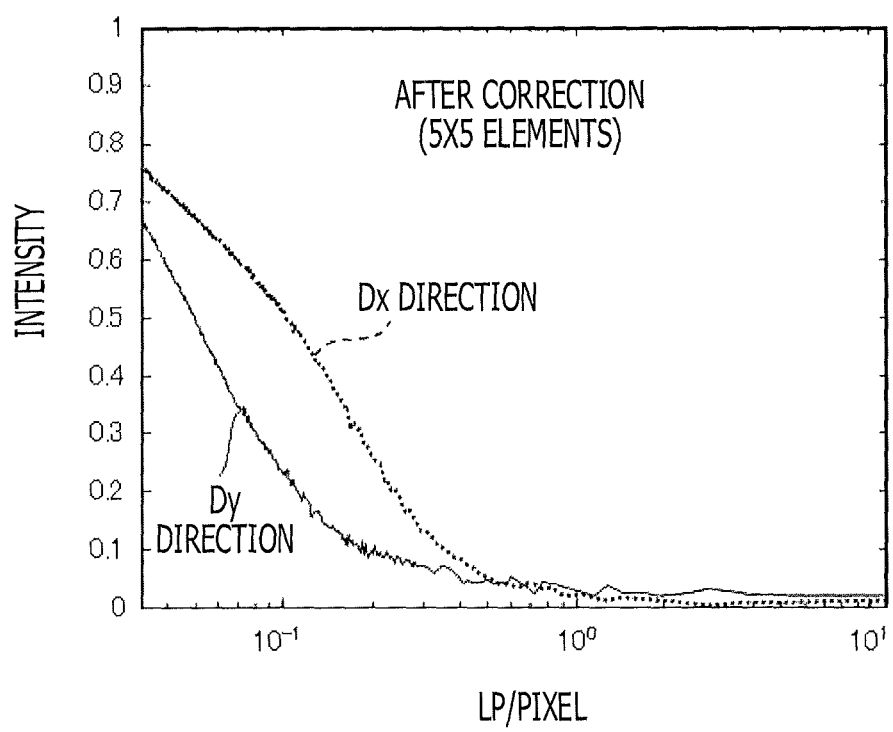
FIG. 37 is a view illustrating an example of a resolution analysis result after correction when the number of elements is smaller than the PSF size.

FIG. 37 is a view illustrating an example of the resolution analysis result when the number of elements of the spatial filter is smaller than the PSF size. In an example illustrated in FIG. 37, the number of elements is set as 5×5 elements and the number of elements of the spatial filter is smaller than the size of the PSF, an anisotropy correction characteristic is degraded.

Therefore, in the embodiment to be described below, when the spatial filter having anisotropy in resolution is finitized to a predetermined number of elements or less, an object to be solved in installation is achieved to prevent degradation of the image quality.

Embodiment 1

An outline of preventing generation of Moiré will be described first. As described in detail, the spatial filter having anisotropy in resolution is finitized and thus, the missing level of high frequency information is different depending on the direction. Therefore, Moiré is generated. That is, the degree of correction for degradation of frequency is different depending on the direction and thus, Moiré is generated.

Therefore, an image signal is made to pass through a finite high pass filter to reduce a portion at which luminance abruptly varies and thus, a difference in the degree of correction of high frequency information which is different depending on the direction is reduced. Accordingly, the generation of Moiré caused by the degradation of frequency information depending on the direction may be prevented.

A finite high pass filter may be a finite filter in which a total sum of values of elements is 0 (zero) and at least two elements have a value of non-zero. Hereinafter, description will be made using a finite high pass filter as the finite filter.

Further, an object to be solved in installation may be achieved by dividing the calculated spatial filter to generate spatial filters in plural stages, and each spatial filter has a predetermined number of elements or less.

FIG. 38 is a view illustrating an example of a filter having plural stages in embodiment 1. In an example illustrated in FIG. 38A, the spatial filter F illustrated in FIG. 36A is divided into the spatial filters (5×5) in plural stages. In an example illustrated in FIG. 38B, the spatial filter F' illustrated in FIG. 36B is divided into the spatial filters (5×5) in plural stages.

In the embodiment to be described below, with respect to the blur having anisotropy of which size is larger than the number of elements of the spatial filter, plural inverse filters having anisotropy are formed and combined with plural spatial filters to improve anisotropy.

The image capturing apparatus including the image processing apparatus in the embodiment 1 will be described next.

In the embodiment 1, the degradation of quality of image when the size of the spatial filter having anisotropy in resolution is finitized to a predetermined number of elements may be prevented.

<Configuration>

Figure 39:
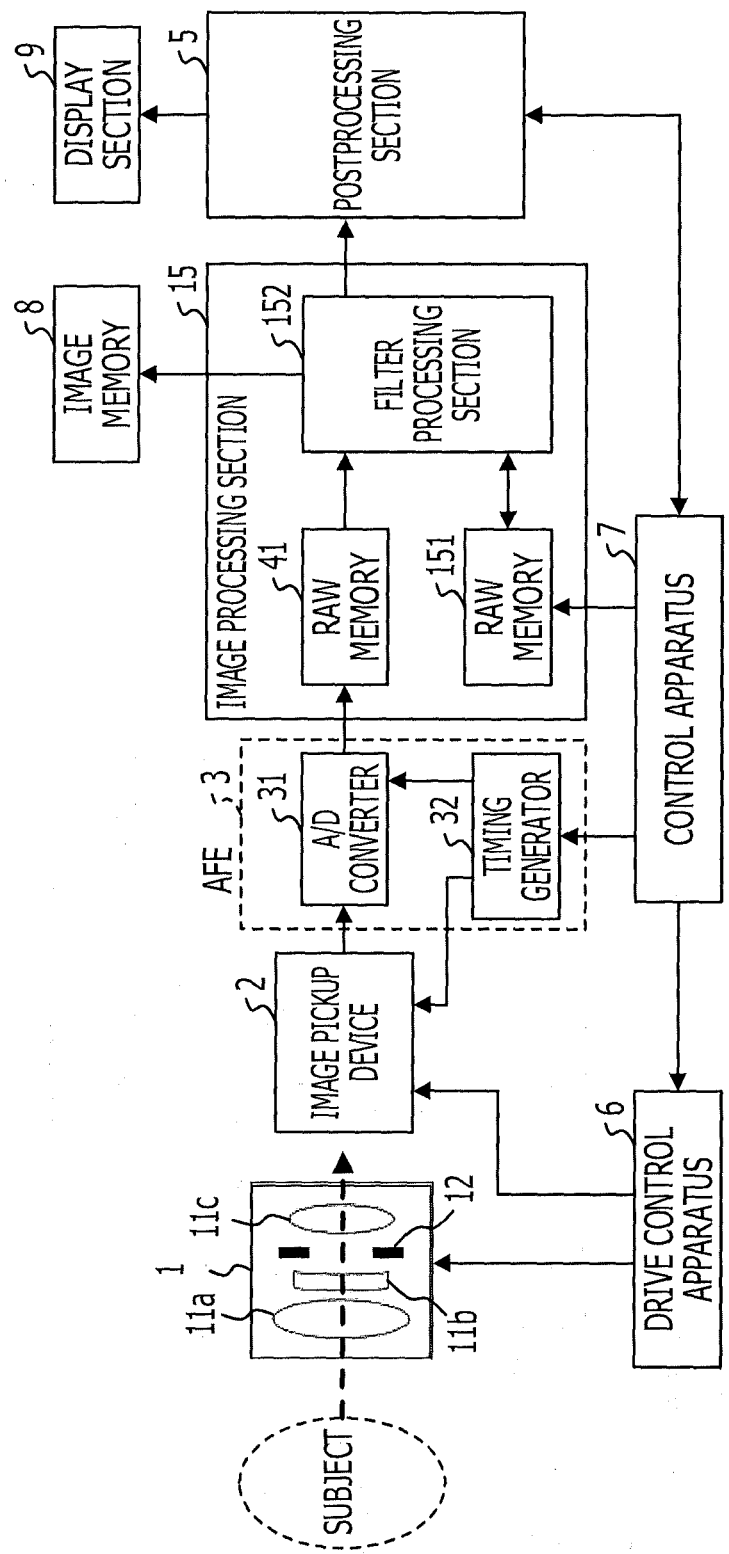
FIG. 39 is a block diagram illustrating an exemplary schematic configuration of an image capturing apparatus including an image processing apparatus in the embodiment 1.

FIG. 39 is a block diagram illustrating an exemplary schematic configuration of an image capturing apparatus including the image processing apparatus in the embodiment 1. The same reference numerals will be given to the same configuration as FIG. 21 in the configuration illustrated in FIG. 39. Hereinafter, the image processing unit 15 in the embodiment 1 will be primarily described.

The image processing unit 15 includes a RAW the memory 41, a filter control unit 151 and a filter processing unit 152. The filter control unit 151 maintains the spatial filter table illustrated in FIG. 28. The filter control unit 151 calculates the spatial filter having the number of elements larger than the blur size with respect to each spatial filter in the spatial filter table.

The filter control unit 151 then divides the calculated spatial filter into the spatial filters in plural stages to have a predetermined number of elements or less. The filter control unit 151 outputs the spatial filters in plural stages to the filter processing unit 152. That is, the filter control unit 151 outputs the spatial filters in plural stages corresponding to each position in the image to be processed to the filter processing unit 152.

The filter processing unit 152 performs a filtering at the corresponding position in the image using the spatial filters in plural stages acquired from the filter control unit 151. Accordingly, the anisotropy in resolution which is different at each position in the image may be improved to prevent the generation of Moiré and enhance the quality of the image.

(Filter Control Unit and Filter Processing Unit)

Figure 40:
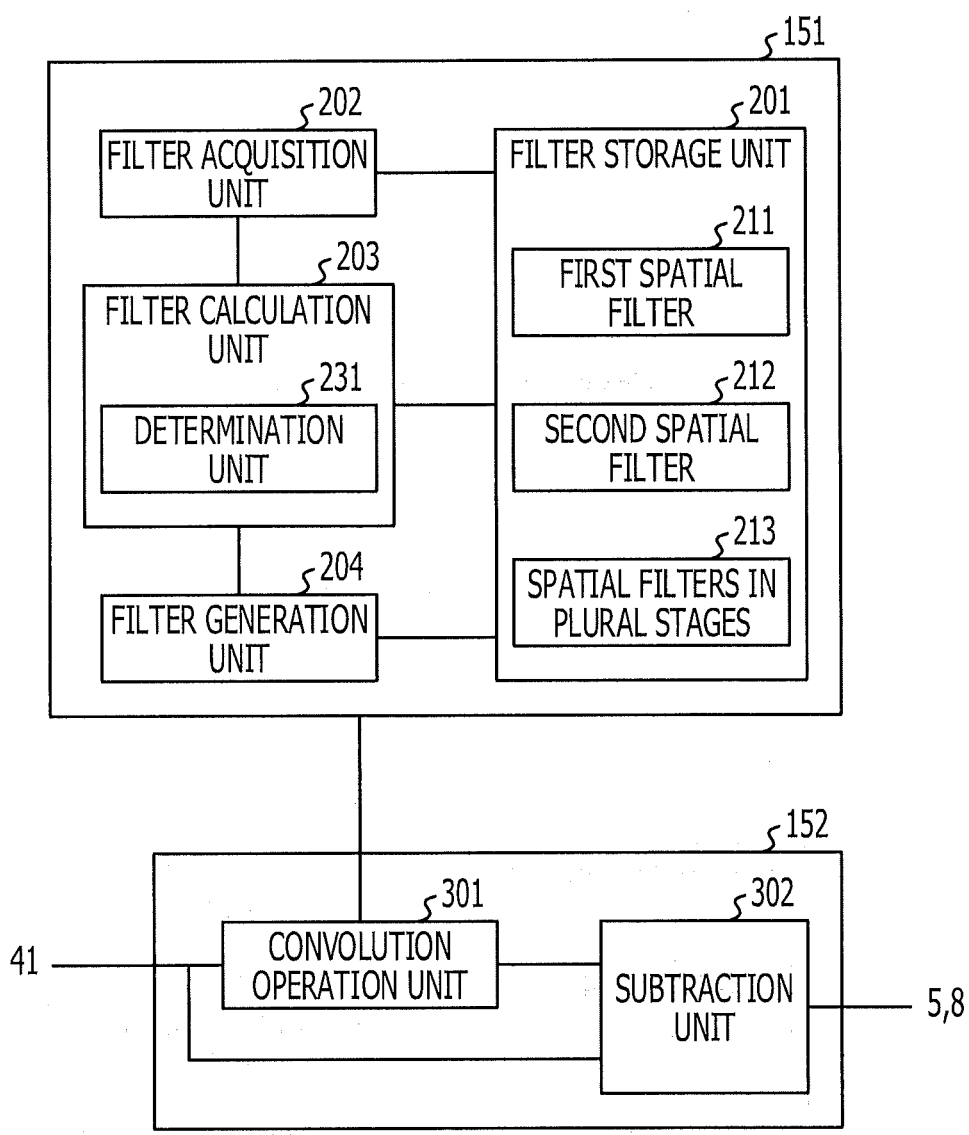
FIG. 40 is a block diagram illustrating an exemplary (first) schematic configuration of a filter control unit and a filter processing unit in the embodiment 1.

The filter control unit 151 and the filter processing unit 152 in the embodiment 1 will be described next. FIG. 40 is a block diagram illustrating an exemplary (first) schematic configuration of a filter control unit and a filter processing unit in the embodiment 1. The filter control unit 151 will be described first. The filter control unit 151 includes a filter storage unit 201, a filter acquisition unit 202, a filter calculation unit 203 and a filter generation unit 204.

The filter storage unit 201 stores at least a first spatial filter 211, a second spatial filter 212 and spatial filters 213 in plural stages. Each filter may be stored in different storage areas, respectively.

The first spatial filter 211 is a spatial filter having an anisotropy in resolution. The first spatial filter 211 corresponds to, for example, each filter in the spatial filter table illustrated in FIG. 28. The second spatial filter 212 is a filter calculated by the filter calculation unit 203. The second spatial filter is a filter, for example, obtained by convolving the high pass filter with the first spatial filter 211. The spatial filters 213 in plural stages are a group of spatial filters generated by the filter generation unit 204.

The filter acquisition unit 202 acquires a finite spatial filter having anisotropy in resolution of the image. The filter acquisition unit 202 acquires the first spatial filter 211 from, for example, the filter storage unit 201. The filter acquisition unit 202 outputs the first spatial filter 211 acquired to the filter calculation unit 203.

The filter calculation unit 203 calculates a second spatial filter by convolving a finite filter in which a total sum of values of elements is 0 (zero) and at least two elements have a value of non-zero with the first spatial filter 211 acquired from the filter acquisition unit 202.

In this case, the filter calculation unit 203 calculates the second spatial filter having the number of elements larger than the size of blur (e.g., the size of an ellipsis of the PSF). The filter calculation unit 203 includes a determination unit 231, and the determination unit 231 determines the blur size from, for example, the size of the PSF stored in the filter storage unit 201. Further, the determination unit 231 may determine the blur size from the acquired PSF in a case where the PSF may be acquired from a lens design value by simulation as described in, for example, Japanese Laid-Open Patent Publication No. 2012-23498.

The filter calculation unit 203 calculates the second spatial filter by convolving the first spatial filter having the number of elements larger than the size of the blur of image with the finite high pass filter.

The filter calculation unit 203 maintains the finite high pass filter in advance. When the finite high pass filter is intended to be defined as, for example, a filter of having 3×3 elements, the finite high pass filter may be obtained using the following equations (26) and (27).

$$\text{Lap} = \begin{bmatrix} 0 & 1 & 0 \\ 1 & -4 & 1 \\ 0 & 1 & 0 \end{bmatrix} \quad (26)$$

$$\text{Lap} = \begin{bmatrix} 1 & 1 & 1 \\ 1 & -8 & 1 \\ 1 & 1 & 1 \end{bmatrix} \quad (27)$$

The anisotropy described in the embodiment depends on a filter at an angle in any direction and thus, the filter of which all elements have coefficients of non-zeros as represented in the equation (27) may be used.

The filter calculation unit 203 defines the spatial filter $k_{inv}$ as a filter of 7×7 elements when the high pass filter is defined as a filter of 3×3 elements and convolves the two filters to calculate a filter of 9×9 elements. As described above, the filter calculation unit 203 convolves the high pass filter with the spatial filter to calculate the filter having the desired number of taps.

Here, when a filter of 7×7 elements is denoted by F7 and the high pass filter is denoted by "Lap", a filter of 9×9 elements calculated in the filter calculation unit 203 is represented by the following equation (28).

$$F9 = Lap \otimes F7 \quad (28)$$

The filter calculation unit 203 stores the second spatial filter F9 calculated by the equation (28) described above in the filter storage unit 201.

The filter calculation unit 203 may be installed in a separate apparatus, and the filter control unit 151 may store the second spatial filter 212 obtained from the separate apparatus.

The filter generation unit 204 acquires the second spatial filter 212 from the filter storage unit 201 and generates the spatial filters in plural stages having a predetermined number of elements or less from the second spatial filter 212. Descriptions regarding the generation of the spatial filters in plural stages will be described later. The filter generation unit 204 stores the generated spatial filters 213 in plural stages in the filter storage unit 201.

The filter processing unit 152 will be described next. The filter processing unit 152 includes a convolution operation unit 301 and a subtraction unit 302. The convolution operation unit 301 acquires the image from the RAW memory 41 and convolves the image in the spatial filters 213 in plural stages to perform filtering.

The convolution operation unit 301 may perform filtering on the image in such a manner that the spatial filter 213 in plural stages causes a single convolution circuit to perform convolution plural times or prepares and causes plural convolution circuits to perform convolution. The convolution operation unit 301 outputs the image after filtering to the subtraction unit 302.

The subtraction unit 302 subtracts the image after filtering from the image acquired from the RAW memory 41 to generate a corrected image. The corrected image is output to the post-processing unit 5 or the image memory 8.

The filter processing unit 152 may obtain a pixel value of a target pixel here by performing a linear interpolation using adjacent spatial filters rather than using a single spatial filter on each pixel of each area of the image.

Figure 41:
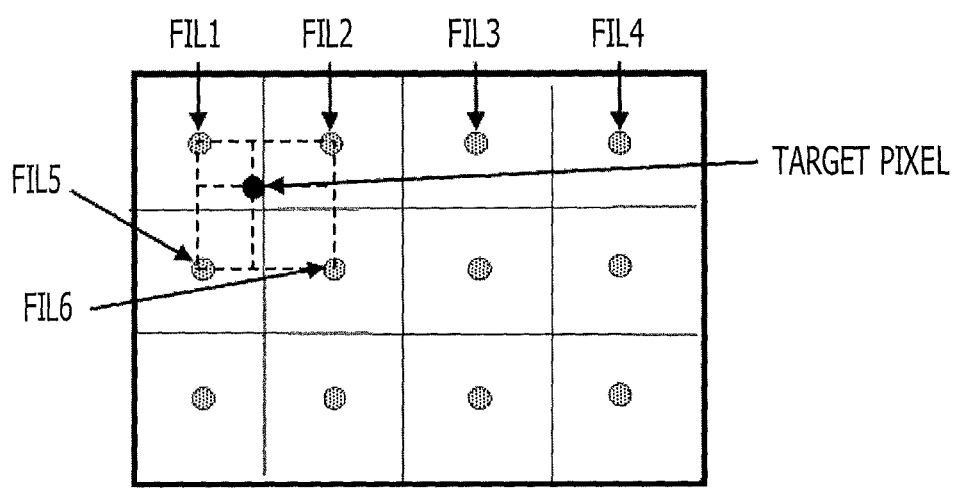
FIG. 41 is a view for explaining a linear interpolation of a target pixel.

FIG. 41 is a view for explaining a linear interpolation of a target pixel. As illustrated in FIG. 41, the filter processing unit 152 may perform the linear interpolation according to a distance of each pixel using a center pixel of each area calculated in four adjacent spatial filters to obtain the pixel value of the target pixel. In an example illustrated in FIG. 41, the filter processing unit 152 performs the linear interpolation on the pixel value of each area obtained from FIL1, FIL2, FIL5 and FIL6 to calculate the pixel value of the target pixel.

Further, the filter processing unit 152 may calculate the pixel value after the spatial filter itself for the target pixel is obtained with the linear interpolation. Further, in the above example, the number of spatial filters set four adjacent spatial filters, but not limited thereto and may use different plural spatial filters. Additionally, the linear interpolation using a distance is performed but other interpolation scheme may be used. Further, interpolation may be performed for each sub-area resulted from sub-division of an area or performed for each pixel.

Figure 42:
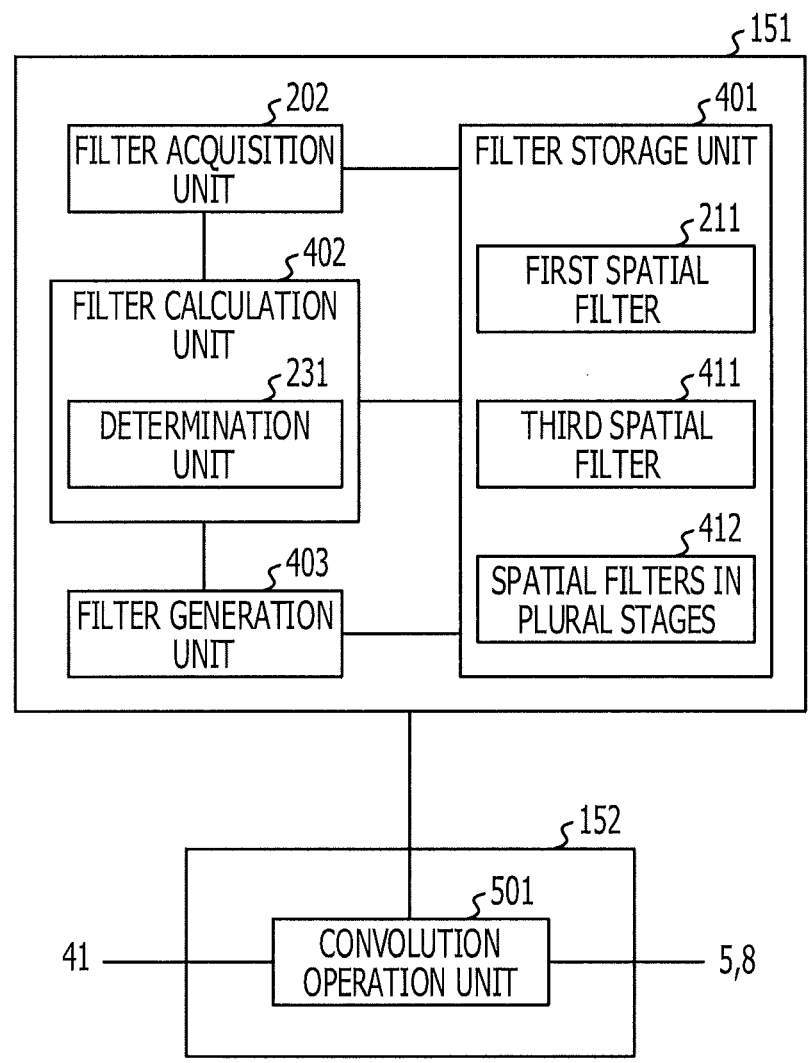
FIG. 42 is a block diagram illustrating an exemplary (second) schematic configuration of the filter control unit and the filter processing unit in the embodiment 1.

Other examples of the filter control unit 151 and the filter processing unit 152 will be described next. FIG. 42 is a block diagram illustrating an exemplary (second) schematic configuration of the filter control unit 1512 and the filter processing unit 152 in the embodiment 1. The filter control unit 151 will be described first. The filter control unit 151 includes a filter storage unit 401, a filter acquisition unit 202, a filter calculation unit 402 and a filter generation unit 403.

In the configuration of the filter control unit 151 illustrated in FIG. 42, the same reference numerals will be given to the same configuration as FIG. 40.

The filter storage unit 401 stores a third spatial filter 411 calculated by the filter calculation unit 402 and the spatial filters 412 in plural stages calculated by the filter generation unit 403.

The filter calculation unit 402 calculates a third spatial filter 411 which does not need a subtracting process between the images described above. The filter calculation unit 402 may make unnecessary subtracting process by performing deformation of equation using the equations (22), (23), (24) and (25). In this example, it is assumed that a third spatial filter F9' of 9×9 elements.

Accordingly, the same result as described above may be obtained and thus, the finite spatial filter F9' which does not need a subtracting process between the images may be generated.

The filter calculation unit 402 stores the calculated spatial filter F9' in the filter storage unit 401. The spatial filter F9' is the third spatial filter 411.

The filter generation unit 403 acquires the third spatial filter 411 from the filter storage unit 401 and generates the spatial filters in plural stages having the predetermined number of elements or less from the third spatial filter 411. Generation of the spatial filters in plural stages will be described later. The filter generation unit 403 stores the generated spatial filters 412 in plural stages in the filter storage unit 401.

The filter processing unit 152 includes a convolution operation unit 501. The convolution operation unit 501 performs convolution on the spatial filters 412 in plural stages and generates a corrected image "x".

(Example of Spatial Filter)

Figure 43:
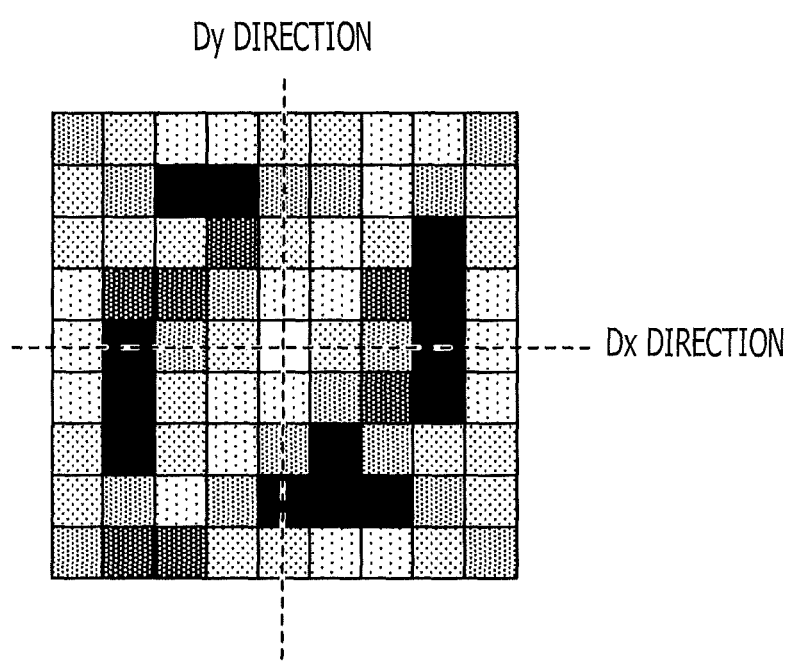
FIG. 43 is a view illustrating (first) intensity at each pixel of a spatial filter F9'.

FIG. 43 is a view illustrating (first) intensity at each pixel of a spatial filter F9'. In an example illustrated in FIG. 43, the intensity at each pixel is represented by colors.

Figure 44:
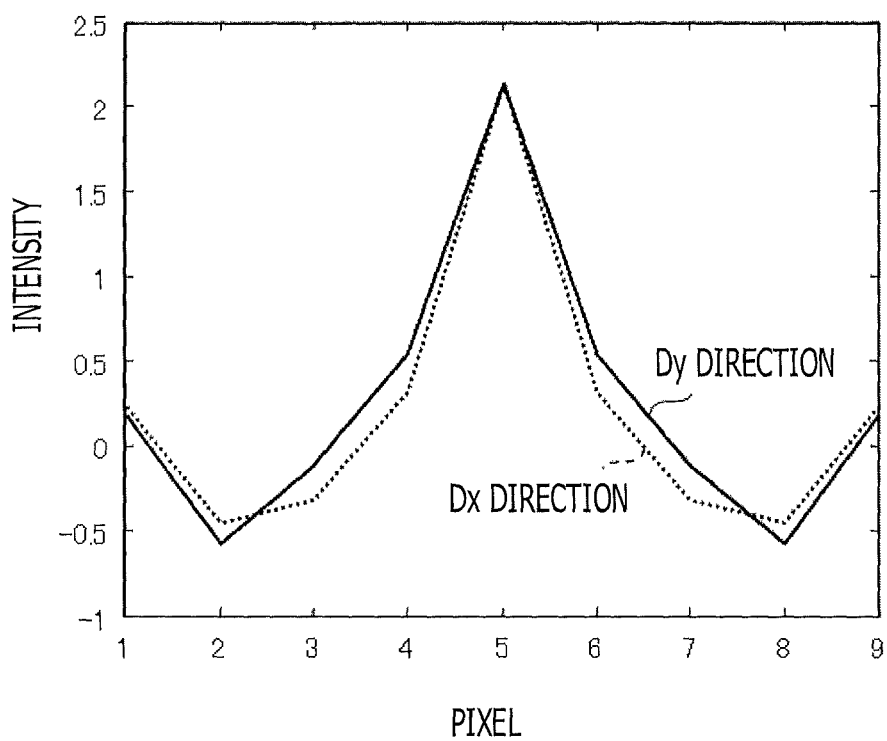
FIG. 44 is a view illustrating (second) intensity at each pixel of the spatial filter F9'.

FIG. 44 is a view illustrating (second) intensity at each pixel of the spatial filter F9'. Intensity variation in two directions (e.g., Dx is a transversal direction and Dy is a longitudinal direction) of the spatial filter F9' is represented in an example illustrated in FIG. 44. In this case, a total sum of elements of the spatial filter F9' becomes 1 (one).

Figure 45:
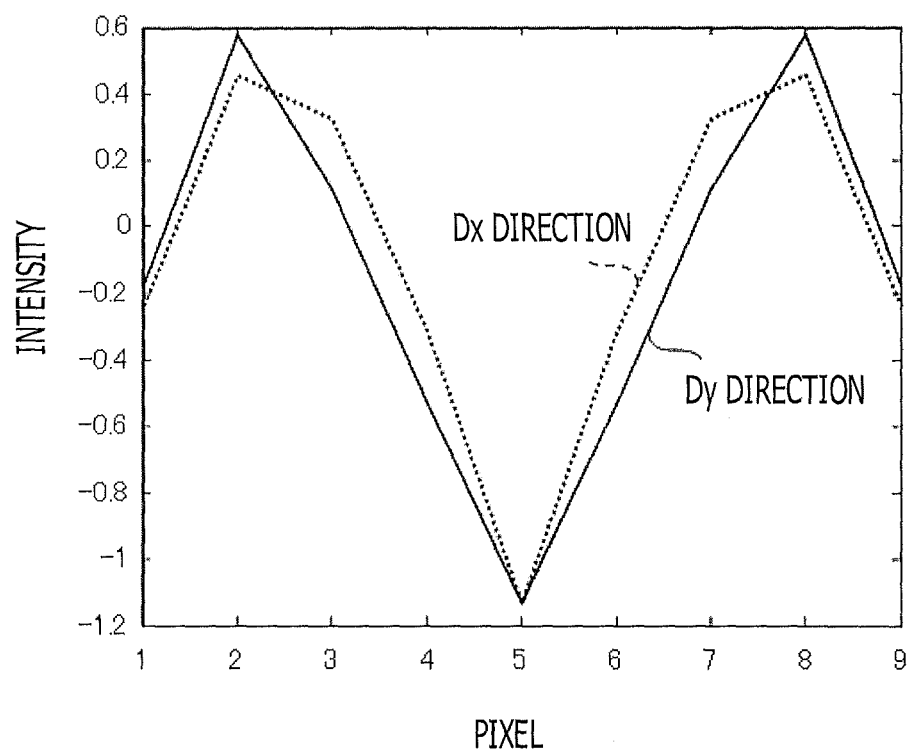
FIG. 45 is a view illustrating intensity at each pixel of a spatial filter F9.

FIG. 45 is a view illustrating intensity at each pixel of a spatial filter F9. Intensity variation in two directions (e.g. Dx is a transversal direction and Dy is a longitudinal direction) of the spatial filter F9 is represented in an example illustrated in FIG. 45. In this case, a total sum of elements of the spatial filter F9 including high pass information becomes 0 (zero).

<Generation of Spatial Filter in Plural Stages>

The generation of spatial filters in plural stages will be described next. Hereinbelow, an example in which the filter generation unit 403 illustrated in FIG. 42 generates the spatial filters in plural stages will be described, but the filter generation unit 204 illustrated in FIG. 40 also generates the spatial filters in plural stages in the same manner.

First, when the spatial filter having the number of elements larger than the size of the blur into a group of filters having a predetermined number of elements, the filter generation unit 403 assumes one filter as a basis for dividing and obtains other filters with optimization based on the assumed filter.

For example, it may be assumed that the third spatial filter F9' is divided into two spatial filters of 5×5 elements (each is defined as F5A' and F5B'). In this case, the filter generation unit 403 may define the following equation (29).

$$F9' = F5A' \otimes F5B' + e \quad (29)$$

where the term "e" is an error of difference. Hereinafter, a method of dividing into the spatial filters in plural stages performed by the inventors will be described.

(Division Method 1)

In the division method 1, the spatial filter F5A' is defined as a filter formed by extracting a central portion of 5×5 elements of the third spatial filter F9'.

Figure 46:
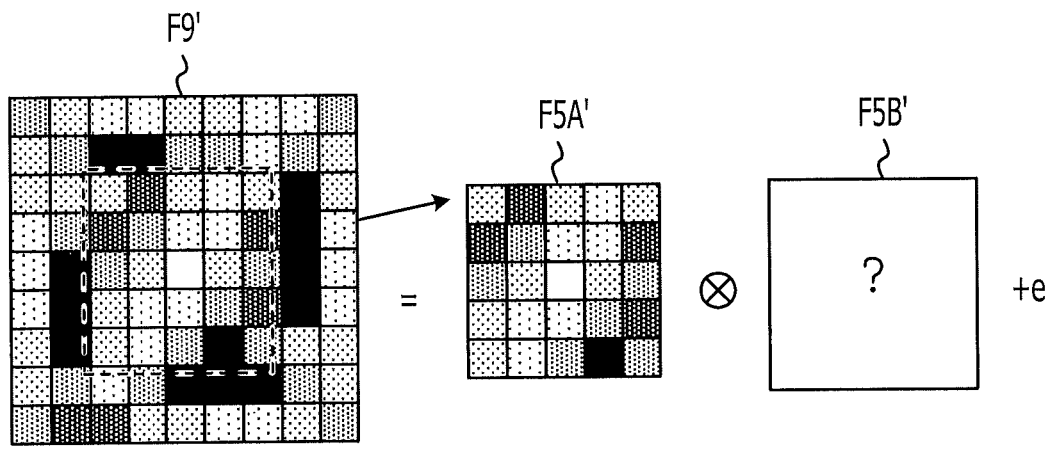
FIG. 46 is a view for explaining a method of obtaining the spatial filters in plural stages according to division method 1.
Figure 46:
Figure 46:
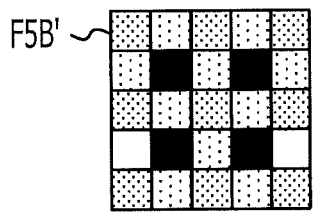

FIG. 46 is a view for explaining a method of obtaining spatial filters in plural stages according to division method 1. In an example illustrated in FIG. 46, the filter generation unit 403 may determine the spatial filter F5A' to minimize the estimation function represented by the following equation (30) to obtain the spatial filter F5B'.

$$e^2 = \|F9' - F5A' \otimes F5B'\|^2 \quad (30)$$

The obtained spatial filter F5B' is illustrated in FIG. 46.

Figure 47A:
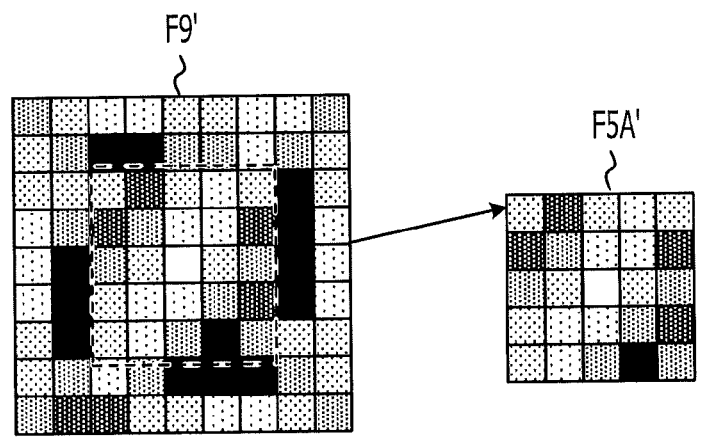
FIG. 47A is a view for explaining analysis for the division method 1.
Figure 47B:
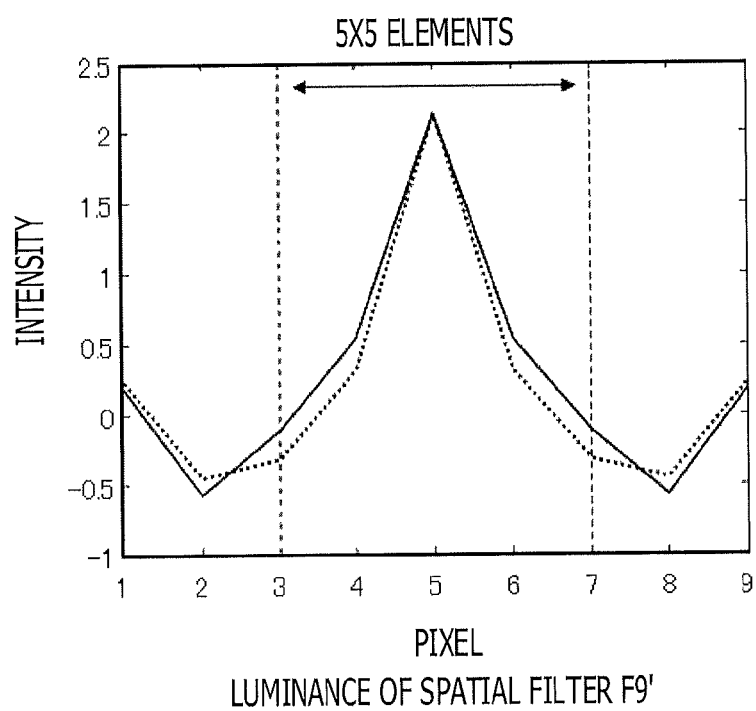
FIG. 47B is a view illustrating intensity at each pixel of a spatial filter F9'.

FIG. 47 is a view for explaining analysis for the division method 1. As illustrated in FIG. 47A, the spatial filter F5A' is just formed by extracting 5×5 elements from the spatial filter F9' in the division method 1. In this case, the original high pass information is missed as illustrated in FIG. 47B. That is, it becomes unable to satisfy a condition of a total sum of elements.

Figure 48A:
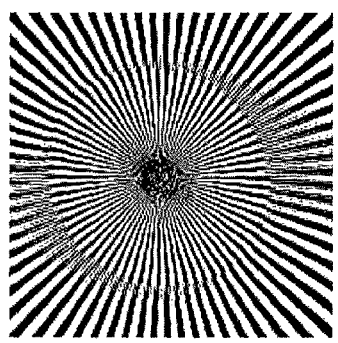
FIG. 48A is a view illustrating a corrected image according to the division method 1.
Figure 48B:
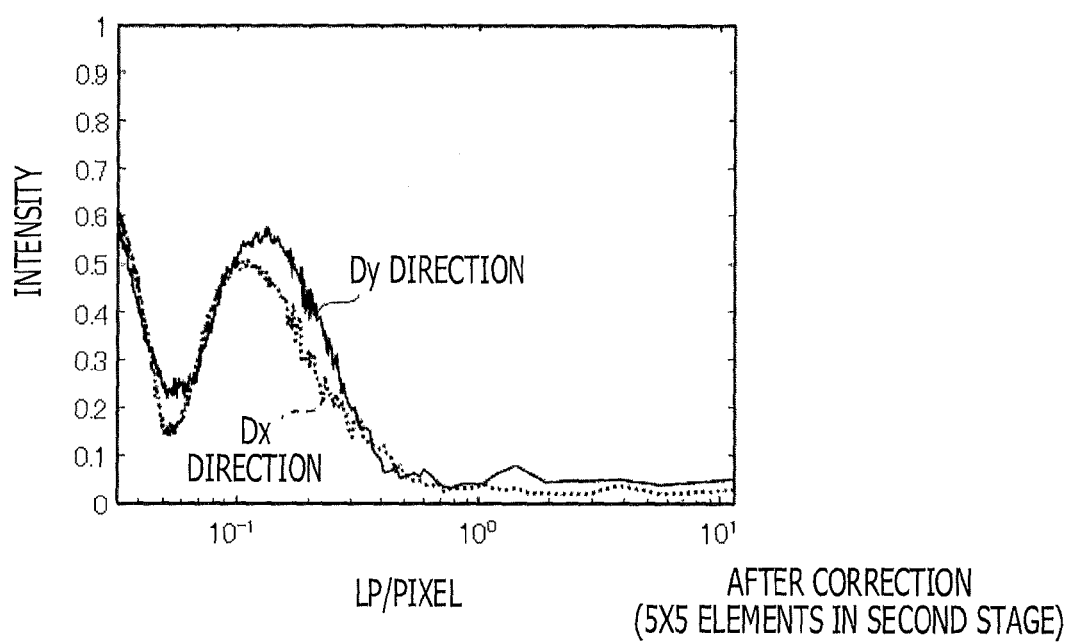
FIG. 48B is a view illustrating a result of the MTF after correction according to the division method 1.

FIG. 48 is a view illustrating the result of correction according to the division method 1. FIG. 48A illustrates the corrected image according to the division method 1. As illustrated in FIG. 48A, high pass information is missed and an effect of correction is different according to a direction and thus, Moiré is generated. FIG. 48B illustrates a result of the MTF after correction according to the division method 1. It may seen also from the result illustrated in FIG. 48B that Moiré is generated.

(Division Method 2)

In the division method 2, the spatial filter F5A' in a first stage is defined as a filter having anisotropy. For example, the spatial filter F5A' is formed with just a reciprocal of an anisotropic PSF.

Figure 49C:
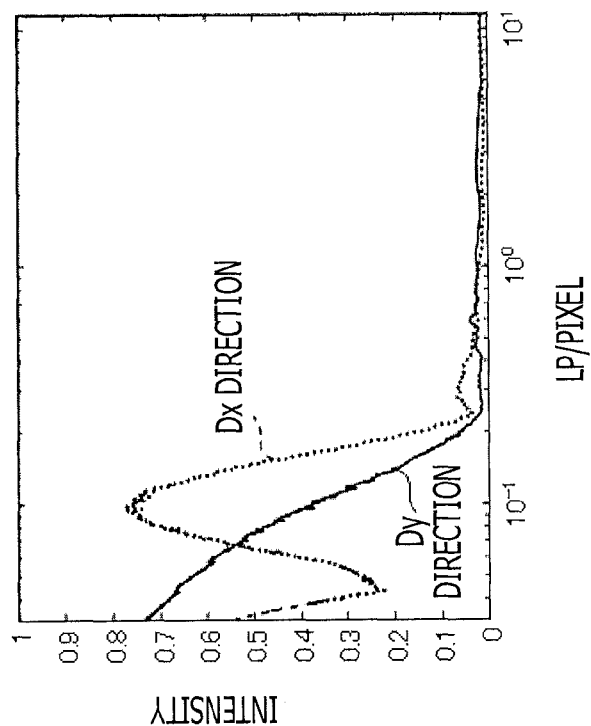
FIG. 49C is a view illustrating the result of the MTF after correction according to the division method 2.
Figure 49B:
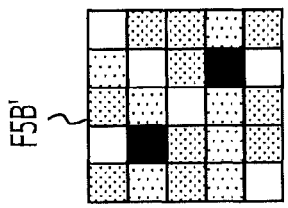
FIG. 49B is a view illustrating an example of a spatial filter F5B'.
Figure 49A:
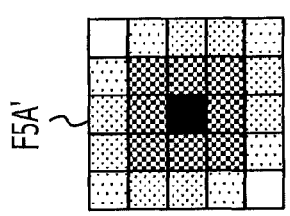
FIG. 49A is a view illustrating an example of the spatial filter F5A'.

FIG. 49 is a view for explaining division method 2. FIG. 49A is a filter illustrating an example of the spatial filter F5A'. FIG. 49B is a spatial filter F5B' obtained by minimizing the estimation function.

FIG. 49C illustrates the result of the MTF after correction according to the division method 2. The resolution is different in each direction in the result, illustrated in FIG. 49C and thus, Moiré is generated.

(Division Method 3)

In the division method 3, the spatial filter F5A' in a first stage is defined as a filter having isotropy. For example, the spatial filter F5A' is formed with just a reciprocal of an isotropic PSF.

Figure 50A:
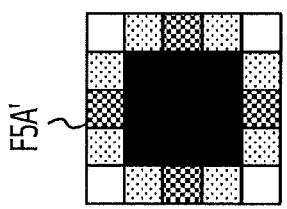
FIG. 50A is a view illustrating an example of the spatial filter F5A'.
Figure 50B:
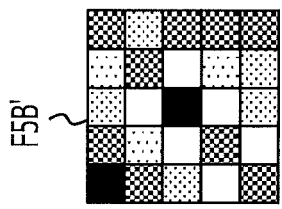
FIG. 50B is a view illustrating an example of a spatial filter F5B'.

FIG. 50 is a view for explaining division method 3. FIG. 50A is a filter illustrating an example of the spatial filter F5A'. FIG. 50B is a spatial filter F5B' obtained by minimizing the estimation function.

Figure 50C:
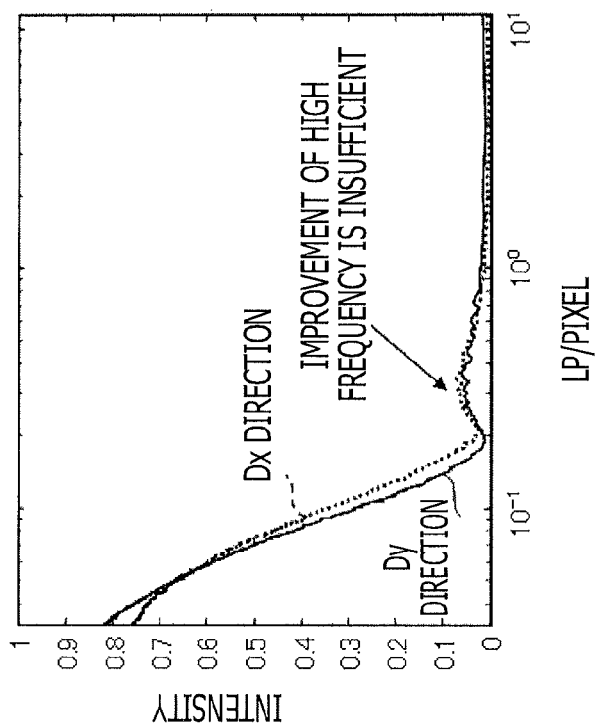
FIG. 50C is a view illustrating a result of the MTF correction according to the division method 3.

FIG. 50C illustrates a result of the MTF after correction according to the division method 3. The result illustrated in FIG. 50C is not enough to generate Moiré, but improvement of high frequency is insufficient.

(Division Method 4)

In the division method 4, the spatial filter F5A' in a first stage is defined as a filter having isotropy and formed by convolving the reciprocal of the PSF with the high pass filter.

Figure 51A:
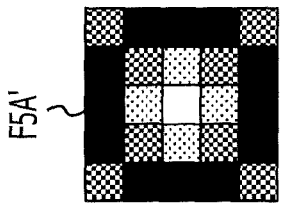
FIG. 51A is a view illustrating an example of the spatial filter F5A'.
Figure 51B:
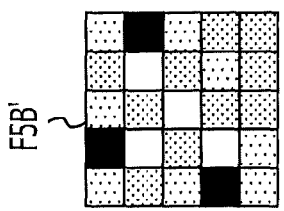
FIG. 51B is a view illustrating an example of a spatial filter F5B'.

FIG. 51 is a view for explaining division method 4. FIG. 51A is a filter illustrating an example of the spatial filter F5A'. FIG. 51B is a spatial filter F5B' obtained by minimizing the estimation function.

Figure 51C:
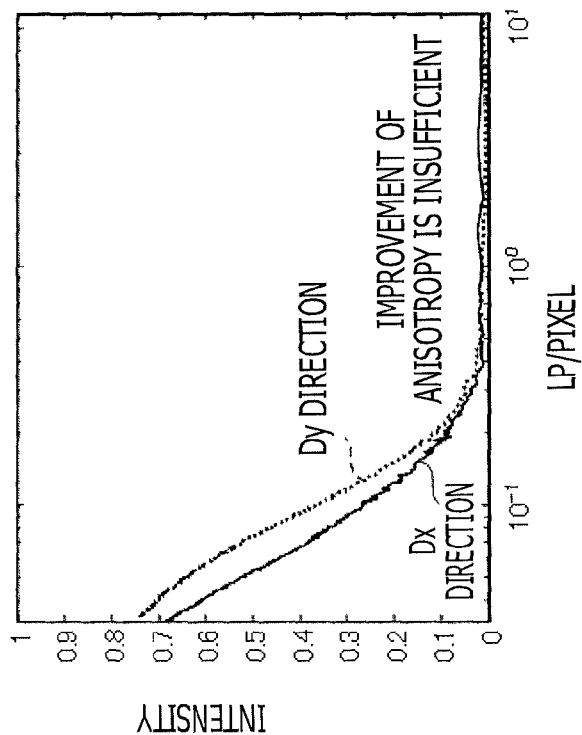
FIG. 51C is a view illustrating a result of the MTF after correction according to the division method 4.

FIG. 51C illustrates a result of the MTF after correction according to the division method 4. An improvement of anisotropy becomes insufficient in the result illustrated in FIG. 51C. This is because the high pass filter is convolved in the filter in the first stage in order not to generate Moiré but the filter is isotropic and thus, anisotropy may not be improved in the filter in the second stage.

Further, in a case where the spatial filter in the first stage is isotropic, information of anisotropy becomes a single filter and thus, the number of elements becomes short.

There is a case where a desirable correction result may not be obtained in the division methods as describe above. Therefore, a method for dividing a filter which has anisotropy and a large number of elements into plural stages more properly will be described.

(Division Method 5)

Figure 52:
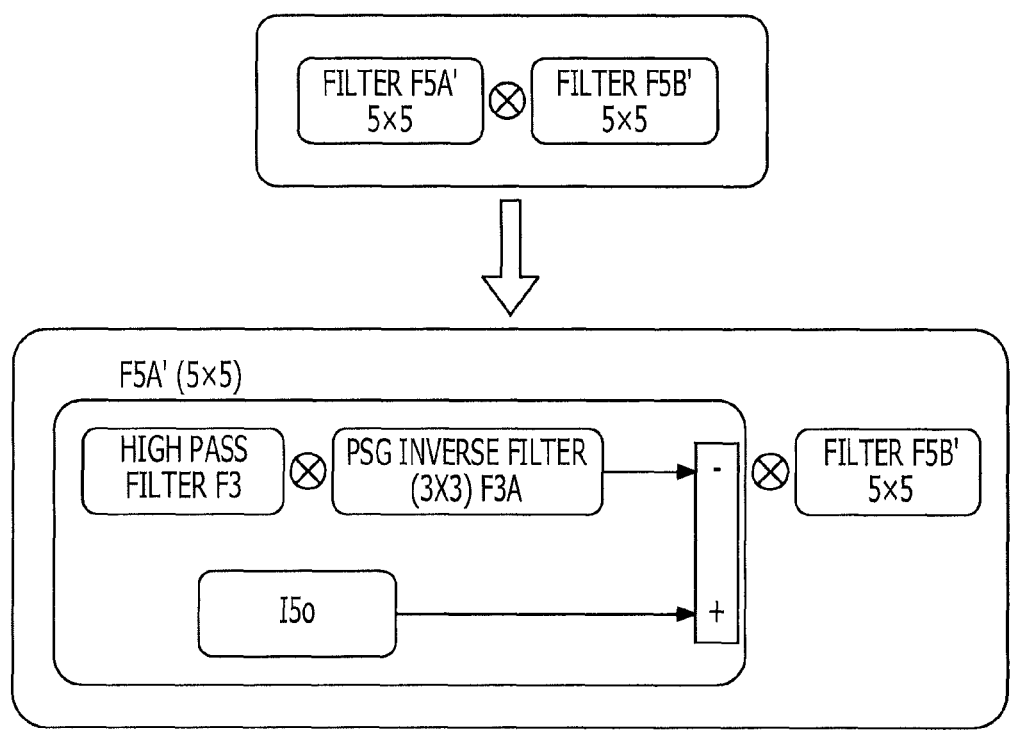
FIG. 52 is a view for explaining an outline of division method 5.

FIG. 52 is a view for explaining an outline of the division method 5. In an example illustrated in FIG. 52, the filter generation unit 403 calculates the spatial filter F5A' (e.g., a fifth spatial filter) in a first stage by convolving the spatial filter F3A (e.g., a fourth spatial filter) having anisotropy with the high pass filter F3 and subtracting the result from $I5_0$. The filter generation unit 403 calculates the spatial filter F5B' (e.g., a sixth spatial filter) in the second stage by minimizing the estimation function.

Accordingly, the high pass filter is formed in the first stage to prevent the generation of Moiré and further, a configuration for improving anisotropy is formed such that a filter is divided into filters in plural stages. Therefore, it is possible to cope with the improvement of the blur having the size larger than the number of elements.

Figure 53:
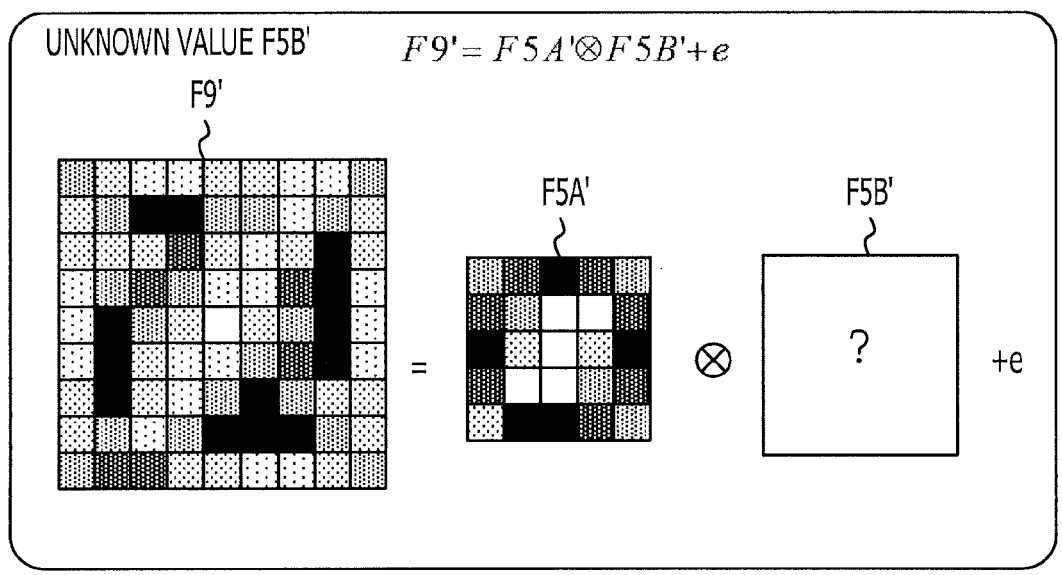
FIG. 53 is a view for explaining a calculation example of the filters in plural stages according to the division method 5.

FIG. 53 is a view for explaining the calculation of the filters in plural stages according to the division method 5. In an example illustrated in FIG. 53, the filter generation unit 403 extracts a filter of 3×3 elements from the first spatial filter 211 and calculates the spatial filter F5A of 5×5 elements by convolving the extracted filter with the high pass filter (e.g., equation (26) or equation (27)) of 3×3 elements. The filter generation unit 403 calculates the spatial filter F5A' by subtracting the spatial filter F5A from J0.

The filter generation unit 403 may calculate the spatial filter F5B' in the second stage by minimizing the estimation function using the third spatial filter F9' and the spatial filter F5A'.

Figure 54:
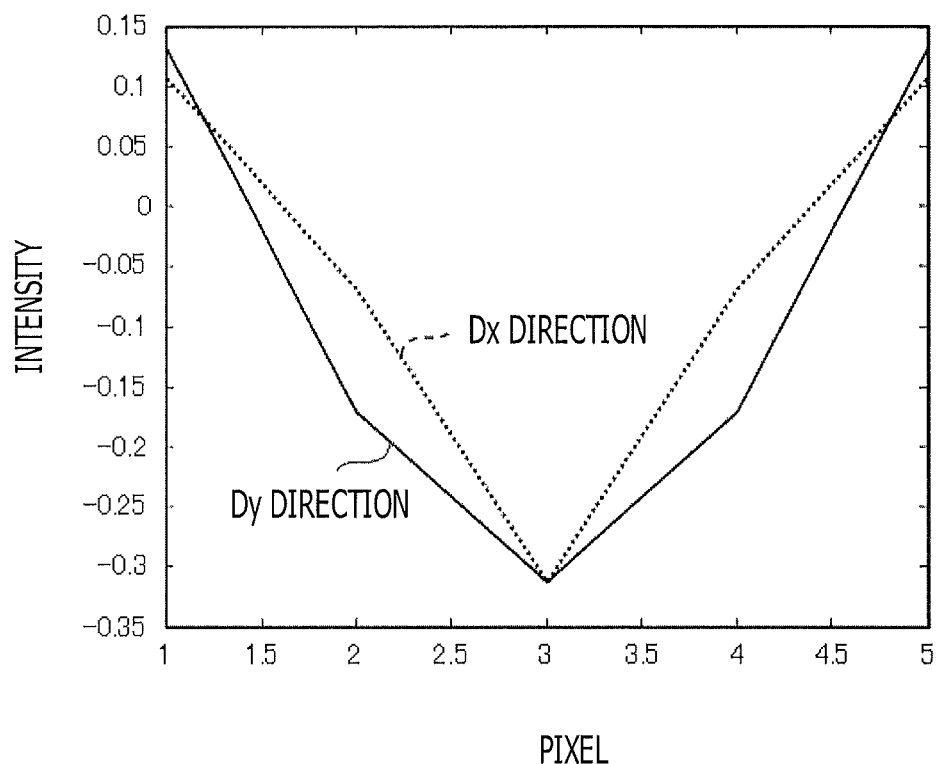
FIG. 54 is a view illustrating intensity at each pixel of a spatial filter F5.

FIG. 54 is a view illustrating the intensity at each pixel of the spatial filter F5. An example illustrated in FIG. 54 represents intensity variation of the spatial filter F5 in two directions (e.g., Dx is a transversal direction and Dy is a longitudinal direction). In this case, a total sum of values of elements of the spatial filter F5 becomes 0 (zero).

Figure 55:
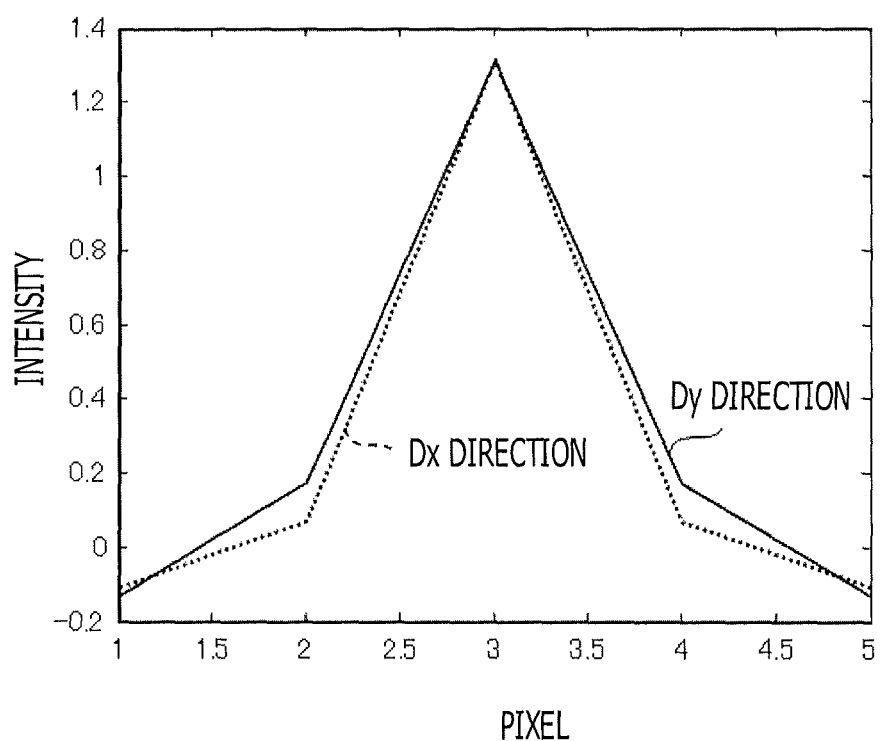
FIG. 55 is a view illustrating intensity at each pixel of a spatial filter F5'

FIG. 55 is a view illustrating intensity at each pixel of a spatial filter F5'. An example illustrated in FIG. 55 represents intensity variation of the spatial filter F5' in two directions (e.g., Dx is a transversal direction and Dy is a longitudinal direction). In this case, a total sum of values of elements of the spatial filter F5' becomes 1 (one).

Figure 56A:
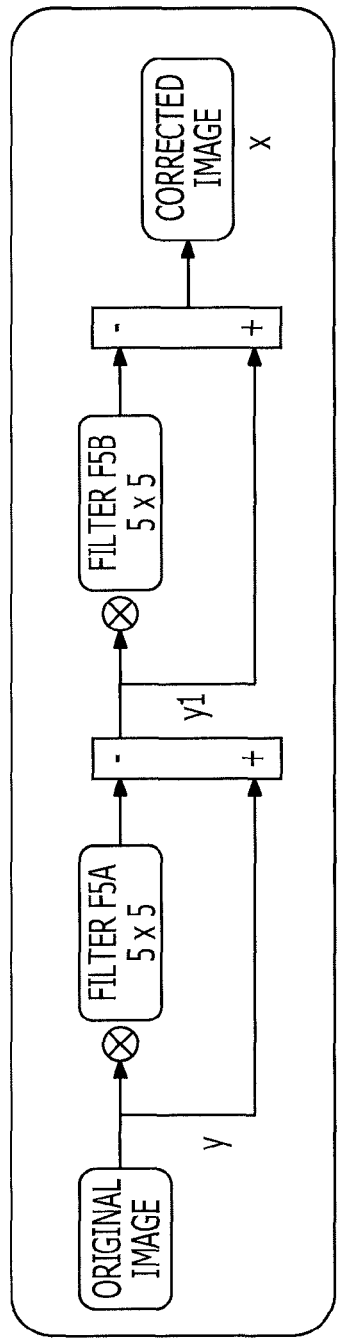
FIG. 56A is a view illustrating an example of the filter processing unit.

FIG. 56 is a view for explaining generation of a corrected image in the embodiment 1. In the example illustrated in FIG. 56A, the filter processing unit 152 generates a corrected image "x" using the following equations (31) and (32).

$$y1 = y - F5A \otimes y \quad (31)$$

$$x = y1 - F5B \otimes y1 \quad (32)$$

Figure 56B:
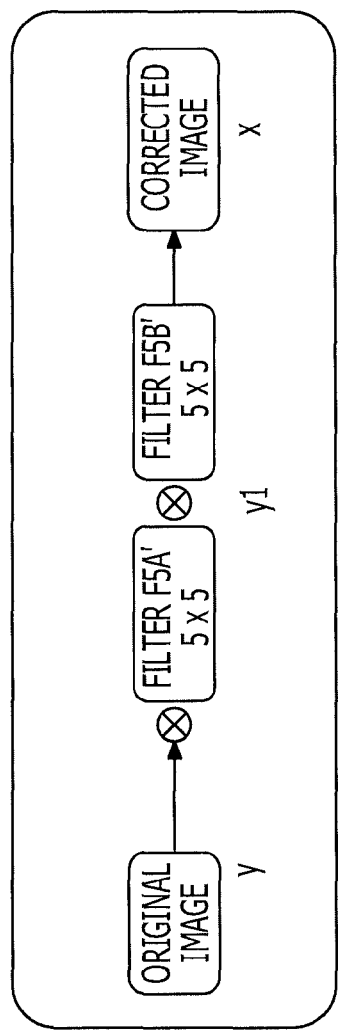
FIG. 56B is a view illustrating an example of the filter processing unit.

In the example illustrated in FIG. 56B, the filter processing unit 152 generates a corrected image "x" using the following equations (33), (34), (35) and (36).

$$y1 = F5A' \otimes y \quad (33)$$

$$F5A = I0 - F5A' \quad (34)$$

$$X = F5B' \otimes y1 \quad (35)$$

$$F5B = I0 - F5B' \quad (36)$$

The spatial filter F5A' is a combination of the spatial filter having anisotropy and the high pass filter, and the spatial filter F5B' is responsible for supplementing omission of the spatial filter having anisotropy. Further, a convolution sequence may be reversed.

Figure 57:
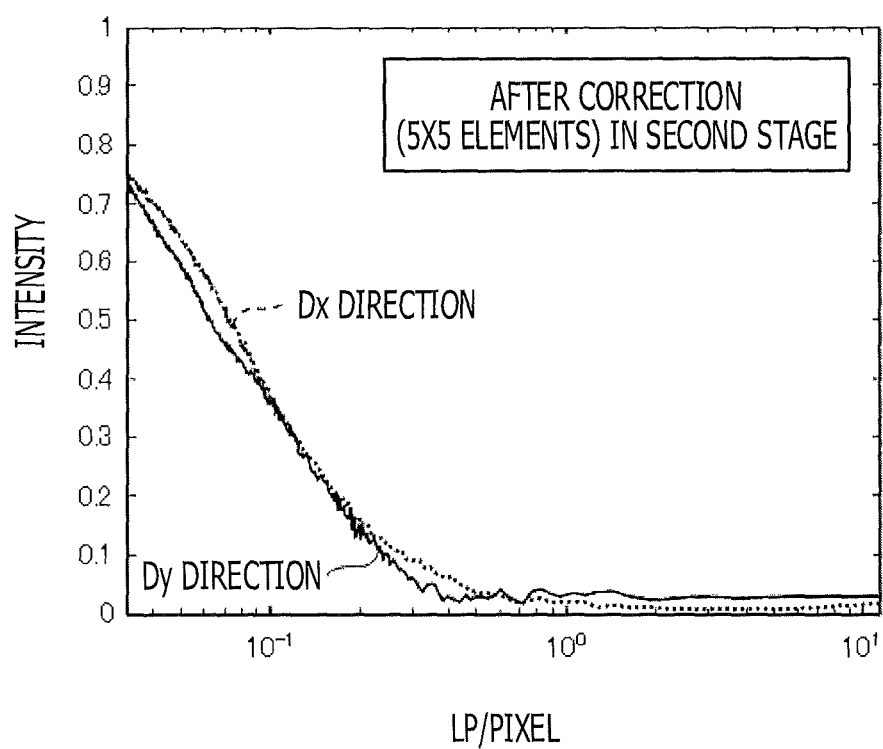
FIG. 57 is a view illustrating a resolution analysis result for an image after correction according to the division method 5.

FIG. 57 is a view illustrating the resolution analysis result for an image after correction according to the division method 5. As illustrated in FIG. 57, according to the division method 5, when the spatial filters in anisotropy in resolution are finitized to a predetermined number of elements, degradation of image quality may be prevented. That is, the spatial filter may be divided into the spatial filter in plural stages and thus, generation of Moiré may be prevented while improving anisotropy in the division method 5.

(Number of Stages)

The filter generation units 204, 403 determine the numbers of spatial filters to be divided based on a size of a first spatial filter and a predetermined number of elements when dividing the spatial filters into the spatial filter in plural stages.

Figure 58:
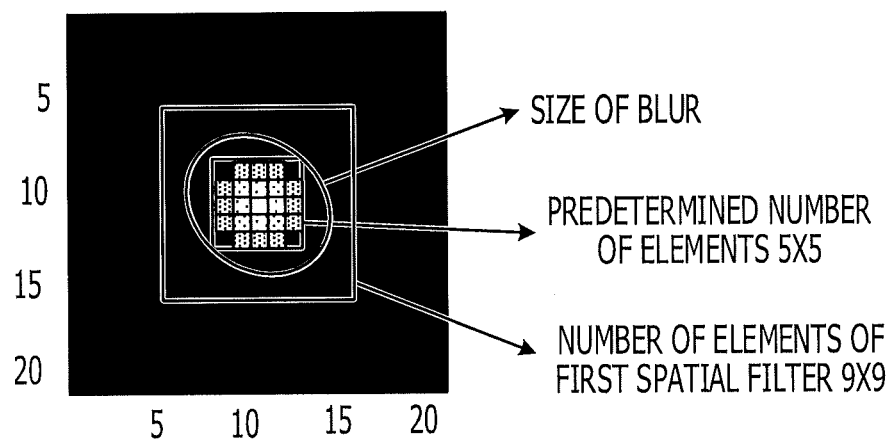
FIG. 58 is a view illustrating a (first) relationship between a predetermined number of elements and a size of blur.

FIG. 58 is a view illustrating a (first) relationship between a predetermined number of elements and a size of blur. In an example illustrated in FIG. 58, it is assumed that the predetermined number of elements is 5×5 elements and the size of blur is less than 9×9 elements. In this case, the filter calculation units 203, 402 calculate a first spatial filter of 9×9 elements. The filter generation units 204, 403 generate two-stage spatial filters of 5×5 elements based on the first spatial filter of 9×9 elements.

Figure 59:
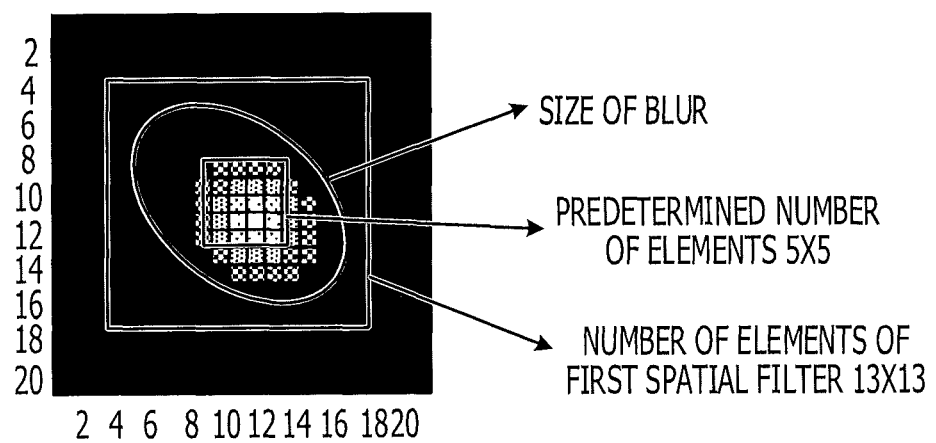
FIG. 59 is a view illustrating a (second) relationship between the predetermined number of elements and the size of blur.

FIG. 59 is a view illustrating a (second) relationship between the predetermined number of elements and the size of blur. In an example illustrated in FIG. 59, it is assumed that the predetermined number of elements is 5×5 and the size of blur is less than 13×13 elements. In this case, the filter calculation units 203, 402 calculate the first spatial filter of 13×13 elements. The filter generation units 204, 403 generate three-stage spatial filters of 5×5 elements based on the first spatial filter of 13×13 elements.

The filter generation unit 204, 403 first divide a second spatial filter of 13×13 elements or a third spatial filter of 13×13 elements into a spatial filter of 9×9 elements and the spatial filter of 5×5 elements. Subsequently, the filter generation units 204, 403 divide the spatial filter of 9×9 elements into two-stage spatial filters of 5×5 elements in the same manner.

When the predetermined number of elements is 3×3 elements, the filter generation unit 204, 403 need to divide the spatial filter into more plural stages. Further, when the number of elements of the first spatial filter generated by the filter calculation unit 203 is 7×7 elements, the filter generation units 204, 403 divide the spatial filter into two-stage spatial filters of 5×5 elements and 3×3 elements. As such, sizes of filters to be divided may differ from each other.

However, when the number of elements of the spatial filter in plural stages are equal, the filter processing unit 152 uses one convolution circuit to repeatedly perform the same process at least two times. Therefore, the spatial filter in plural stages having the same number of elements and having a larger size of the spatial filter is more efficient. Accordingly, when the filter calculation unit 203 sets the size of the first spatial filter larger than the blur to 9×9 elements, the filter generation units 204, 403 may generate two-stage spatial filters having the same number of elements (for example, 5×5 elements).

<Gain Multiplication>

Here, the error of difference "e" does not become zero with respect to the estimation function represented by the following equation (30). Accordingly, gain is set and multiplied to the spatial filter in plural stages obtained by minimizing the estimation function to improve accuracy.

FIG. 60 is a view illustrating generation of a corrected image when multiplying gain. In FIG. 60A, the filter processing unit 152 multiplies a value processed with each spatial filter by a predetermined gain. That is, the filter processing unit 152 generates the corrected image "x" using the following equations (37) and (38).

$$y1 = y - \text{Gain1} \times F5A \otimes y \quad (37)$$

$$x = y1 - \text{Gain2} \times F5B \otimes y1 \quad (38)$$

In the equations (37) and (38), Gain1 and Gain2 are obtained by, for example, minimizing the estimation function using the chart illustrated in FIG. 4. The gain estimation function is, for example, a function which represents a distance of MTF in two directions, and Gain1 and Gain2 that minimize the estimation function are obtained. Further, the estimation function of gain may be, for example, a function which represents a distance of MTF in the middle of two directions. The gain calculation may be made by the post-processing unit 5.

FIG. 60B illustrates an example in which the filter processing unit 152 multiplies each spatial filter by gain to generate a new spatial filter. In an example illustrated in FIG. 60B, the filter processing unit 152 generates a corrected image "x" using the following equations (39) and (40).

$$y1 = y - F5A_{new} \otimes y \quad (39)$$

$$x = y1 - F5B_{new} \otimes y1 \quad (40)$$

Figure 61:
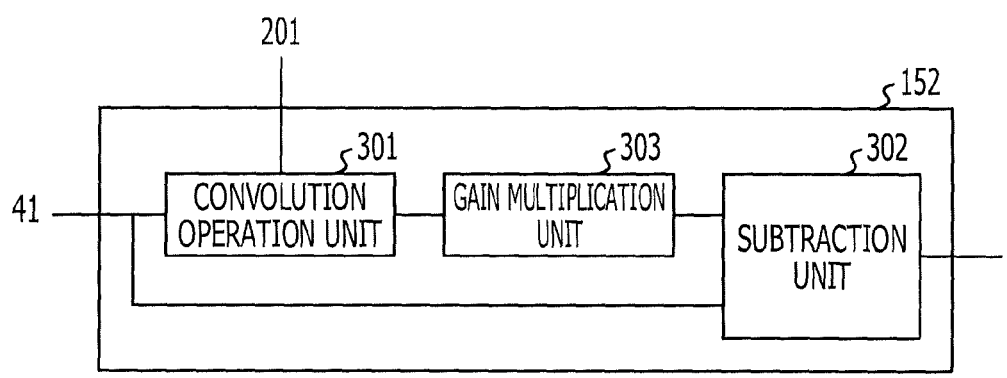
FIG. 61 is a block diagram illustrating another exemplary schematic configuration of the filter processing unit in the embodiment 1.

FIG. 61 is a block diagram illustrating another exemplary schematic configuration of the filter processing unit in the embodiment 1. The filter processing unit 152 illustrated in FIG. 61 includes the convolution operation unit 301, a gain multiplication unit 303 and the subtraction unit 302. In a configuration illustrated in FIG. 61, the same reference numerals are given to the same configuration as illustrated in FIG. 40.

The gain multiplication unit 303 multiplies a value after processing of each spatial filters divided in plural stages by a predetermined gain. The gain multiplication unit 303 analyzes resolution before and after multiplication of gain is performed to acquire gain with which anisotropy may be best improved from the post-processing unit 5 as a predetermined gain.

The configuration illustrated in FIG. 61 is based on the configuration of FIG. 60A, but the gain multiplication unit 303 may be included in the convolution operation unit 301 (e.g., see FIG. 60B).

<Operation>

Figure 62:
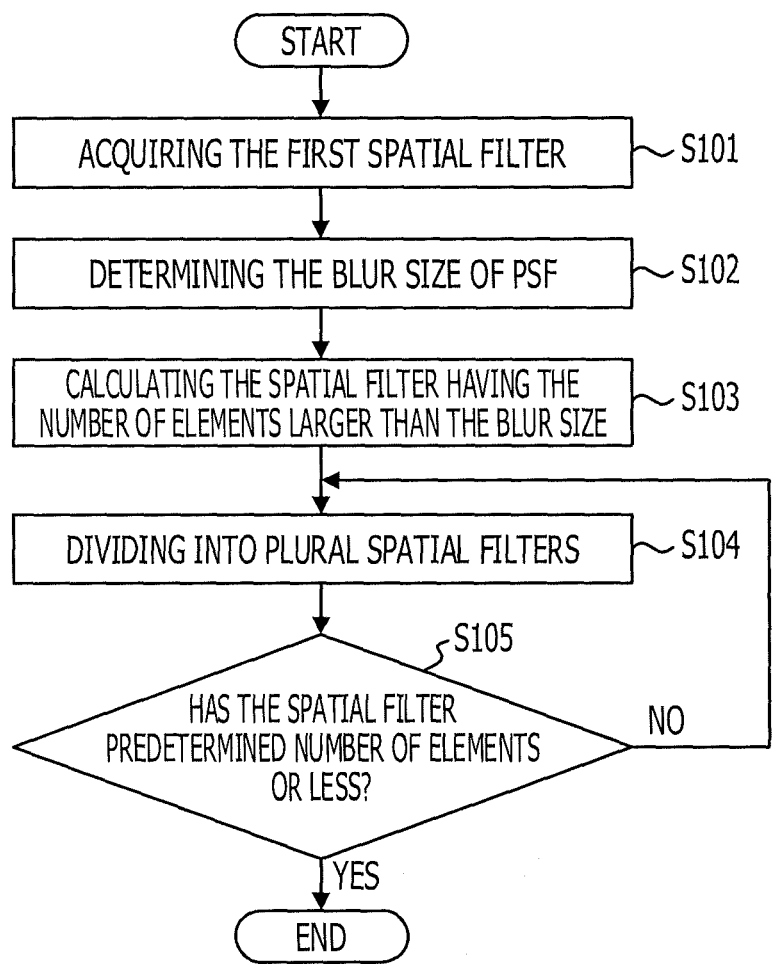
FIG. 62 is a flow chart illustrating an example of a filter generation process in the embodiment 1.

The operations of the image processing unit 15 in the embodiment 1 will be described next. FIG. 62 is a flow chart illustrating an example of a filter generation process in the embodiment 1. The process illustrated in FIG. 62 represents a filter generation process by the division method 5.

At step S101, the filter acquisition unit 202 acquires the first spatial filter from the filter storage unit 201.

At step S102, the determination unit 231 determines the blur size of PSF. The determination unit 231 determines, for example, the blur size of PSF based on a major axis and a minor axis obtained with analysis of resolution. Further, the determination unit 231 may acquires the PSF which is a result acquired from a lens design value by simulation as described in Japanese Laid-Open Patent Publication No. 2012-23498.

At step S103, the filter calculation unit 402 extracts the spatial filter having the number of elements larger than the size of the blur from the first spatial filter and convolves the finite high pass filter to calculate the second spatial filter (e.g., F9).

Further, the filter calculation unit 402 subtracts the second spatial filter from a filter in which a value of the center element is 1 (one) and values of elements other than the center element is 0 (zero) to calculate the third spatial filter (e.g., F9').

At step S104, the filter generation unit 403 divides the third spatial filter into plural spatial filters. For example, the filter generation unit 403 extracts the fourth spatial filter (e.g., F3) from the first spatial filter.

Further, the filter generation unit 403 generates a filter (e.g., F5A) obtained by convolving a finite filter in which total sum of values of elements is 0 (zero) and at least two elements are non-zero with the fourth spatial filter. The filter generation unit 403 subtracts the generated filter from a filter in which a value of the center element is 1 (one) and values of elements other than the center element is 0 (zero) to calculate the fifth spatial filter (e.g., F5A').

Further, the filter generation unit 403 minimizes the estimation function using the third spatial filter and the fifth spatial filter to calculate the sixth spatial filter (e.g., F5B').

At step S105, the filter generation unit 403 determines whether the fifth spatial filter and the sixth spatial filter are filters having the predetermined number of elements or less. When it is determined that each of the generated the spatial filters has the predetermined number of elements or less ("YES" at step S105), the fifth spatial filter and the sixth spatial filter are defined as the spatial filter, in plural stages. Further, when at least one of the generated spatial filters have the number of elements larger than the predetermined number of elements, the process goes back to step S104. The above-described process of generating plural spatial filters is repeated until each of the generated spatial filters becomes the predetermined number of elements or less.

Figure 63:
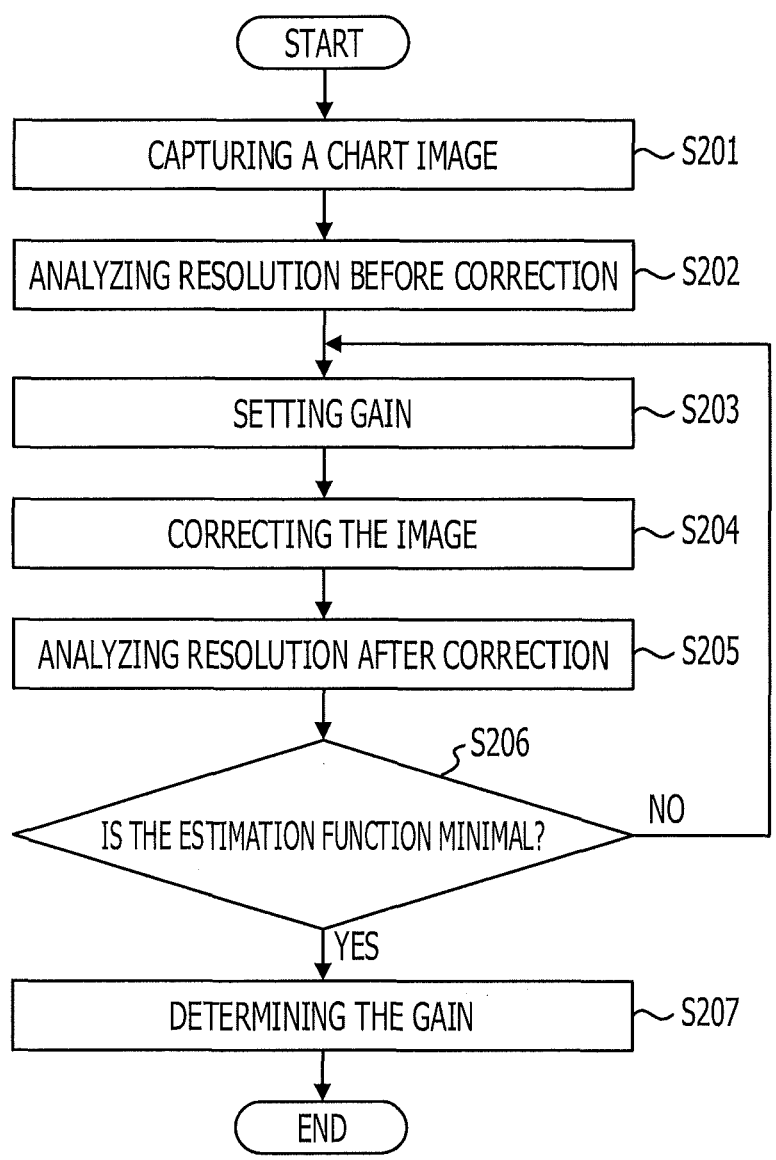
FIG. 63 is a flow chart illustrating an example of a gain determination process in the embodiment 1.

The process for determining gain will be described next. FIG. 63 is a flow chart illustrating an example of a gain determination process in the embodiment 1. At step S201 illustrated in FIG. 63, the image capturing apparatus captures a chart image.

At step S202, the post-processing unit 5 analyzes resolution before correction. At step S203, the post-processing unit 5 set an initial value of gain.

At step S204, the image processing unit 15 multiplies the above-described plural spatial filter by the set gain to correct the image.

At step S205, the post-processing unit 5 analyzes resolution after correction. At step S206, the post-processing unit 5 determines whether the gain estimation function becomes minimal. When it is determined that the gain estimation function is minimal ("YES" at step S206), the process proceed to step S207. When the gain estimation function is not minimal ("No" at step S206) the process goes back step S203, and gain is changed.

At step S207, the post-processing unit 5 determines gain with which the gain estimation function becomes minimal and sets the determine gain in the gain multiplication unit 303.

As described above, according to embodiment 1, when the spatial filter having anisotropy in resolution is made to be finitized to have a predetermined number of elements, degradation of image may be prevented.

Embodiment 2

An image capturing apparatus including an image processing apparatus in embodiment 2 will be described next. Noise emphasized by the correction performed for improving resolution is reduced in embodiment 2.

The flat portion as well as noise component are included in the captured image. Therefore, even the flat portion causes an image to include a minute amplitude variation.

Here, as illustrated in embodiment 1, when correction is made for the image to improve resolution, an effect of amplitude magnification occurs, but the noise component including the minute amplitude variation causes the amplitude to be magnified. Therefore, the noise at the flat portion is emphasized.

FIG. 64 is a view illustrating an example of a noise before and after the resolution is corrected. FIG. 64A illustrates an example of noise at the flat portion of the captured image. FIG. 64B illustrates an example of noise after resolution is corrected. Noise is emphasized due to the correction of resolution in the example illustrated in FIG. 64B.

A low pass filter is used to reduce noise. However, the low pass filter filters the entire image and thus, when the noise in the flat portion is to be reduced, the edge portion originally intended to be corrected changes to a gentle shape.

Therefore, it becomes important to reduce the noise non-linearly for the flat portion and the edge portion. There is a coring process as a known non-linear noise process. See, for example, Japanese Laid-Open Patent Publication No. 2008-199448.

In the coring process, when an input value is a threshold value or less, an output is made to be 0 to prevent the noise from being emphasized. Further, in the coring process, when an input value is larger than a threshold value, the amplitude of an output is reduced to be small such that a discontinuity is avoided.

The following object to be solved arises in a case where the coring process is just applied after the filtering of each spatial filtering of the embodiment 1.

Figure 65:
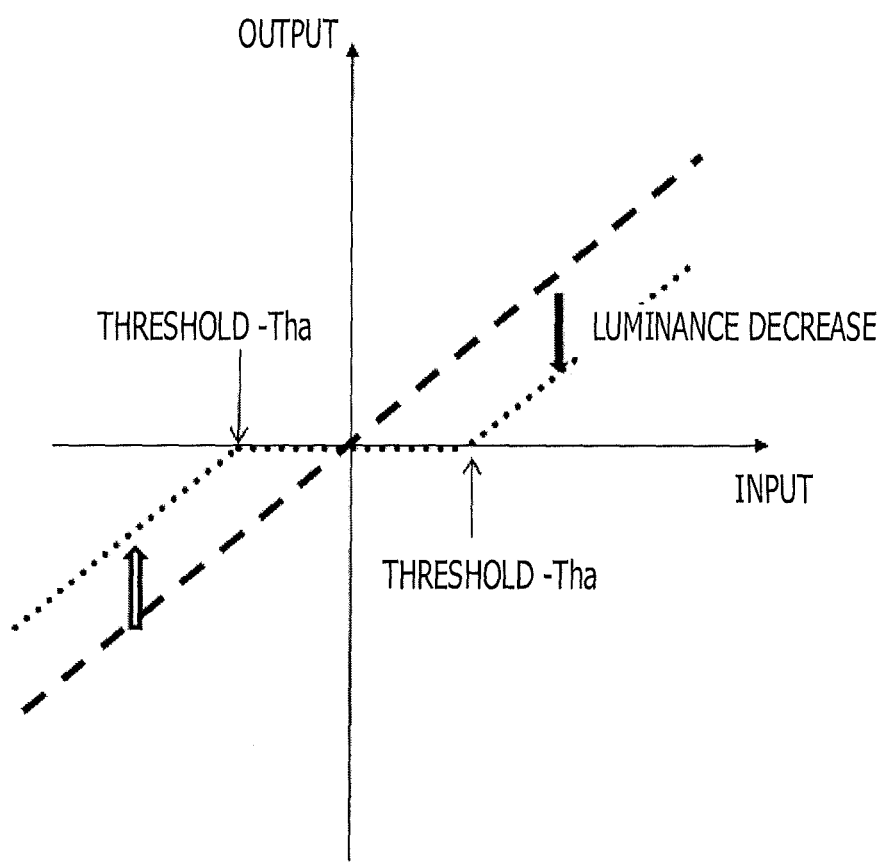
FIG. 65 is a view illustrating luminance decrease.

FIG. 65 is a view illustrating luminance reduction. Luminance is reduced in the coring process as illustrated in FIG. 65. Accordingly, even when the coring process is applied to any one of the spatial filters in plural stages in the embodiment 1, the gain balance of the coring process to degradation of amplitude is different depending on the direction due to anisotropy of the spatial filter and thus, it is unable to improve anisotropy.

Figure 66:
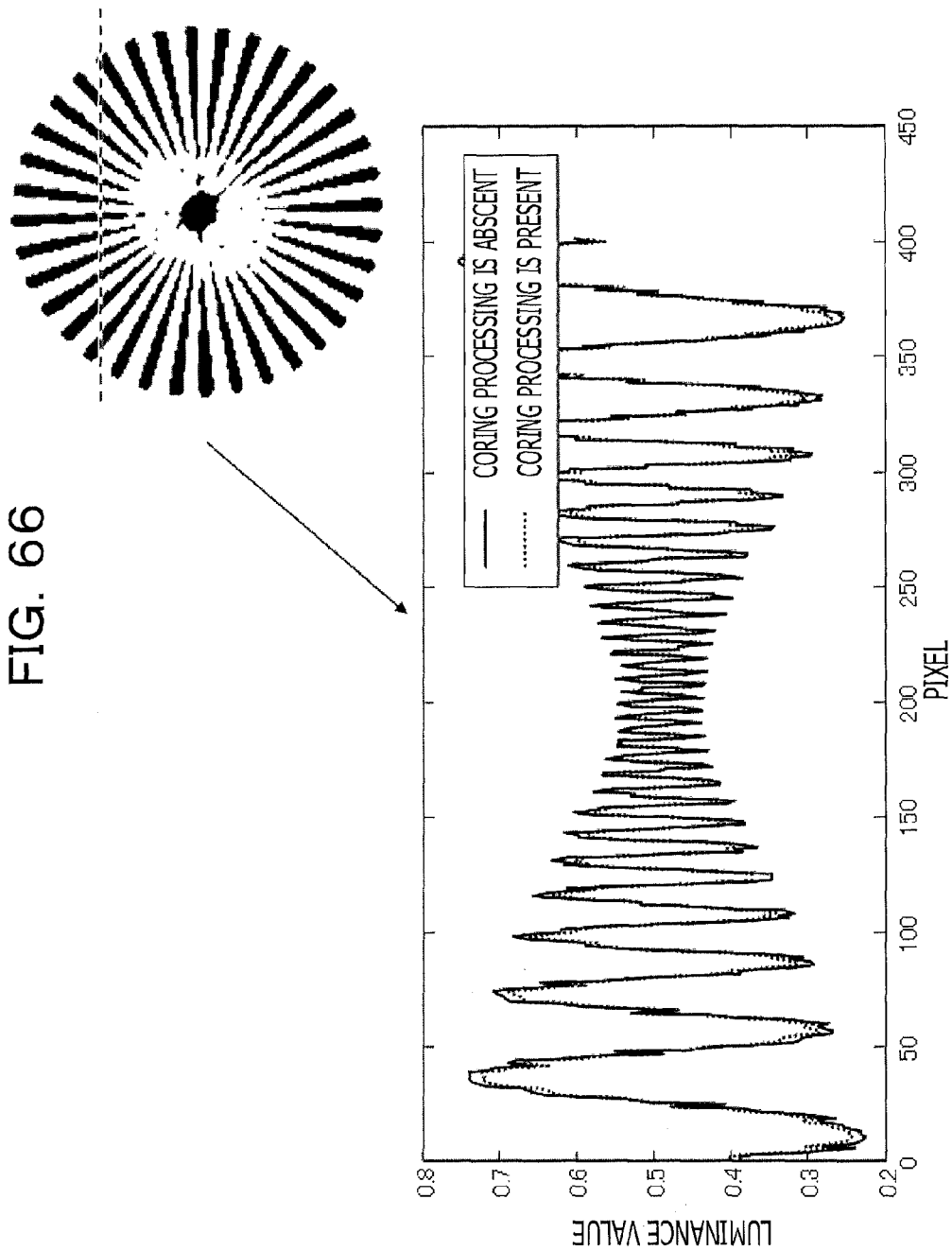
FIG. 66 is a view for explaining amplitude degradation according to a coring process.

FIG. 66 is a view for explaining amplitude degradation according to a coring processing. The coring process is applied such that the amplitude of luminance value is reduced as illustrated in FIG. 66.

Figure 67A:
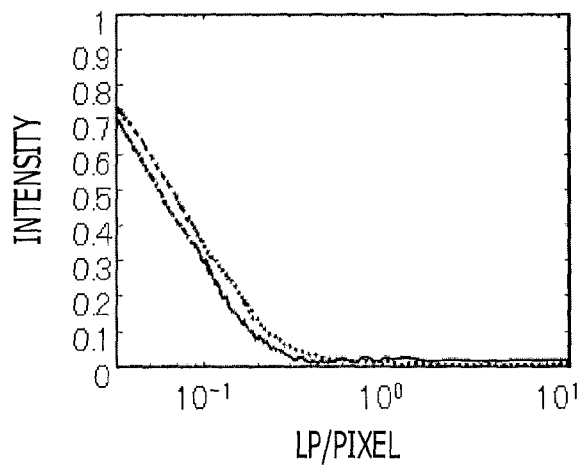
FIG. 67A is a view illustrating a resolution analysis result in a case where the coring process is applied to luminance value after the filtering of the spatial filter in a first stage.
Figure 67B:
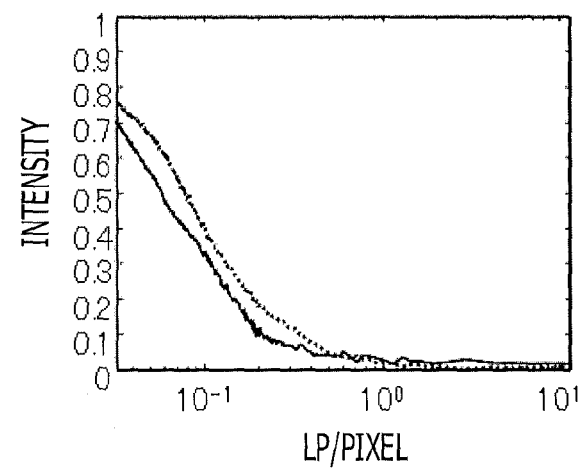
FIG. 67B is a view illustrating a resolution analysis result in a case where the coring process is applied to luminance value after the filtering of the spatial filter in a second stage.
Figure 67C:
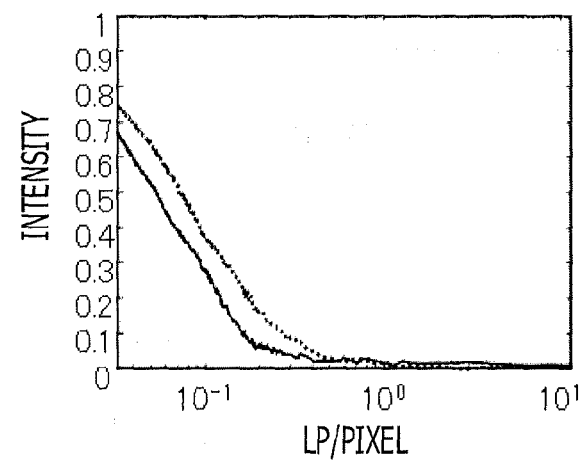
FIG. 67C is a view illustrating a resolution analysis result in a case where the coring process is applied to the luminance value after the filtering process of the spatial filters in the first and the second stages.

FIG. 67 is a view illustrating a resolution analysis result for an image to which the coring processing is applied. FIG. 67A illustrates a resolution analysis result in a case where the coring process is applied to luminance value after the filtering of the spatial filter in a first stage. FIG. 67B illustrates a resolution analysis result in a case where the coring process is applied to luminance value after the filtering of the spatial filter in a second stage. FIG. 67C illustrates a resolution analysis result in a case where the coring process is applied to the luminance value after the filtering process of the spatial filters in the first and the second stages.

As illustrated in FIG. 67, the coring process accompanying the degradation of amplitude is applied in the filtering of filters in plural stages having anisotropy, the degradation of gain varies depending on the direction and thus, it is unable to improve anisotropy.

Therefore, in the embodiment 2 to be described below, a predetermined gain is determined with respect to an absolute value of a value after the filtering of the filter in such a manner that when the absolute value is equal to or less than a lower threshold value, gain is set to 0 (zero). When the absolute value is equal to or more than an upper threshold value, gain is set to a constant value, and when the absolute value is between the lower threshold value and the upper threshold value, gain is made to be varied in stepwise fashion.

Figure 68:
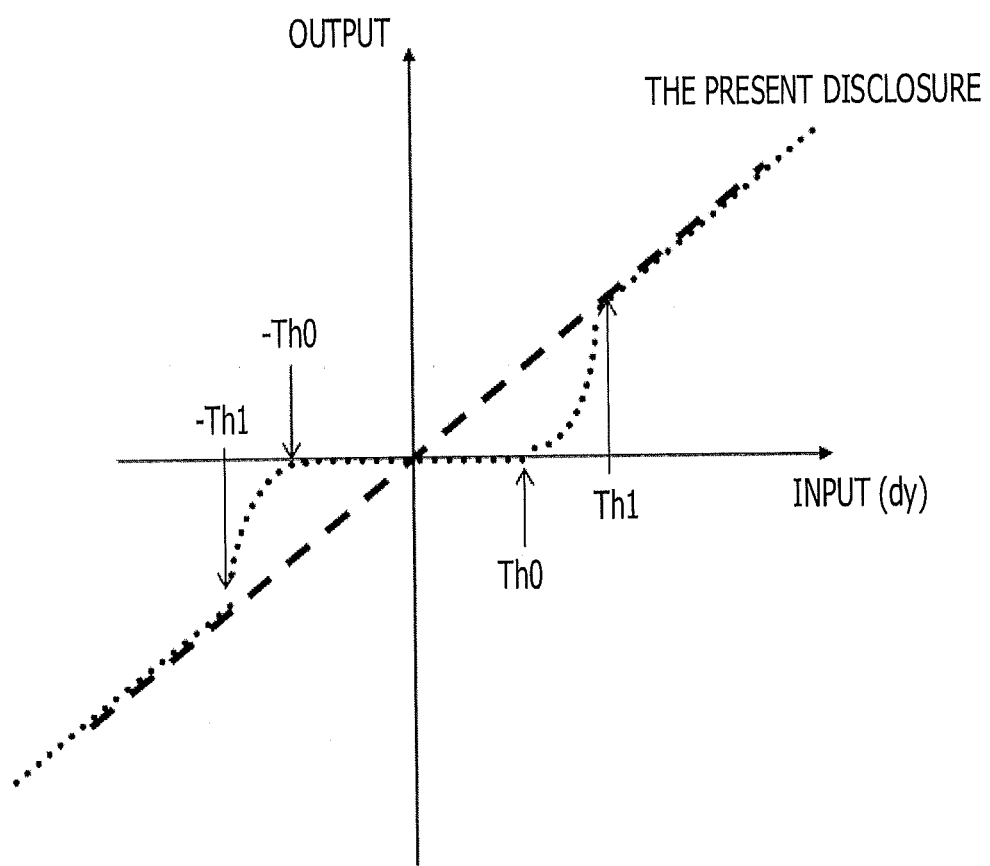
FIG. 68 is a view illustrating an example of an input-output relationship of a luminance value in the embodiment 2.

FIG. 68 is a view illustrating an example of an input-output relationship of the luminance value in the embodiment 2. As illustrated in FIG. 68, when an input (in(dy)) is between a threshold value −Th0 or more and a threshold value Th0 or less, an output is set to 0 (zero) and when the input (in(dy)) is larger than a threshold value Th1, the input and the output are the same. Further, when the input is between the threshold value Th0 and the threshold value Th1, the output varies in stepwise fashion.

<Configuration>

The image capturing apparatus in the embodiment 2 is similar to the image capturing apparatus in the embodiment 1 and thus, the same reference numerals are given to the same components to describe the embodiment 2.

(Filter Processing Unit)

Figure 69:
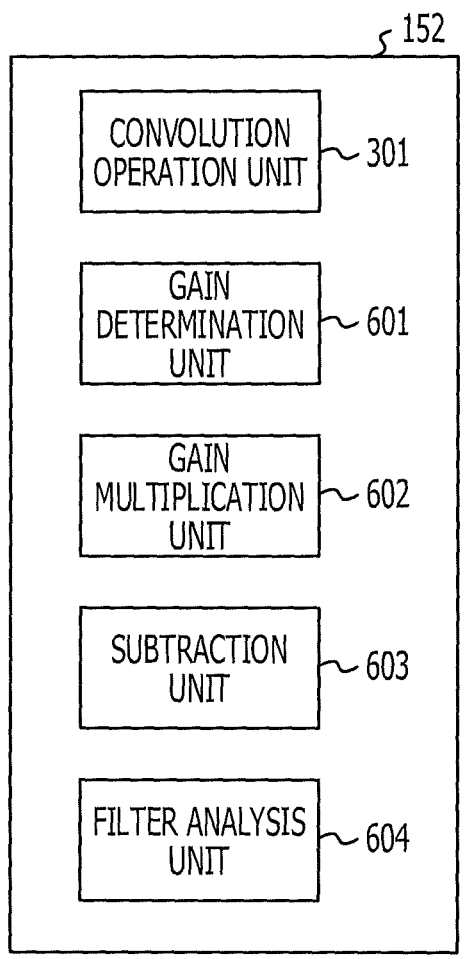
FIG. 69 is a block diagram illustrating another exemplary schematic configuration of the filter processing unit in the embodiment 2.

The filter processing unit 152 in the embodiment 2 will be described next. FIG. 69 is a block diagram illustrating another exemplary schematic configuration of the filter processing unit in the embodiment 2. The filter processing unit 152 will be described. The filter processing unit 152 includes a convolution operation unit 301, a gain determination unit 601, a gain multiplication unit 602, a subtraction unit 603 and a filter analysis unit 604.

The same reference numerals are given to the same configuration of the filter processing unit 152 in the embodiment 2 as the configuration illustrated in FIG. 40 in the embodiment 1.

The gain determination unit 601 determines the threshold value of an absolute value of the luminance value subjected to convolution to determine gain. A gain determination process will be described later.

The gain multiplication unit 602 multiplies the luminance value after the filtering by gain determined by the gain determination unit 601. Further, the gain multiplication unit 602, when convolution is performed at plural stages, at least one gain multiplication may be performed or gain multiplication may be performed at all the plural stages.

The subtraction unit 603 calculates the difference between the image to which gain is multiplied and the original image. The processing described above performed the number of times that is equals to the number of plural stages.

The filter analysis unit 604 analyzes intensity of filter of the spatial filters in plural stages based on coefficients of filter and determines the spatial filter for which gain is multiplied based on a result of analysis. For example, the filter analysis unit 604 determines a spatial filter in such a manner that a value subjected to the filtering in the spatial filter having the strongest intensity of filter is multiplied by gain. In the meantime, the filter analysis unit 604 is not a necessary component for the filter processing unit 152. Further, the filter analysis unit 604 is just needed to determine that the intensity of filter is stronger as the difference between the maximum filter coefficient and the minimum filter coefficient becomes gradually larger.

Figure 70:
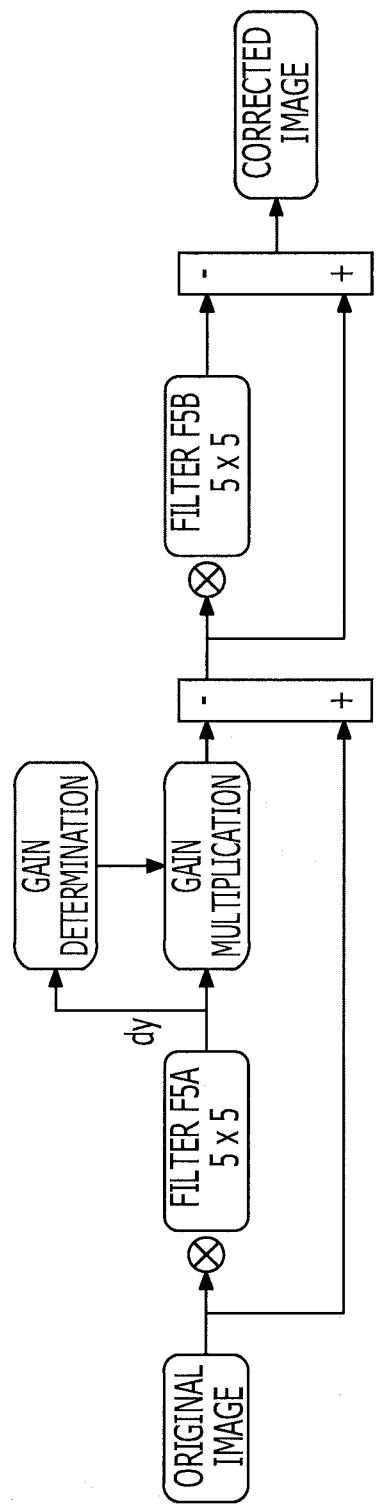
FIG. 70 is a view for explaining a (first) corrected image generation process in the embodiment 2.

FIG. 70 is a view for explaining a (first) corrected image generation process in the embodiment 2. In the example illustrated in FIG. 70, the luminance value obtained by convolving the original image with a filter of 5×5 elements in a first stage of is denoted by the value (dy(in)). The gain determination unit 601 determines gain by the value (dy). The gain multiplication unit 602 multiplies the "dy" by the determine gain.

The "dy" to which gain is multiplied is subtracted from the original image. The original image after subtraction is subjected to the filtering in a second stage. A corrected image is generated by subtracting the result of the second stage of the filtering from the original image after subtraction.

Figure 71:
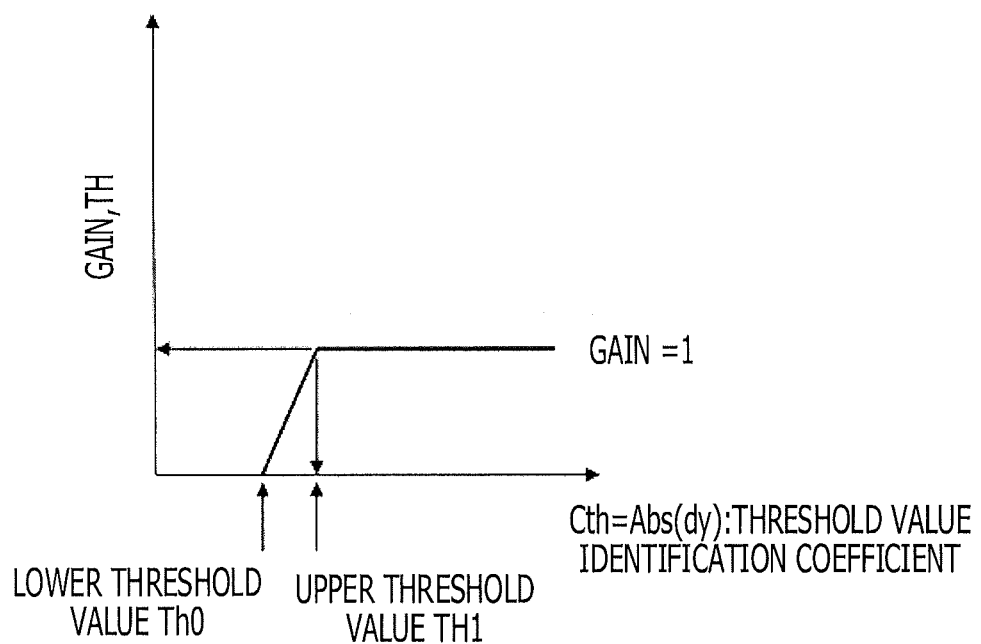
FIG. 71 is a view for explaining a (first) gain determination in the embodiment 2.

FIG. 71 is a view for explaining a (first) determination of gain in the embodiment 2. As illustrated in FIG. 71, two threshold values (e.g., Cth which is also referred to as a threshold value identification coefficient) are prepared for an absolute value of a value obtained by convolving the filter. When the Cth is equal to or less than a lower threshold value Th0, the gain determination unit 601 sets gain to 0 (zero). When the Cth is equal to or more than an upper threshold value Th1, the gain determination unit 601 sets gain to a constant value (e.g., gain=1). Further, when the Cth is between the lower threshold value Th0 and the upper threshold value Th1, the gain determination unit 601 sets gain to be varied in stepwise fashion. As a result, a relationship between the input (dy) and the output (out) is represented as illustrated in FIG. 68.

<Effect>

The effect according to the embodiment 2 will be described next. FIG. 72 is a view for explaining an (first) effect in the embodiment 2. The expression "threshold value processing is absent" illustrated in FIG. 72 represents a result of processing performed in the embodiment 1. The expression "threshold value processing is present" illustrated in FIG. 72 represents a result of processing performed in the embodiment 2.

Figure 72A:
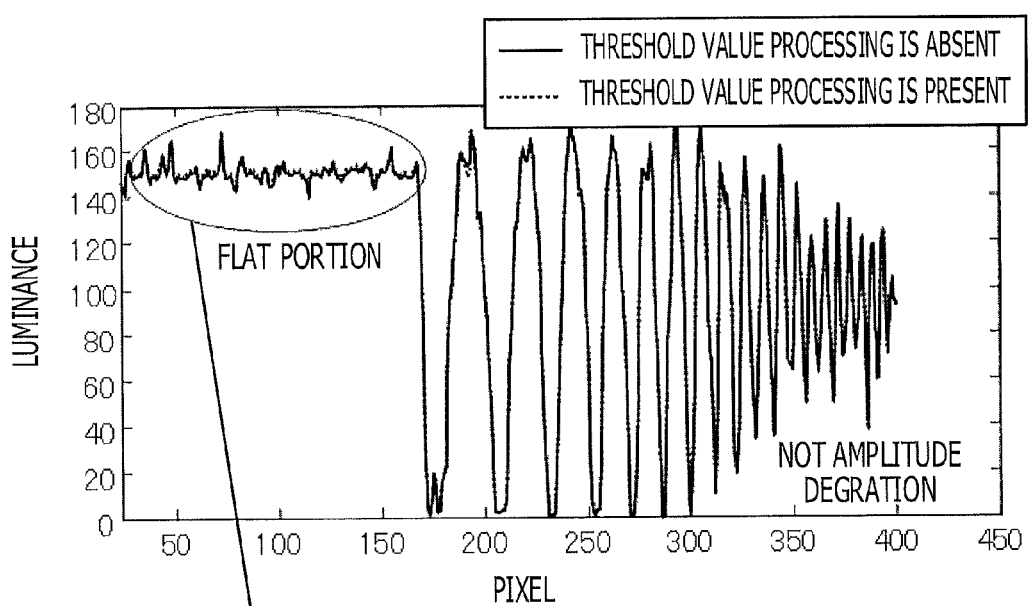
FIG. 72A is a view for explaining an (first) effect according to the embodiment 2.
Figure 72B:
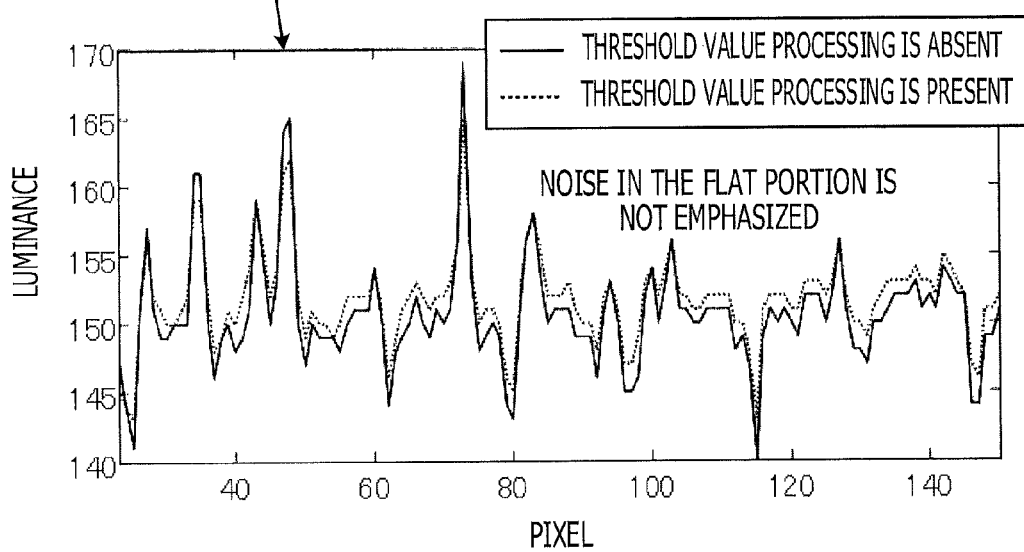
FIG. 72B is a view which magnifies a portion (e.g., a flat portion) where variation of amplitude is smaller than the threshold value.

As illustrated in FIG. 72A, the degradation of amplitude is negligible in the "threshold value processing is present" compared to that in the "threshold value processing is absent" at a portion where the amplitude is large. FIG. 72B is a view which magnifies a portion (e.g., a flat portion) where variation of amplitude is smaller than the threshold value. As illustrated in FIG. 72B, it may be seen that the amplitude in the "threshold value processing is present" is not much emphasized compared to that in the "threshold value processing is absent" at the flat portion.

FIG. 73 is a view for explaining an (second) effect in the embodiment 2. The expression "before correction" illustrated in FIG. 73 represents the original image.

Figure 73A:
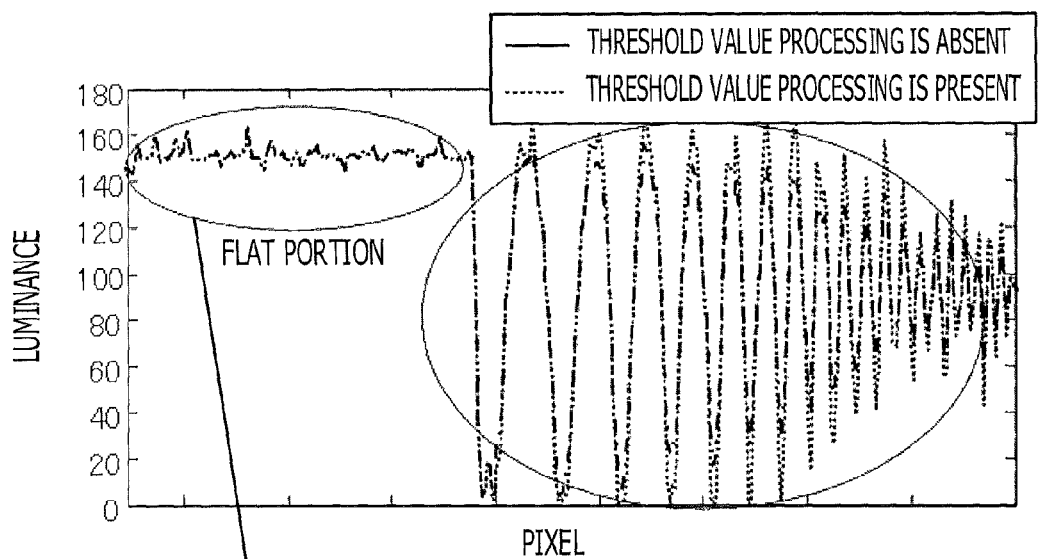
FIG. 73A is a view for explaining an (second) effect according to the embodiment 2.
Figure 73B:
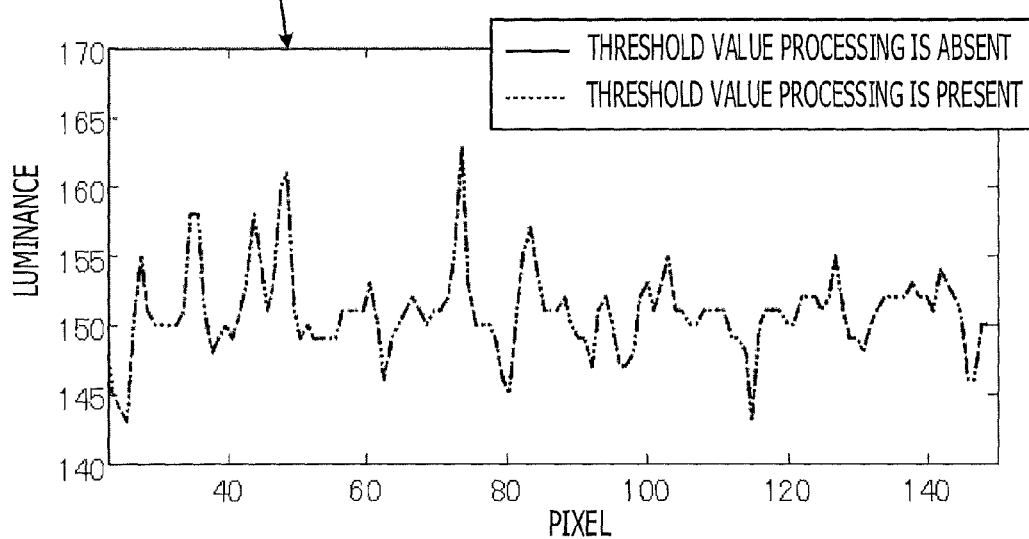
FIG. 73B is a view which magnifies a portion (e.g., a flat portion).

As illustrated in FIG. 73A, the resolution in the "threshold value processing is present" increases compared to that in the "before correction" at a portion where the amplitude is large. Further, as illustrated in FIG. 73B, the gain is set to zero in the "threshold value processing is present" and thus, the "threshold value processing is present" is equal to "before correction" and noise is not emphasized, at the flat portion.

Figure 74:
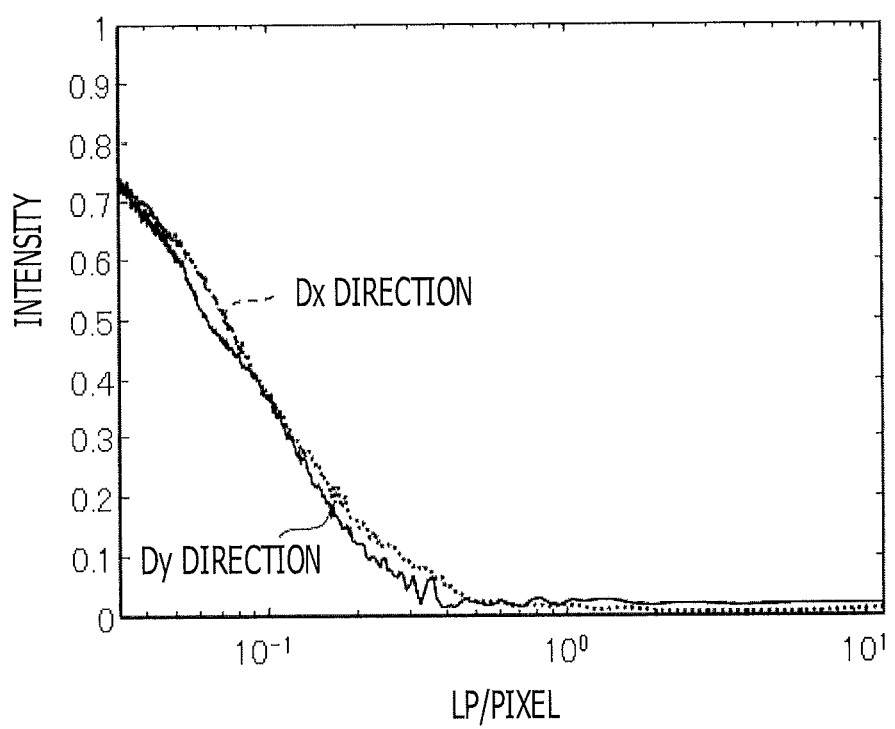
FIG. 74 is a view illustrating a resolution analysis result for an image after a threshold processing in the embodiment 2.

FIG. 74 is a view illustrating the resolution analysis result for an image after a threshold processing in the embodiment 2. As illustrated in FIG. 74, there is an effect of improving the anisotropy in resolution depending on the direction. That is, the anisotropy in resolution is improved and noise is prevented from being emphasized at the flat portion in the embodiment 2.

<Operation>

Figure 75:
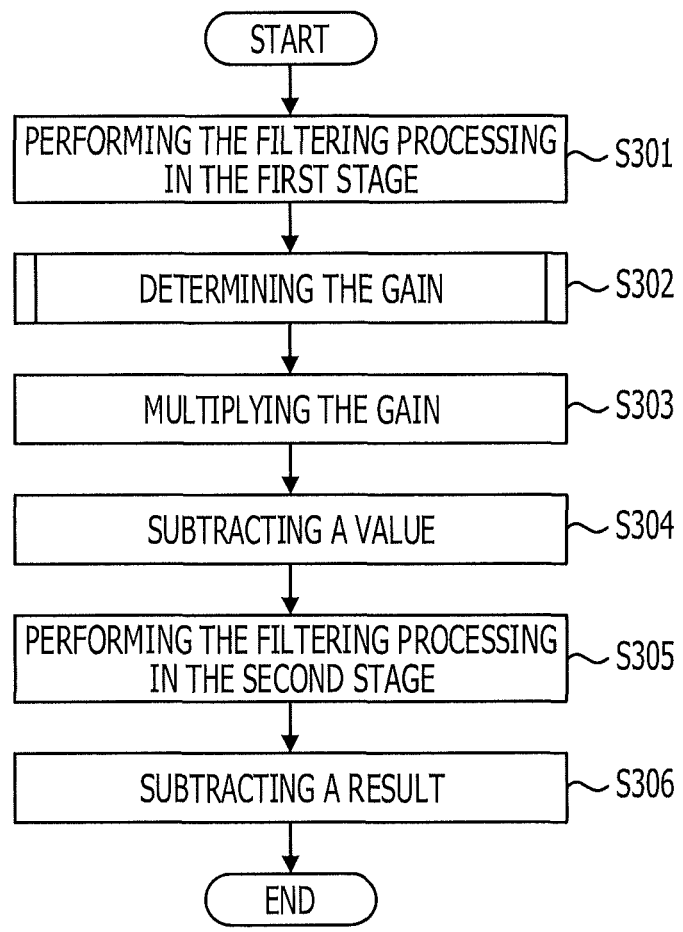
FIG. 75 is a view illustrating an example of a corrected image generation process in the embodiment 2.

The operations of the image processing unit 15 in the embodiment 2 will be described next. FIG. 75 is a view illustrating an example of a corrected image generation process in the embodiment 2. At step S301 illustrated in FIG. 75, the convolution operation unit 301 performs the first stage of the filtering on the original image.

At step S302, the gain determination unit 601 determines gain based on a value after the first stage of the filtering. The gain determination process will be described later.

At step S303, the gain multiplication unit 602 multiplies the value (dy) by the gain determined in the gain determination unit 601.

At step S304, the subtraction unit 603 subtracts the value (dy) to which gain is multiplied from the original image.

At step S305, the convolution operation unit 301 performs the second stage of the filtering on the original image for which subtraction is performed.

At step S306, the subtraction unit 603 subtracts the result of the second stage of the filtering from the original image for which subtraction is performed to generate a corrected image.

While the gain is multiplied after the first stage of the filtering in the above-described process, the gain may be multiplied after the second stage of the filtering or after each filtering as described in later.

Figure 76:
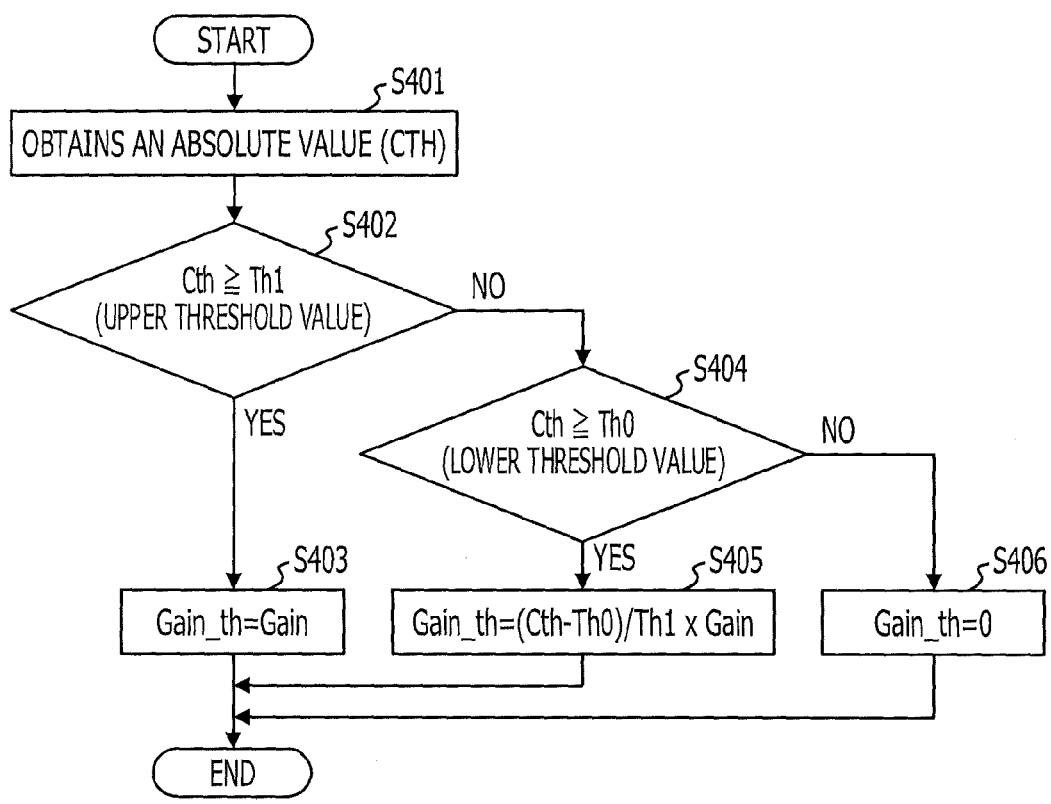
FIG. 76 is a view illustrating an example of a (first) gain determination process in the embodiment 2.

FIG. 76 is a view illustrating an example of a (first) gain determination process in the embodiment 2. At step S401 illustrated in FIG. 76, the gain determination unit 601 obtains an absolute value (Cth) of the value (dy) which has been subjected to a convolution.

At step S402, the gain determination unit 601 determines whether the absolute value (Cth) is equal to or more than the upper threshold Th1. When it is determined that the Cth is equal to or more than the Th1 (Cth≥Th1) ("YES" at step S402), the process proceeds to step S403. When the Cth is less than the Th1 (Cth<Th1) ("NO" at step S402), the process proceeds to step S404.

At step S403, the gain determination unit 601 sets an output gain (Gain_th) to the "Gain". The "Gain" is a preset value and may be, for example, 1 (one).

At step S404, the gain determination unit 601 determines whether the absolute value (Cth) is equal to or less than the lower threshold value (Th0). When it is determined that the Cth is equal to or less than the Th0 (Cth≤Th0) ("YES" at step S404), the process proceeds to step S405. When the Cth is larger than Th0 and less than Th1 (Th0<Cth<Th1) ("NO" at step S404), the process proceeds to step S406.

At step S405, the gain determination unit 601 obtains the output gain (Gain_th) from the following equation 41.

$$\text{Gain\_}th = (Cth - Th0)/Th1 \times \text{Gain} \quad (41)$$

At step S406, the gain determination unit 601 sets the output gain (Gain_th) to 0 (zero).

Figure 77:
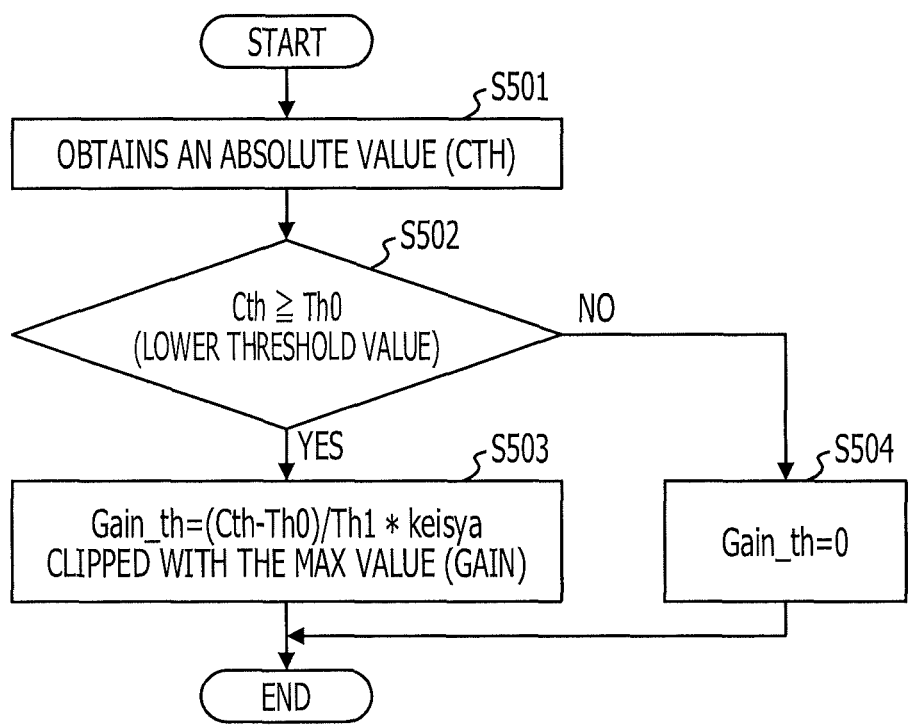
FIG. 77 is a view illustrating an example of a (second) gain determination process in the embodiment 2.

FIG. 77 is a view illustrating an example of a (second) gain determination process in the embodiment 2. At step S501 illustrated in FIG. 77, the gain determination unit 601 obtains an absolute value (Cth) of the value (dy) which has been subjected to convolution.

At step S502, the gain determination unit 601 determines whether the absolute value (Cth) is equal to or less than the lower threshold value (Th0). When it is determined that the absolute value (Cth) is equal to or less than the threshold value (Th0) (Cth≤Th0) ("YES" at step S502), the process proceeds to step S503. When the absolute value (Cth) is larger than the threshold value (Th0) (Cth>Th0) ("NO" at step S502), the process proceeds to step S504.

At step S503, the gain determination unit 601 obtains the output gain (Gain_th) from the following equation 42.

$$\text{Gain\_}th = (Cth - Th0) \times \text{Keisya} \quad (42).$$

where, the output gain (Gain_th) is clipped with the MAX value.

$$\text{Keisya} = 1/(Th1 - Th0) \times \text{Gain}$$

At step S504, the gain determination unit 601 sets the output gain (Gain_th) to zero (0).

As described above, according to embodiment 2, anisotropy in resolution may be improved and noise may be prevented from being emphasized at the flat portion.

(Modified Example of Embodiment 2)

Figure 78:
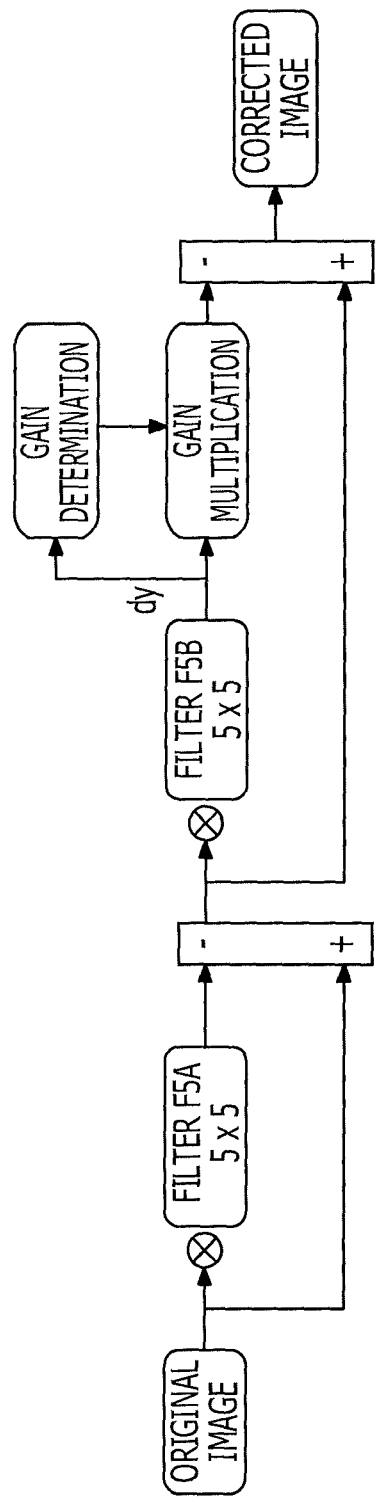
FIG. 78 is a view for explaining a (second) corrected image generation process in the embodiment 2.

Other configuration of the gain processing in the embodiment 2 will be described first. FIG. 78 is a view for explaining a (second) corrected image generation processing in the embodiment 2. In an example illustrated in FIG. 78, the luminance value obtained by convolving a filter of 5×5 elements in second stage with the original image for which subtraction is performed is denoted by the value (dy(in)). The gain determination unit 601 determines gain according to the value of the "dy". The gain multiplication unit 602 multiplies the value (dy) by the determined gain.

An image after having been subjected to the first stage of the filtering is subtracted from the original image. The original image after subtraction is subjected to the second stage of the filtering. The luminance value after the second stage of the filtering is multiplied by gain. The corrected image is generated by subtracting the image after gain multiplication from the original image after subtraction.

The filter having a larger intensity is determined by the filter analysis unit 604 based on the filter coefficient, and the gain determination unit 601 and the gain multiplication unit 602 may perform the gain determination and the gain multiplication, respectively, after the filter determined by the filter analysis unit 604 is subjected to the filtering.

Figure 79:
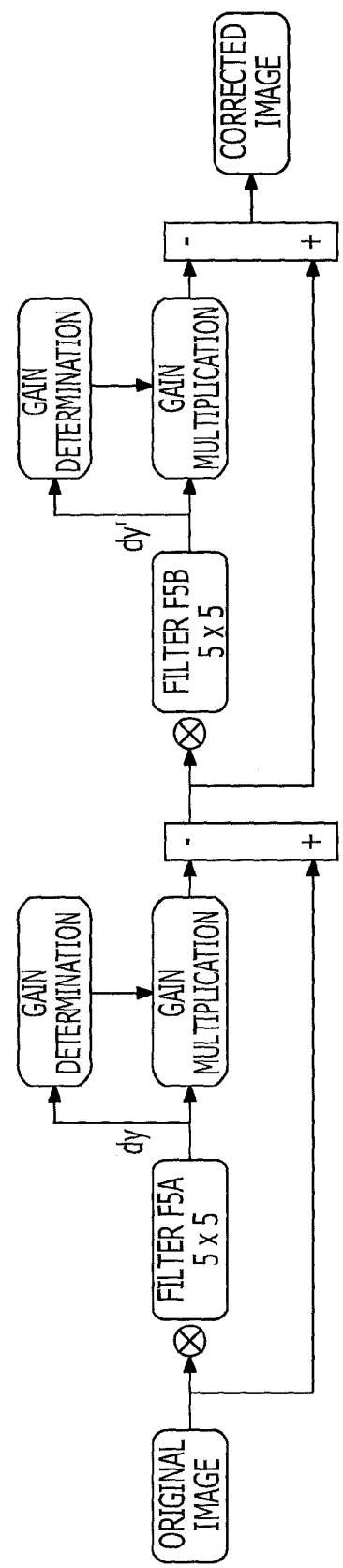
FIG. 79 is a view for explaining a (third) corrected image generation process in the embodiment 2.

FIG. 79 is a view for explaining a (third) corrected image generation processing in the embodiment 2. In an example illustrated in FIG. 79, the luminance value obtained by convolving a filter of 5×5 elements in the first stage with the original image is denoted by the value (dy) and the luminance value obtained by convolving a filter of 5×5 elements in the second stage with the original image for which the subtraction processing is performed is denoted by the value (dy'(in)). The gain determination unit 601 determines gain according to the values of the value (dy) and the value (dy'). The gain multiplication unit 602 multiplies the value (dy) and the value (dy') by each gain determined.

The value (dy) after the first stage of the filtering is multiplied by gain and then the value is subtracted from the original image. The original image after subtraction is subjected to the second stage of the filtering. The value (dy') after the second stage of the filtering is multiplied by gain. The corrected image is generated by subtracting the image after gain multiplication from the original image after subtraction. In the meantime, the example illustrated in FIG. 79 may be applied in a case where intensity of filters in the first stage and the second stage are about the same degree of intensity.

Figure 80:
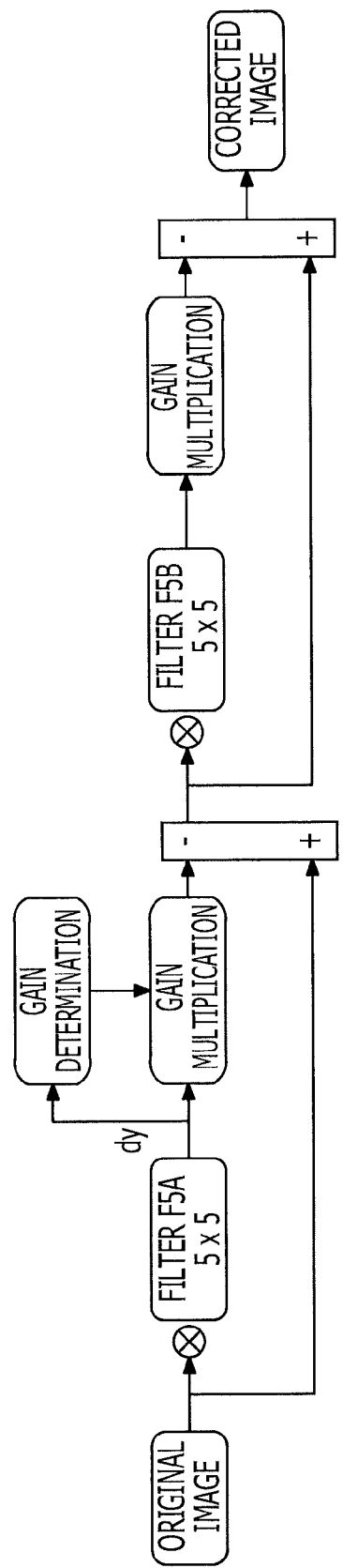
FIG. 80 is a view for explaining a (fourth) corrected image generation process in the embodiment 2.

FIG. 80 is a view for explaining a (fourth) corrected image generation processing in the embodiment 2. In an example illustrated in FIG. 80, the luminance value obtained by convolving a filter of 5×5 elements in the first stage with the original image is denoted by the value (dy). The gain determination unit 601 determines gain according to the value of the value (dy). The gain multiplication unit 602 multiplies the value (dy) by the determined gain.

In this case, when the degree of emphasis of the corrected image is controlled, the gain values may become the same in the first stage and the second stage. Therefore, for example, when the gain processing is performed only in the first stage filtering, the gain multiplication unit 602 needs to only multiply the maximum gain (Gain) which is the same as in the first stage of the filtering in the second stage of the filtering.

Further, when the gain processing is performed only in the second stage filtering, the gain multiplication unit 602 needs to only multiply the maximum gain (Gain) which is the same as in the second stage filtering in the first stage filtering. Further, when the gain processing is performed in both the first stage filtering and the second stage filtering, the gain determination unit 601 needs to make the maximum gain (Gain) in both the first stage filtering and the second stage filtering to be the same.

Figure 81A:
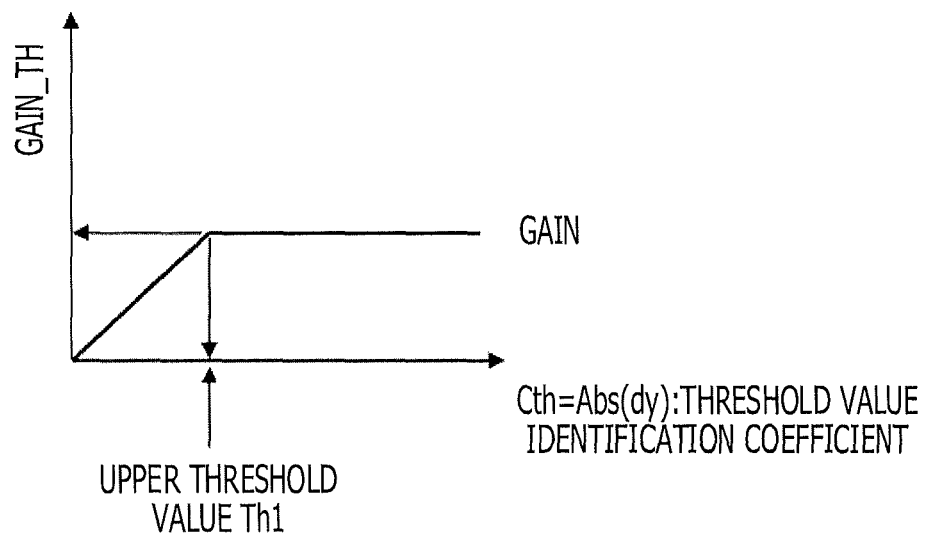
FIG. 81A is a view for explaining another example of a (second) gain determination process in the embodiment 2.

FIG. 81 is a view for explaining another example of the gain determination in the embodiment 2. FIG. 81A is a view for explaining the (second) gain determination in the embodiment 2. There is a case where the lower threshold value (Th0) is set to 0 (zero) as illustrated in FIG. 81A.

Figure 81B:
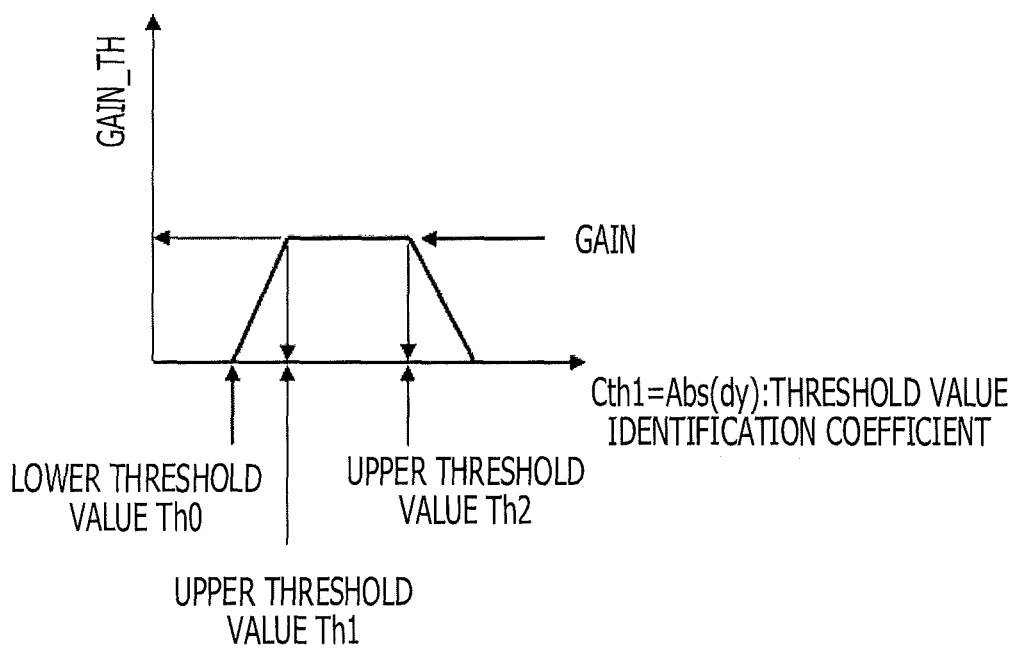
FIG. 81B is a view for explaining a (third) gain determination process in the embodiment 2.

FIG. 81B is a view for explaining (third) the gain determination in the embodiment 2. As illustrated in FIG. 81B, when an upper-most threshold value Th2 is defined and the absolute value (Cth) becomes equal to or more than the upper-most threshold value Th2, the gain determination unit 601 may determine the gain in a stepwise fashion.

Embodiment 3

The image processing apparatus in the embodiment 3 will be described next. In the embodiment 3, the processing by the coefficient analysis unit 10 described above and the processing of the image processing unit 15 of the embodiment 1 or embodiment 2 is made to be performed, respectively, by, for example, the CPU or the DSP.

<Configuration>

Figure 82:
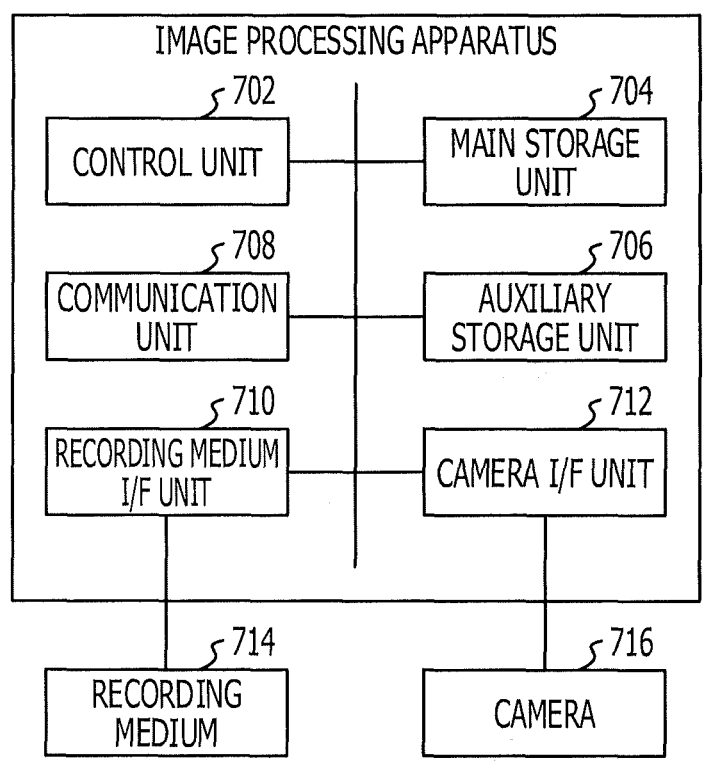
FIG. 82 is a block diagram illustrating an exemplary schematic configuration of an image processing apparatus in the embodiment 3.

FIG. 82 is a block diagram illustrating an exemplary schematic configuration of an image processing apparatus in the embodiment 3. The image processing apparatus illustrated in FIG. 82 includes a control unit 702, a main storage unit 704, an auxiliary storage unit 706, a communication unit 708, a recording medium I/F unit 710, and a camera I/F unit 712. Each unit is connected to be able to transmit and receive data with each other via bus. The image processing apparatus may be equipped with information processing functions such as, for example, a PC (Personal Computer), a server, a smart phone, and a tablet terminal.

The control unit 702 may be, for example, a CPU (Central Processing Unit) which controls various apparatus or operates or manipulates data in a computer. Further, the control unit 702 may be an operation apparatus which executes a program stored in the main storage unit 704 or in the auxiliary storage unit 706.

Further, the control unit 702 may execute the program for a coefficient analysis processing or an image processing stored in the auxiliary storage unit 706 to perform each processing as described above.

The main storage unit 704 may include, for example, a ROM (Read Only Memory) or a RAM (Random Access Memory), and is a storage apparatus which temporarily stores data or a program such as an application software or an OS which is a basic software executed by the control unit 702.

The auxiliary storage unit 706 may include, for example, a HDD (Hard Disk Drive), and may be a storage apparatus which stores data relating to, for example, the application software. Further, the auxiliary storage unit 706 may store the program for the coefficient analysis processing or the image processing acquired from, for example, the recording medium 714.

The communication unit 708 may perform a wired or wireless communication. The communication unit 708 may acquire a plurality of images from, for example, the server and stores the plurality of images in, for example, the auxiliary storage unit 706.

The recording medium I/F (interface) unit 710 is an interface between the recording medium 714 (e.g., a flash memory) connected via a data transfer path such as a USB (Universal Serial Bus) and the image processing apparatus.

Further, the image processing program or the coefficient analysis program described in the embodiment 1 and the embodiment 2 may be stored in the recording medium 714 and the program stored in the recording medium 714 may be installed in the image processing apparatus via the recording medium I/F unit 710. Accordingly, the coefficient analysis program and the image processing program installed may be executed by the image processing apparatus.

The camera I/F unit 712 is an interface which communicates with the camera 716. A chart image or an ordinary image to be corrected captured from the camera 716 is acquired by the camera I/F unit 712 from the camera 716 and is stored in, for example, the auxiliary storage unit 706.

The camera 716 may photograph a chart image as illustrated in FIG. 6 or ordinary scenes and people. The photographed image is received by the image processing apparatus via the camera I/F unit 712. In the meantime, the camera 716 may be built in the image processing apparatus.

Accordingly, the image processing apparatus may acquire the chart image and calculate the spatial filter at each position to correct the image to be correct using the calculated spatial filter.

Therefore, the program for implementing the coefficient analysis processing or the image processing may be stored in the recording medium 714 to cause the computer to perform the above-described coefficient analysis processing or the image processing.

For example, the program may be recorded in the recording medium and the recording medium in which the program is recorded may be allowed to be read by, for example, a computer, a portable terminal, a smart phone, and a tablet terminal in order to implement the coefficient analysis processing or the image processing.

Further, the recording medium may include various recording medium in which information is recorded optically, electrically or magnetically such as, for example, a CD-ROM, a flexible disk, an opto-magnetic disk and a semiconductor memory. The recording medium may also include a ROM and a flash memory where information is electrically recorded. Further, the recording medium does not include a transitory medium such a carrier wave.

Figure 83:
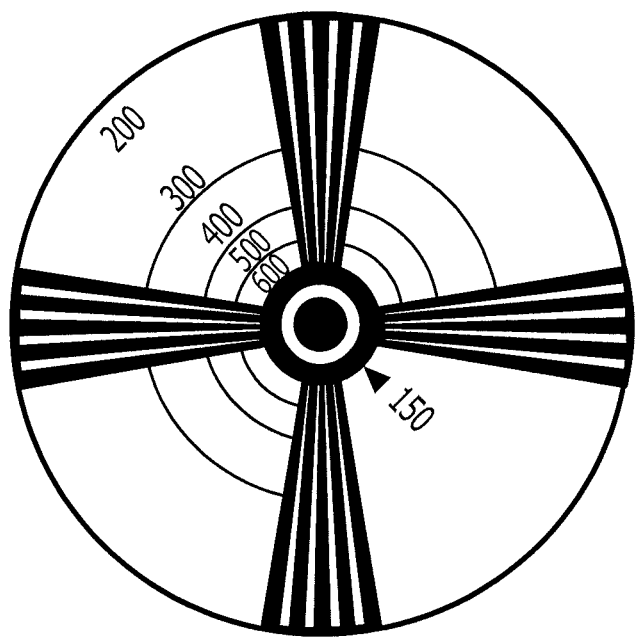
FIG. 83 is a view illustrating an example of a (first) chart.
Figure 84:
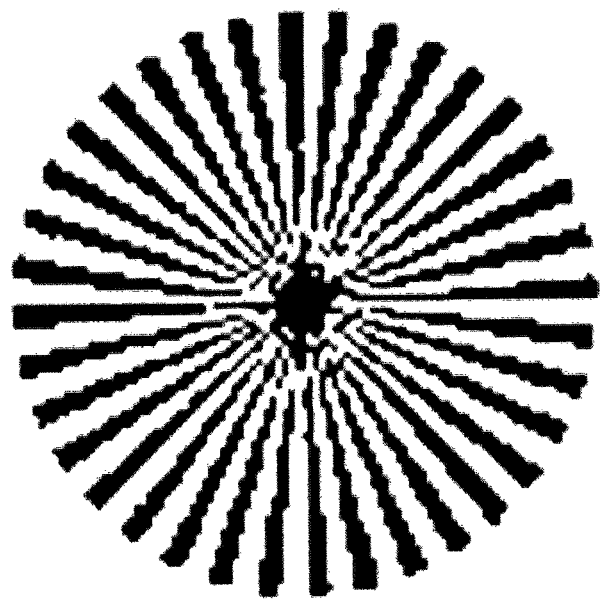
FIG. 84 is a view illustrating an example of a (second) chart.
Figure 85:
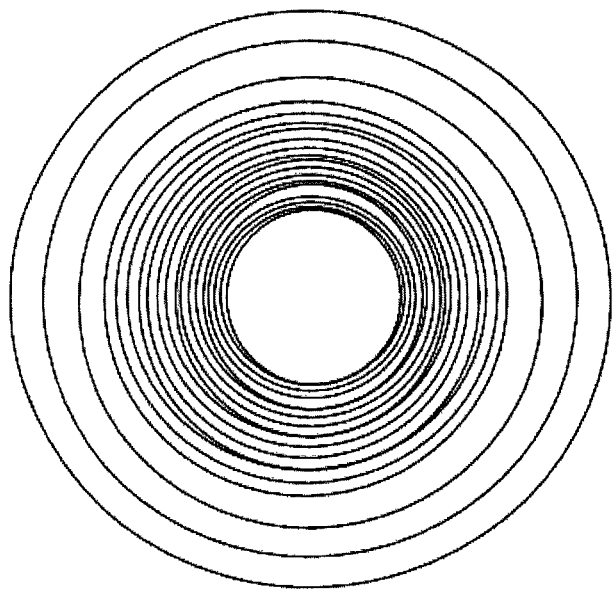
FIG. 85 is a view illustrating an example of a (third) chart.

Further, the charts illustrated in FIG. 83 to FIG. 85 may be used as an exemplary chart. FIG. 83 is a view illustrating an example of a (first) chart. In the chart illustrated in FIG. 83, the resolution may be analyzed at least two directions.

FIG. 84 is a view illustrating an example of a (second) chart in which the resolution may be analyzed radially at all of the directions. The chart illustrated in FIG. 84 is appropriate for the resolution analysis.

FIG. 85 is a view illustrating an example of a (third) chart in which the resolution in the central portion is different from the resolution in outer side portion. Though the chart illustrated in FIG. 84 is appropriate for analysis, an anisotropy in resolution may be analyzed with the chart illustrated in FIG. 83 or FIG. 85.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An image processing apparatus comprising:
a processor configured to
calculate a second spatial filter having number of elements larger than a blur size of an image using a finite first spatial filter having an anisotropy in resolution of the image and a finite filter in which a value of a total sum of elements is zero and at least two elements have a non-zero value; and
generate a plurality of spatial filters having a predetermined number of elements or less from the second spatial filter.

2. The image processing apparatus according to claim 1, wherein the processor is configured to generate the plurality of spatial filters from a third spatial filter calculated by subtracting the second spatial filter from a filter in which a value of a center element is one and a value of elements other than the center element is zero.

3. The image processing apparatus according to claim 2, wherein the processor is configured to calculate a fifth spatial filter by subtracting a filter generated using a fourth spatial filter extracted from the first spatial filter and a finite filter in which the total sum of values of elements is zero and at least two elements have a non-zero value from another filter in which a value of a center element is one and a value of elements other than the center element is zero, and generates the plurality of spatial filters using the fifth spatial filter and the third spatial filter.

4. The image processing apparatus according to claim 3, wherein the processor is configured to calculate a sixth spatial filter such that a difference between the third spatial filter and a filter generated by using the fifth spatial filter and the sixth spatial filter becomes a minimum value, and
when the fifth spatial filter or the sixth spatial filter having a size larger than the predetermined number of elements is present, the processor repeats the generation of the plurality of spatial filters until the size of the fifth spatial filter or the sixth spatial filter becomes the predetermined number of elements or less.

5. The image processing apparatus according to claim 1, wherein the processor is configured to determine a blur size by a blur function of the image, and configured to calculate the second spatial filter having a size of the number of elements larger than the blur size.

6. The image processing apparatus according to claim 1, wherein the processor is configured to perform a filtering on an input image and subtract the image after the filter processing from the input image to generate a corrected image.

7. The image processing apparatus according to claim 2, wherein the processor is configured to perform a filtering on an input image using the plurality of spatial filters to generate a corrected image.

8. The image processing apparatus according to claim 6, wherein the processor is configured to multiply a predetermined gain to a value obtained after the filtering by any spatial filter of the plurality of spatial filters.

9. The image processing apparatus according to claim 8, wherein the processor is configured to set the gain to zero when an absolute value of the value after the filtering is equal to or less than a lower threshold value, and set the gain to a constant value when the absolute value is equal to or larger than an upper threshold value, and is configured to allow the gain to vary stepwisely when the absolute value falls between the lower threshold value and the upper threshold value, thereby determining the predetermined gain.

10. The image processing apparatus according to claim 9, wherein the processor is configured to determine a target spatial filter for multiplying gain, among the plurality of spatial filters, according to a result obtained by analyzing an intensity of the filter based on a filter coefficient.

11. An information processing method comprising:
calculating a second spatial filter having a size of the number of elements larger than a blur size of an image using a finite first spatial filter having an anisotropy in resolution of the image and a finite filter in which a value of a total sum of elements is zero and at least two elements have a non-zero value; and generating a plurality of spatial filters having a predetermined number of elements or less from the second spatial filter.

12. A non-transitory computer-readable storage medium storing a program, when executed by a computer, which perform:

calculating a second spatial filter having a size of the number of elements larger than a blur size of an image using a finite first spatial filter having an anisotropy in resolution of the image and a finite filter in which a value of a total sum of elements is zero and at least two elements have a non-zero value; and generating a plurality of spatial filters having a predetermined number of elements or less from the second spatial filter.

* * * * *